(12) United States Patent
Ozaki

(10) Patent No.: US 11,622,075 B2
(45) Date of Patent: *Apr. 4, 2023

(54) CONTROL DEVICE, CONTROL METHOD, AND RECORDING MEDIUM

(71) Applicant: SONY CORPORATION, Tokyo (JP)

(72) Inventor: Koji Ozaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 36 days.

This patent is subject to a terminal disclaimer.

(21) Appl. No.: 17/196,292

(22) Filed: Mar. 9, 2021

(65) Prior Publication Data

US 2021/0195105 A1 Jun. 24, 2021

Related U.S. Application Data

(63) Continuation of application No. 15/895,035, filed on Feb. 13, 2018, now Pat. No. 10,992,863, which is a
(Continued)

(30) Foreign Application Priority Data

Jun. 11, 2012 (JP) .................................. 2012-131855

(51) Int. Cl.
*H04N 5/232* (2006.01)
*G03B 17/18* (2021.01)
*H04N 5/907* (2006.01)

(52) U.S. Cl.
CPC ......... *H04N 5/23241* (2013.01); *G03B 17/18* (2013.01); *H04N 5/23216* (2013.01); *H04N 5/23293* (2013.01); *H04N 5/907* (2013.01)

(58) Field of Classification Search
CPC .......... H04N 5/23241; H04N 5/23216; H04N 5/23293; H04N 5/907; G03B 17/18
(Continued)

(56) References Cited

U.S. PATENT DOCUMENTS 5,943,050 A 8/1999 Bullock et al.
7,222,356 B1 5/2007 Yonezawa et al.
(Continued)

FOREIGN PATENT DOCUMENTS

CN 1947412 A 4/2007
CN 1992806 A 7/2007
(Continued)

OTHER PUBLICATIONS

Office Action for CN Patent Application No. 201810020478.9, dated Sep. 24, 2019, 11 pages of Office Action and 17 pages of English Translation.
(Continued)

*Primary Examiner* — Stephen P Coleman
(74) *Attorney, Agent, or Firm* — Chip Law Group

(57) ABSTRACT

There is provided a control device including a display control unit configured to cause display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed, and a power control unit configured to control power supply to the imaging unit in the shift between the first and second display modes.

3 Claims, 53 Drawing Sheets

Related U.S. Application Data continuation of application No. 15/404,143, filed on Jan. 11, 2017, now Pat. No. 9,930,256, which is a continuation of application No. 14/390,143, filed as application No. PCT/JP2013/056642 on Mar. 11, 2013, now Pat. No. 9,826,165.

(58) Field of Classification Search
  USPC .................................................. 348/333.01
  See application file for complete search history.

(56) References Cited

U.S. PATENT DOCUMENTS

| | | | |
|---|---|---|---|
| 7,714,926 | B2 | 5/2010 | Kobayashi et al. |
| 10,992,863 | B2* | 4/2021 | Ozaki ................ H04N 5/23241 |
| 2003/0142228 | A1 | 7/2003 | Flach et al. |
| 2005/0265626 | A1 | 12/2005 | Endo et al. |
| 2007/0146540 | A1 | 6/2007 | Sasano |
| 2007/0188646 | A1 | 8/2007 | Kobayashi et al. |
| 2009/0109203 | A1 | 4/2009 | Washio et al. |
| 2010/0065640 | A1 | 3/2010 | Maeda et al. |
| 2010/0182481 | A1 | 7/2010 | Kobayashi et al. |
| 2011/0074824 | A1 | 3/2011 | Srinivasan et al. |
| 2011/0225538 | A1* | 9/2011 | Oyagi ..................... A63F 13/26 |
| | | | 715/781 |
| 2011/0234832 | A1 | 9/2011 | Ezoe et al. |
| 2011/0234853 | A1 | 9/2011 | Hayashi et al. |
| 2012/0274831 | A1 | 11/2012 | Kobayashi et al. |
| 2013/0278800 | A1 | 10/2013 | Liu |
| 2015/0154754 | A1 | 6/2015 | Teittinen |
| 2015/0365548 | A1 | 12/2015 | Katsumata et al. |

FOREIGN PATENT DOCUMENTS

| | | |
|---|---|---|
| CN | 101656834 A | 2/2010 |
| CN | 101959021 A | 1/2011 |
| EP | 1746819 A1 | 1/2007 |
| JP | 2004-200950 A | 7/2004 |
| JP | 2005-328242 A | 11/2005 |
| JP | 2007-180673 A | 7/2007 |
| JP | 2008-311724 A | 12/2008 |
| JP | 2010-226237 A | 10/2010 |
| JP | 4783465 B1 | 9/2011 |
| JP | 2011-205530 A | 10/2011 |
| KR | 10-2007-0014136 A | 1/2007 |
| KR | 10-2011-0094152 A | 8/2011 |
| KR | 10-1114195 B1 | 2/2012 |
| WO | 2005/112436 A1 | 11/2005 |

OTHER PUBLICATIONS

Extended European search Report EP Application No. 18161350.6, dated Jun. 6, 2018, 07 pages of EESR.
Notice of Allowance for U.S. Appl. No. 15/404,143, dated Nov. 22, 2017, 02 pages.
Notice of Allowance for U.S. Appl. No. 15/404,143, dated Nov. 14, 2017, 10 pages.
Final Office Action for U.S. Appl. No. 15/404,143, dated Aug. 31, 2017, 12 pages.
Non-Final Office Action for U.S. Appl. No. 15/404,143, dated Feb. 28, 2017, 13 pages.
Office Action for CN Patent Application No. 201380029421.0, dated May 3, 2017, 09 pages of Office Action and 18 pages of English Translation.
International Preliminary Report on Patentability of PCT Application No. PCT/JP2013/056642, dated Dec. 24, 2014, 08 pages of English Translation and 05 pages of IPRP.
Notice of Allowance for U.S. Appl. No. 14/390,143, dated Mar. 28, 2017, 10 pages.
Notice of Allowance for U.S. Appl. No. 14/390,143, dated Jun. 6, 2017, 02 pages.
Notice of Allowance for U.S. Appl. No. 14/390,143, dated Oct. 24, 2016, 10 pages.
Non-Final Office Action for U.S. Appl. No. 14/390,143, dated Apr. 27, 2016, 11 pages.
International Search Report and Written Opinion of PCT Application No. PCT/JP2013/056642, dated Jun. 18, 2013, 08 pages of English Translation and 08 pages of ISRWO.
Non-Final Office Action for U.S. Appl. No. 15/895,035, dated Mar. 30, 2018, 12 pages.
Non-Final Office Action for U.S. Appl. No. 15/895,035, dated Oct. 19, 2018, 10 pages.
Non-Final Office Action for U.S. Appl. No. 15/895,035, dated May 6, 2019, 13 pages.
Non-Final Office Action for U.S. Appl. No. 15/895,035, dated Jun. 18, 2020, 17 pages.
Final Office Action for U.S. Appl. No. 15/895,035, dated Jan. 31, 2019, 12 pages.
Final Office Action for U.S. Appl. No. 15/895,035, dated Oct. 25, 2019, 16 pages.
Advisory Action for U.S. Appl. No. 15/895,035, dated Mar. 19, 2019, 03 pages.
Advisory Action for U.S. Appl. No. 15/895,035, dated Jan. 6, 2020, 03 pages.
Notice of Allowance for U.S. Appl. No. 15/895,035, dated Dec. 9, 2020, 08 pages.
Office Action for CN Patent Application No. 201810020440.1, dated Dec. 20, 2019, 12 pages of Office Action and 17 pages of English Translation.

* cited by examiner

CAMERA MODE ⇔ REPRODUCTION MODE

CONTROL DEVICE, CONTROL METHOD, AND RECORDING MEDIUM

CROSS-REFERENCE TO RELATED APPLICATIONS

The present application is a continuation application of U.S. patent application Ser. No. 15/895,035, filed on Feb. 13, 2018, which is a continuation application of U.S. patent application Ser. No. 15/404,143, filed on Jan. 11, 2017 (now U.S. Pat. No. 9,930,256 issued Mar. 27, 2018), which is a continuation application of U.S. patent application Ser. No. 14/390,143, filed on Oct. 2, 2014 (now U.S. Pat. No. 9,826,165 issued Nov. 21, 2017), which is a National Stage of PCT/JP13/56642, filed on Mar. 11, 2013, and which claims the benefit of priority from prior Japanese Patent Application JP 2012-131855, filed on Jun. 11, 2012. Each of the above-referenced applications is hereby incorporated herein by reference in its entirety.

TECHNICAL FIELD

The present disclosure relates to a control device, a control method, and a recoding medium.

BACKGROUND ART

As devices having electronic imaging units including image sensors, there are many devices such as digital cameras, mobile phones, and personal computers (PCs). Even when the devices do not have imaging units, remote control of imaging units of other devices to perform photographing is generally executed. In the photographing in which the electronic imaging units are used, images captured by the imaging units are recorded as still images or moving images in response to instructions from users, while the images are displayed in real time. The images displayed in real time are referred to as electric-to-electric (EE) images (also referred to as through images or the like).

EE images are displayed on display units of devices including imaging units or devices controlling imaging units remotely. The display units are, for example, liquid crystal displays (LCDs) and display not only EE images but also various images. The displayed images also include reproduced images obtained by reproducing previously photographed still images or moving images. Currently, EE images and reproduced images are separately displayed in many cases, for example, by switching display modes of the display units by users.

Here, Patent Literature 1 discloses a technology for causing a display unit to display EE images and reproduced images simultaneously. Patent Literature 1 discloses a technology for facilitating continuous switching between a display mode in which EE images are displayed and a display mode in which only reproduced images are displayed by arranging the EE images and the reproduced images in a time-series order in which the EE images are considered to be more recent.

CITATION LIST

Patent Literature

Patent Literature 1: JP 2005-328242A

SUMMARY OF INVENTION

Technical Problem

However, when the display mode in which the EE images are displayed and the display mode in which only the reproduced images are displayed are switched continuously using the technology disclosed in Patent Literature 1 described above, a state in which a user is likely to perform imaging and a state in which the user merely browses the reproduced images are continuously switched because the EE images are displayed. Accordingly, it is not easy to distinguish a state in which power is supplied to an imaging unit to prepare execution of imaging from a state in which power may not be supplied to the imaging unit, and thus power may be consequently wasted in some cases.

It is desirable to provide a novel and improved control device, a novel and improved control method, and a novel and improved recording medium capable of appropriately controlling power supply to an imaging unit in a device which can display images acquired by the imaging unit.

Solution to Problem

According to an embodiment of the present disclosure, there is provided a control device including a display control unit configured to cause display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed, and a power control unit configured to control power supply to the imaging unit in the shift between the first and second display modes.

According to an embodiment of the present disclosure, there is provided a control method including causing display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed, and controlling power supply to the imaging unit in the shift between the first and second display modes.

According to an embodiment of the present disclosure, there is provided a computer-readable recording medium recording a program for causing a computer to realize a function of causing display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed, and a function of controlling power supply to the imaging unit in the shift between the first and second display modes.

In the foregoing control device, control method, and recording medium, the first mode in which the first kind of image having the predetermined relation with the EE image is displayed and the second mode in which that is not the case are defined in the display of the images on the display unit. When the change in the display of the display unit by the display control unit is analyzed as the shift between the first and second modes and the power supply to the imaging unit is controlled in the shift, a user can comprehend an operation to be subsequently performed more appropriately and reflect the operation to the power supply to the imaging unit. Thus, it is possible to reduce the unnecessary power supply while ensuring operability for the user.

Advantageous Effects of Invention

According to the present disclosure described above, it is possible to appropriately control power supply to an imaging unit in a device capable of displaying an image acquired by the imaging unit.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The embodiments of the present disclosure include, for example, a device or a system to be described below, a method executed by the device or the system, a program executed by a processor to realize functions of the device, and a computer-readable recording medium recording the program.

The description will be made in the following order.
1. Description of relevant technology
2. Device configuration
3. Embodiments relating to display forms
3-1. First embodiment
3-2. Second embodiment
3-3. Third embodiment
3-4. Fourth embodiment
3-5. Fifth embodiment
3-6. Sixth embodiment
3-7. Seventh embodiment
3-8. Eighth embodiment
4. Embodiments relating to internal processes
4-1. Ninth embodiment
4-2. Tenth embodiment
4-3. Eleventh embodiment
4-4. Twelfth embodiment
4-5. Thirteenth embodiment
4-6. Fourteenth embodiment
5. Supplement

1. Description of Relevant Technology

First, a relevant technology of the present disclosure will be described with reference to FIG. 1.

Figure 1:
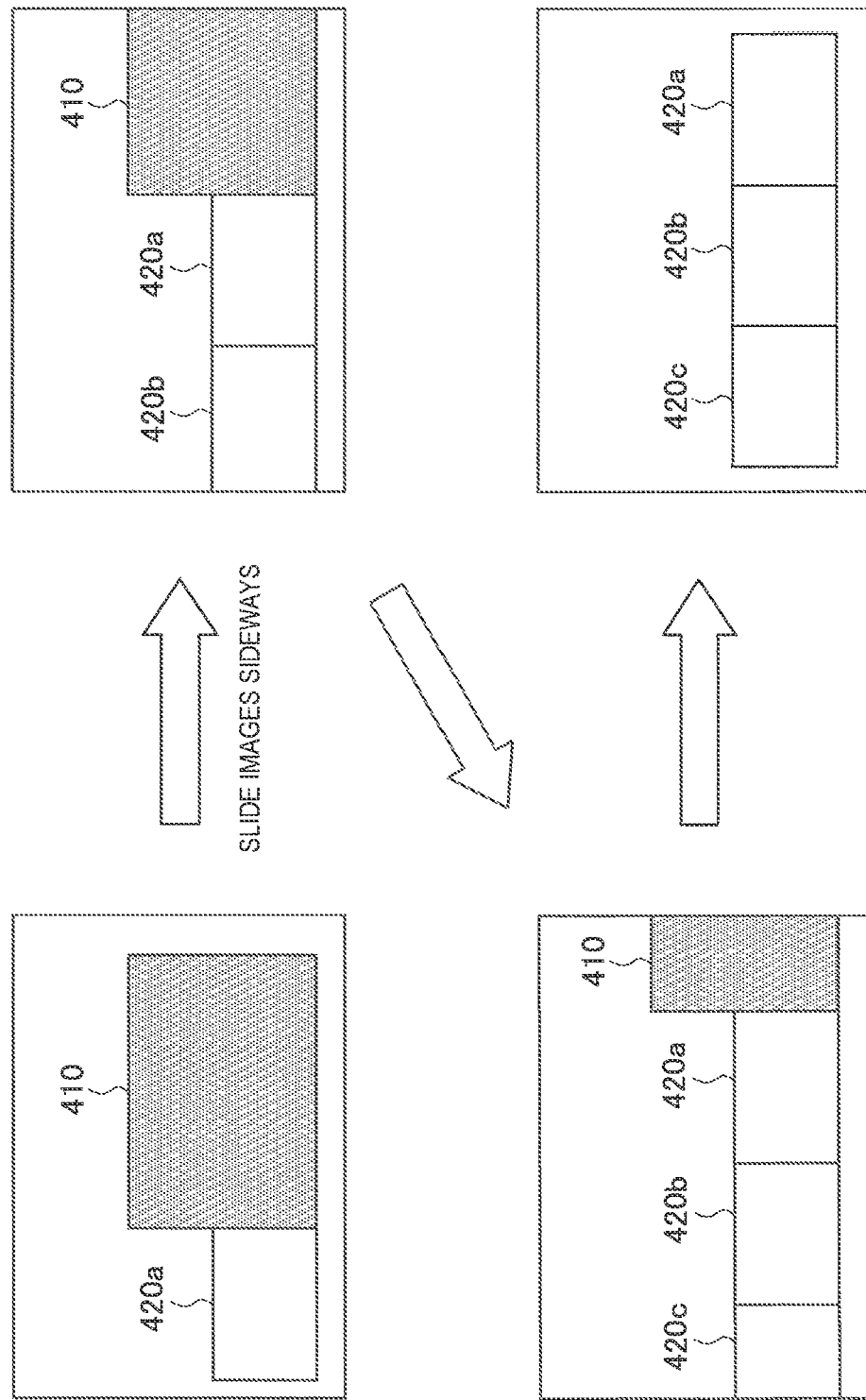
FIG. 1 is a diagram for describing a technology of the present disclosure.

FIG. 1 is a diagram for describing a relevant technology of the present disclosure. Referring to FIG. 1, an EE image 410 and a reproduced image 420a are arranged and displayed in the lateral direction on a display unit. Here, for example, when a user's operation of sliding such an image group in the lateral direction is acquired through, for example, a button or a touch panel, the image group is slid in a slide direction (the right direction in the illustrated example). Thus, from the left end of a display region, a newly reproduced image 420b is shown and a reproduced image 420c is further shown. On the other hand, the EE image 410 becomes closer to the right end of the display region to be out from the display region before long.

In this way, technologies for mixing EE images and reproduced images in image display on a display unit and enabling an operation such as movement of display positions of such images have been suggested. In such technologies, however, it is not easy to distinguish a state in which power is supplied to an imaging unit to prepare execution of imaging from a state in which power may not be supplied to the imaging unit. Therefore, the power is normally supplied to the imaging unit, and thus power may be consequently wasted or a request to perform a separate operation of controlling power of the imaging unit is given to a user.

The technology according to the embodiments of the present disclosure is a technology devised to improve the relevant technology.

2. Device Configuration

Next, a device configuration according to an embodiment of the present disclosure will be described with reference to FIGS. 2 and 3.

Figure 2:
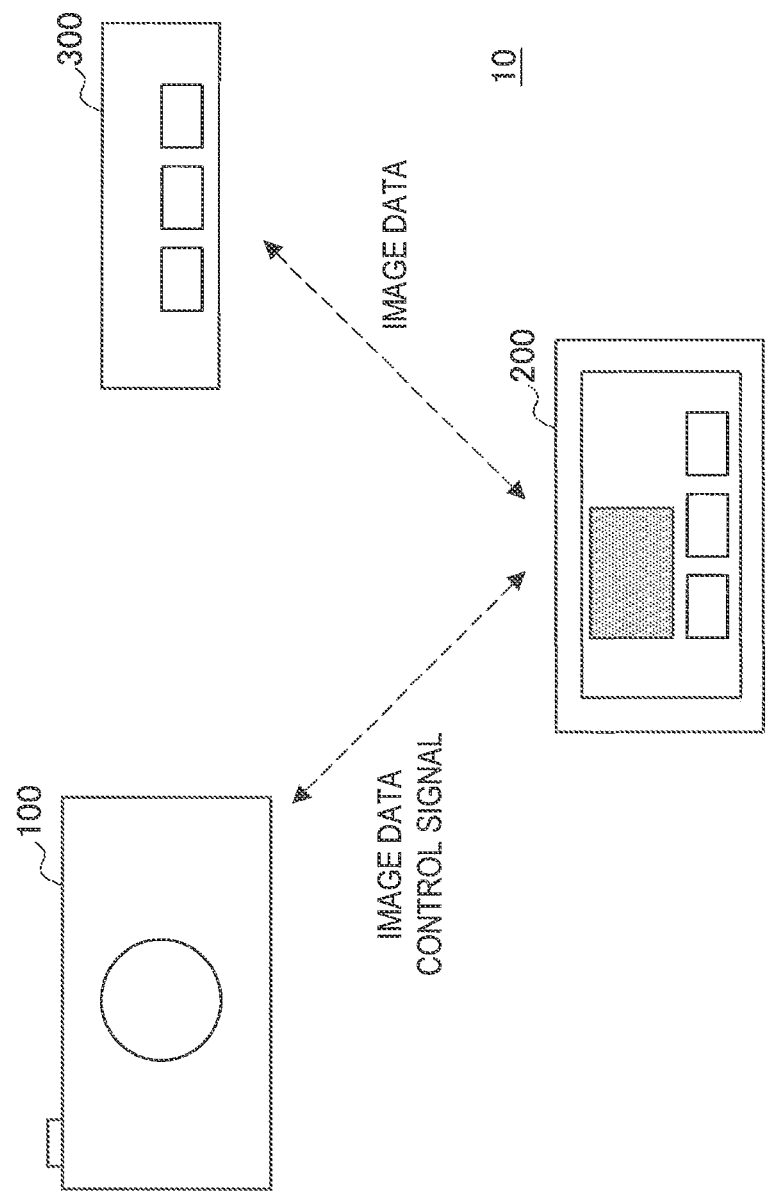
FIG. 2 is a diagram illustrating an example of a device configuration when the technology of the present disclosure is performed by a plurality of separated devices.

FIG. 2 is a diagram illustrating an example of a device configuration when the technology of the present disclosure is performed by a plurality of separated devices. Referring to FIG. 2, a system 10 includes an imaging device 100, a display device 200, and an image storage device 300.

The imaging device 100 includes an imaging unit that includes an image sensor and is a device capable of acquiring a still image or a moving image. The imaging device 100 communicates with the display device 200 and transmits image data including EE images acquired by the imaging unit to the display device 200. In the illustrated example, since the imaging device 100 is remotely controlled by the display device 200, the imaging device 100 receives various control signals from the display device 200. The control signals include signals used to control power supply to the imaging unit of the imaging device 100 according to a display state of an image relevant to an EE image on the display device 200. The imaging device 100 can be, for example, a digital camera that is remotely operated.

The display device 200 is a device that includes a display unit and can display an image. The display device 200 communicates with the imaging device 100 and receives display image data including an EE image acquired by the imaging unit from the imaging device 100. The display device 200 transmits a control signal used to control the imaging device 100 to the imaging device 100. On the other hand, the display device 200 also communicates with the image storage device 300 and receives image data displayed as a reproduced image from the image storage device 300. The display device 200 may transmit the image data of the EE image supplied from the imaging device 100 to the image storage device 300 to record the image data. For example, the display device 200 can be any of various information processing devices such as a PC having a function of remotely controlling a digital camera.

The image storage device 300 is a device that includes a storage unit and records an image. The image storage device 300 communicates with the display device 200 and transmits the image data of the reproduced image recorded in the storage unit to the display device 200. The image storage device 300 may receive image data to be newly recorded from the display device 200. Alternatively, the image storage device 300 may communicate with the imaging device 100 and receive image data to be newly recorded from the imaging device 100. For example, the image storage device 300 can be any of various storage devices connected to the display device 200 via a network.

Figure 3:
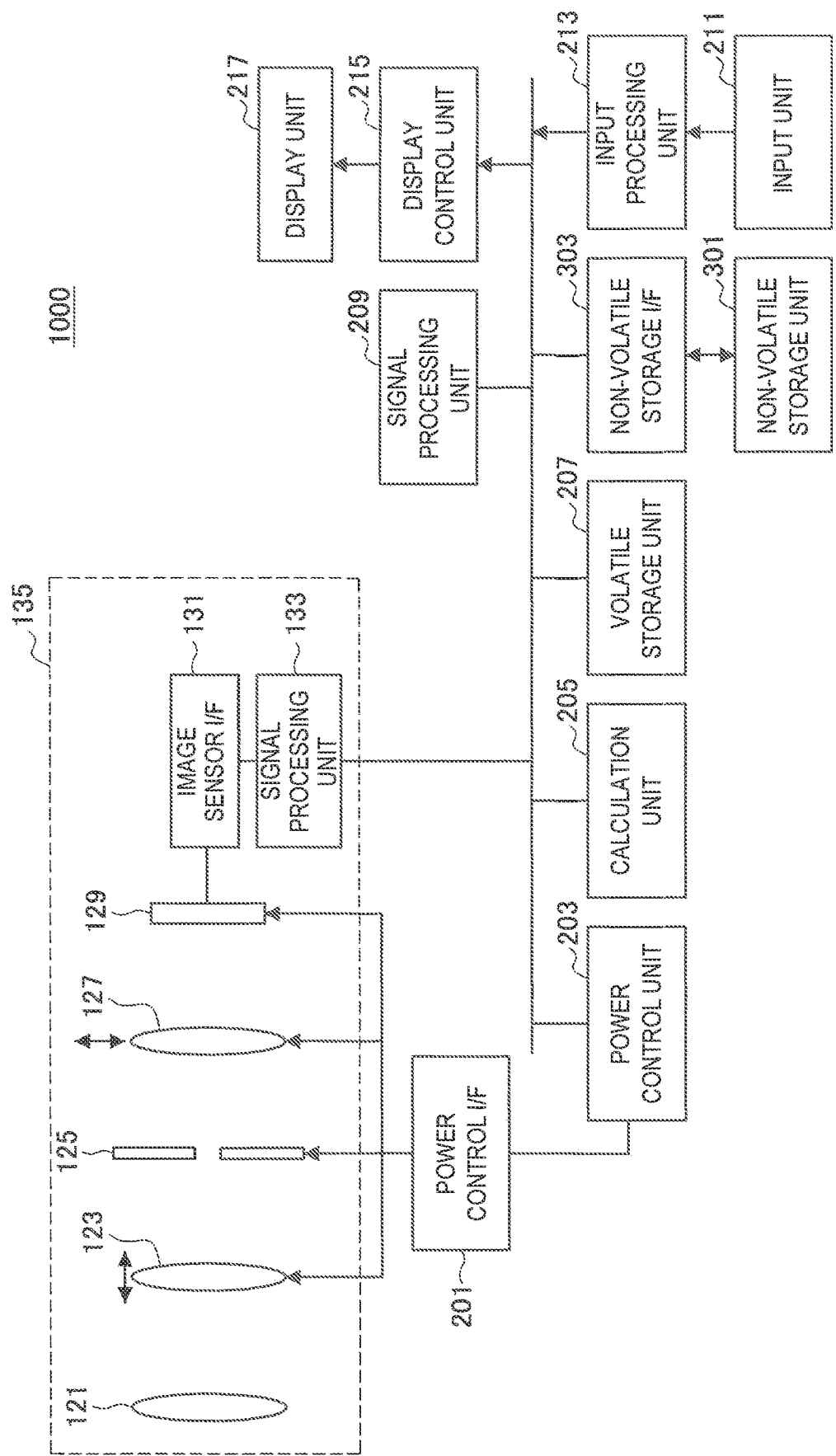
FIG. 3 is a diagram illustrating an example of a device configuration when the technology of the present disclosure is performed by a single device.

FIG. 3 is a diagram illustrating an example of a device configuration when the technology of the present disclosure is performed by a single device. Referring to FIG. 3, a device 1000 includes a lens 121, an auto focus (AF) mechanism 123, a diaphragm 125, a camera-shake correction mechanism 127, an image sensor 129, an image sensor interface (I/F) 131, and a signal processing unit 133. In the following description, the constituent elements from the lens 121 to the signal processing unit 133 are also collectively referred to as an imaging unit 135. The imaging unit 135 can be included in the imaging device 100 in the example of FIG. 2 described above.

The device 1000 includes a power control I/F 201, a power control unit 203, a calculation unit 205, a volatile storage unit 207, a signal processing unit 209, an input unit 211, an input processing unit 213, a display control unit 215, and a display unit 217. The constituent elements from the power control I/F 201 to the display unit 217 can be included in the display device 200 in the example of FIG. 2. The device 1000 includes a non-volatile storage unit 301 and a non-volatile storage I/F 303. The non-volatile storage unit 301 and the non-volatile storage I/F 303 can be included in the image storage device 300 in the example of FIG. 2.

The device 1000 can be any of various devices including an imaging unit and a display unit, such as a digital camera, a mobile phone, or a PC. The device configuration according to an embodiment of the present disclosure is not limited to the examples illustrated in FIGS. 2 and 3 described above and can include, for example, a configuration in which constituent elements to be described below are arbitrarily distributed in a plurality of devices.

The imaging unit 135 includes the constituent elements from the lens 121 to the signal processing unit 133, as described above. A subject image is formed on an imaging surface of the image sensor 129 through actions of the lens 121, the AF mechanism 123, the diaphragm 125, and the camera-shake correction mechanism 127. The image sensor 129 is, for example, a complementary metal oxide semiconductor (CMOS) or a charge coupled device (CCD) that performs photoelectric conversion on the subject image and outputs an analog image signal. The imaging unit 135 may further include a constituent element (not illustrated), such as a timing generator for driving the image sensor 129.

The analog image signal output by the image sensor 129 is supplied to the signal processing unit 133 via the image sensor I/F 131 and is converted into a digital image signal therein. Accordingly, in the illustrated example, the image signal output from the imaging unit 135 is a digital image signal. The signal processing unit 133 is realized by, for example, a digital signal processor (DSP).

Here, it is necessary to supply power to, for example, the AF mechanism 123, the diaphragm 125, the camera-shake correction mechanism 127, and the image sensor 129 among the constituent elements of the imaging unit 135 in order to perform the functions thereof. Accordingly, appropriate power is supplied to these constituent elements via the power control I/F 201. As will be described below, in the embodiment of the present disclosure, the power supply to the imaging unit is controlled according to an image display state on the display unit 217. In the illustrated example, the AF mechanism 123, the diaphragm 125, the camera-shake correction mechanism 127, and the image sensor 129 correspond to predetermined portions for which the power supply is controlled in the imaging unit. The power supply to all of these portions may not be controlled and power supply to other portions may be further controlled.

The power control I/F 201 supplies power to the predetermined portions of the above-described imaging unit 135 under the control of the power control unit 203. As will be described below, the power control unit 203 controls the power supply to the imaging unit 135 in shift between display modes by the display control unit 215. More specifically, for example, the power control unit 203 controls whether the power is supplied to the predetermined portions of the imaging unit 135. The power control unit 203 can be realized by software by, for example, a central processing unit (CPU).

The calculation unit 205 controls an action of each unit of the device 1000. The calculation unit 205 can be realized by software by, for example, the CPU.

The volatile storage unit 207 is used to temporarily load a program read from the non-volatile storage unit 301, for example, in order for the CPU to realize the function of each unit described herein. The volatile storage unit 207 may temporarily store various kinds of data used for the function of each unit described herein.

The signal processing unit 209 processes an image signal used for the display control unit 215 to cause the display unit 217 to display an image. The signal processing unit 209 may be realized, for example, using a DSP as in the signal processing unit 133 of the imaging unit 135 or may be realized by software by the CPU.

The input unit 211 is used for an operation input of the user. The input unit 211 is, for example, an operation element such as a button installed on the casing of the device 1000 or a touch sensor installed on the display unit 217. The operation input of the user can be, for example, an operation input performed to move or select an image displayed on the display unit 217 or switch a display or imaging mode of the device 1000.

The input processing unit 213 acquires the operation input of the user acquired by the input unit 211 and delivers the operation input to each unit of the device 1000. For example, the operation input may be delivered temporarily to the calculation unit 205, and then may be delivered appropriately to each unit from the calculation unit 205. Alternatively, the operation input may be delivered directly from the input processing unit 213 to each unit. The input processing unit 213 can be, for example, a software interface realized by the CPU.

The display control unit 215 controls display of the display unit 217. The display control unit 215 causes the display unit 217 to display various images including EE images and reproduced images. The display control unit 215 causes the display unit 217 to display EE images and images (which can include reproduced images satisfying a predetermined condition and are also referred to as EE-relevant images below) having a predetermined relation with the EE images and other reproduced images. The display control unit 215 can be realized by software by, for example, a CPU or a graphical processing unit (GPU).

Here, in the following description, when the display control unit 215 causes the display unit 217 to display the foregoing images, a first display mode in which the EE-relevant images and the other reproduced images are displayed and a second display mode in which the EE-relevant images are not displayed and the other reproduced images are display are defined. When shift between the display modes occurs, the power control unit 203 controls the power supply to the imaging unit 135 during the shift. The first and second display modes can be modes shown as the result of the display control by the display control unit 215, and accordingly, such modes may not necessarily be defined in a processing order of the display control unit 215.

The display unit 217 can be, for example, an LCD or an organic electro-luminescence (EL) display. The display unit 217 displays various images under the control of the display control unit 215.

The non-volatile storage unit 301 persistently records various kinds of data used in the device 1000. The non-volatile storage unit 301 records, for example, the program executed by the CPU to realize the function of each of the foregoing units by software and captured images acquired by the imaging unit 135. The captured images recorded in the non-volatile storage unit 301 can be subsequently read as reproduced images and can be displayed on the display unit 217 by the display control unit 215. The non-volatile storage unit 301 may be a storage device such as a hard disk included in the device 1000 or may be a removable storage medium such as a semiconductor memory or various disks which can be mounted on the device 1000.

The non-volatile storage I/F 303 is an interface used to record and read data in and from the non-volatile storage unit 301. For example, when the non-volatile storage unit 301 is a storage device included in the device 1000, the non-volatile storage I/F 303 can be an internal interface of the device 1000. Alternatively, when the non-volatile storage unit 301 is a removable storage medium, the non-volatile storage I/F 303 can be a driver of the removable storage medium.

3. Embodiments Relating to Display Forms

Hereinafter, embodiments of the present disclosure will be described. First, several embodiments of display forms will be described. These embodiments relate mainly to how display of EE-relevant images and the other reproduced images is changed. Accordingly, these embodiments can be combined with any of the embodiments relating to internal processes to be described below.

3-1. First Embodiment

First, a first embodiment of the present disclosure will be described with reference to FIGS. 4 to 9.

Figure 4:
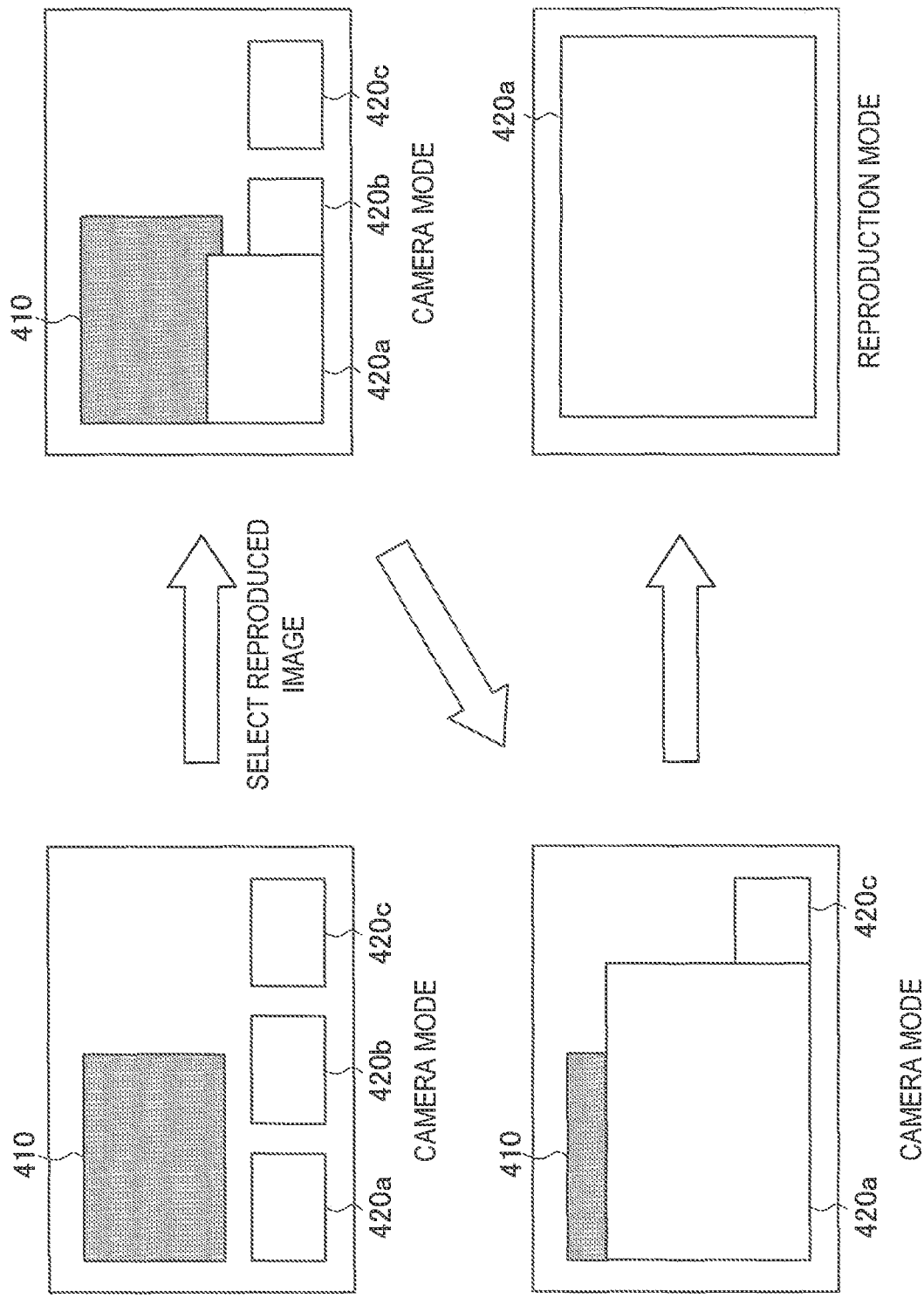
FIG. 4 is a diagram for describing a first example of display according to a first embodiment of the present disclosure.

FIG. 4 is a diagram for describing a first example of display in the first embodiment of the present disclosure. Referring to FIG. 4, the display control unit 215 arranges an EE image 410 and reproduced images 420a to 420c and causes the display unit 217 to display these images. Here, when the reproduced image 420a is selected through a user's operation, display of the reproduced image 420a is expanded. Accordingly, the display of the EE image 410 and the other reproduced images 420b and 420c is hidden on the posterior side of the reproduced image 420a. Such display is realized, for example, by separating a screen displaying the reproduced image 420a from a screen displaying the EE image 410 and the reproduced images 420b and 420c and superimposing the screens transparently.

In this case, the display of the display unit 217 by the display control unit 215 can be said to shift from the first display mode in which the EE image 410 and the reproduced images 420a to 420c are displayed to the second display mode in which the EE image 410 is not displayed and the reproduced image 420a is displayed.

In the shift between the display modes by the display control unit 215, the power control unit 203 controls the power supply to the imaging unit 135. More specifically, the power control unit 203 changes a mode of the power supply to the imaging unit 135 from a camera mode to a reproduction mode when the entire EE image 410 is shield by the expanded reproduced image 420a and the EE image 410 is not included in the display region. In the description of the following embodiments, the camera mode means a mode in which power is supplied to the AF mechanism 123, the diaphragm 125, the camera-shake correction mechanism 127, and the image sensor 129 and the reproduction mode means a mode in which no power is supplied thereto.

When the reproduced image 420a is selected but the EE image 410 still remains in the display region, for example, there is a probability of the imaging being performed by the user who views a subject pictured in the EE image 410. Accordingly, this state is preferably a state in which imaging can still be performed, i.e., a state in which power is supplied to each unit of the imaging unit 135.

Conversely, when the reproduced image 420a is expanded in the display of the display unit 217 and the entire EE image 410 is accordingly shielded, the user does not view which is pictured in the EE image 410, and thus the probability of the imaging being performed is low. Accordingly, in this state, the power supply to the predetermined portions of the imaging unit 135 is preferably stopped to save the power.

In the foregoing example, the power control unit 203 does not necessarily control the power supply when the entire EE image 410 is not included in the display region. For example, the power control unit 203 may control the power supply when a predetermined ratio or more of the EE image 410 is shielded by the reproduced image 420a and the content of the EE image 410 is substantially not viewable in the display region.

Figure 5:
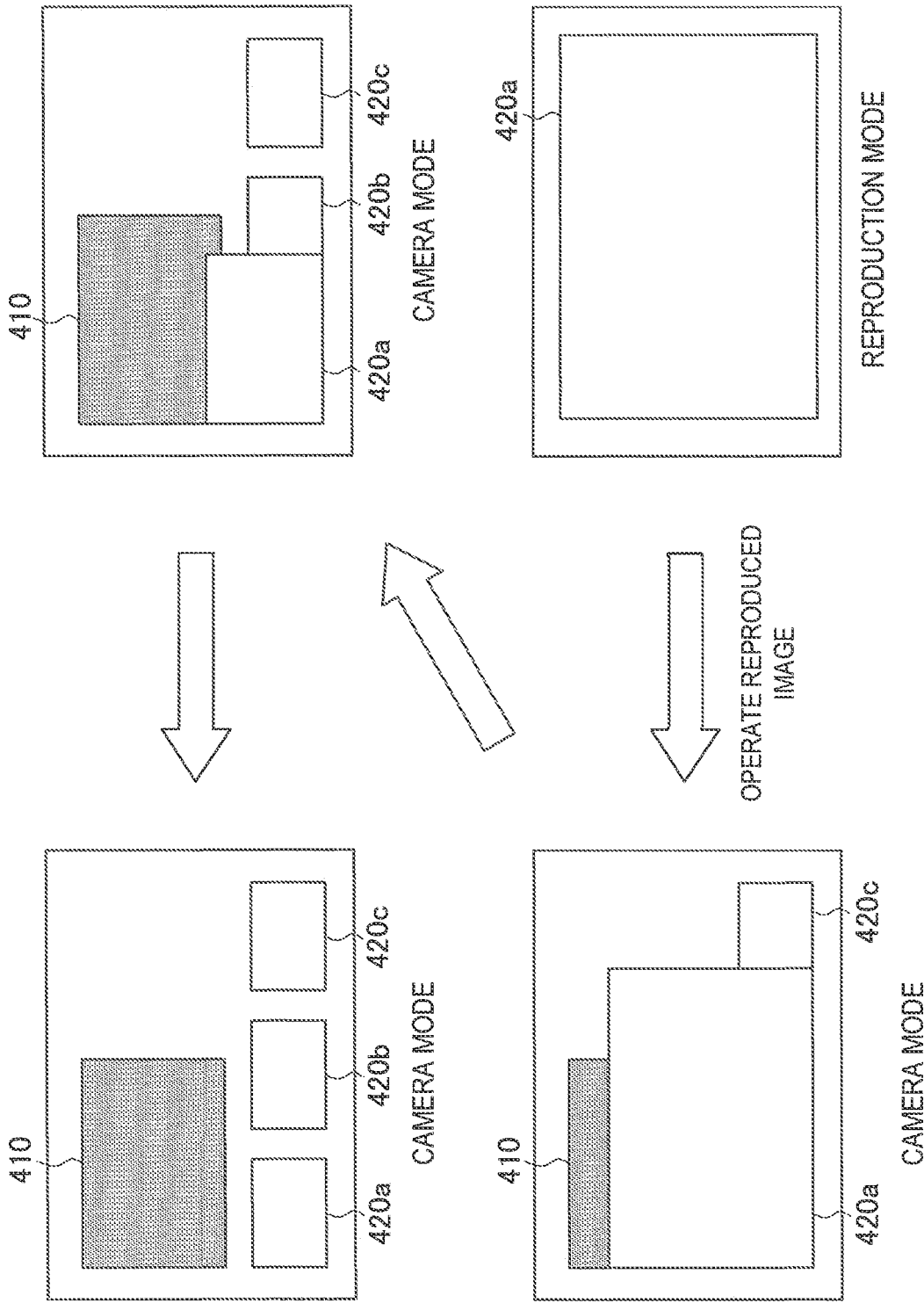
FIG. 5 is a diagram for describing a second example of display according to a first embodiment of the present disclosure.

FIG. 5 is a diagram for describing a second example of the display according to the first embodiment of the present disclosure. Referring to FIG. 5, the display control unit 215 causes the display unit 217 to display the reproduced image 420a. This state is exactly the same as the state in which the change in the display illustrated in FIG. 4 described above ends. Here, when a predetermined user's operation on the reproduced image 420a is acquired, the display of the reproduced image 420a is contracted. Accordingly, the display of the EE image 410 and the other reproduced images 420b and 420c hidden on the posterior side of the reproduced image 420a appears.

In this case, the display of the display unit 217 by the display control unit 215 can be said to shift from the second display mode in which the EE image 410 is not displayed and the reproduced image 420a is displayed to the first display mode in which the EE image 410 and the reproduced images 420a to 420c are displayed.

In the shift between the display modes by the display control unit 215, the power control unit 203 controls the power supply to the imaging unit 135. More specifically, the power control unit 203 changes the mode of the power supply to the imaging unit 135 from the reproduction mode to the camera mode when a part of the EE image 410 is not shielded through the contraction of the reproduced image 420a and the EE image 410 is included in the display region.

When the user performs an operation of contracting the reproduced image 420a and the EE image 410 is included in the display region, there is a probability of the user intending to perform imaging while viewing the EE image 410 thereafter. Accordingly, at this time, the power supply to each unit of the imaging unit 135 preferably resumes to return to the imageable state.

In the foregoing example, the power control unit 203 does not necessarily control the power supply when the EE image 410 is even slightly included in the display region. For example, the power control unit 203 may control the power supply when a predetermined ratio or more of the EE Image 410 is not shielded and the content of the EE image 410 can be substantially viewed in the display region.

Figure 6:
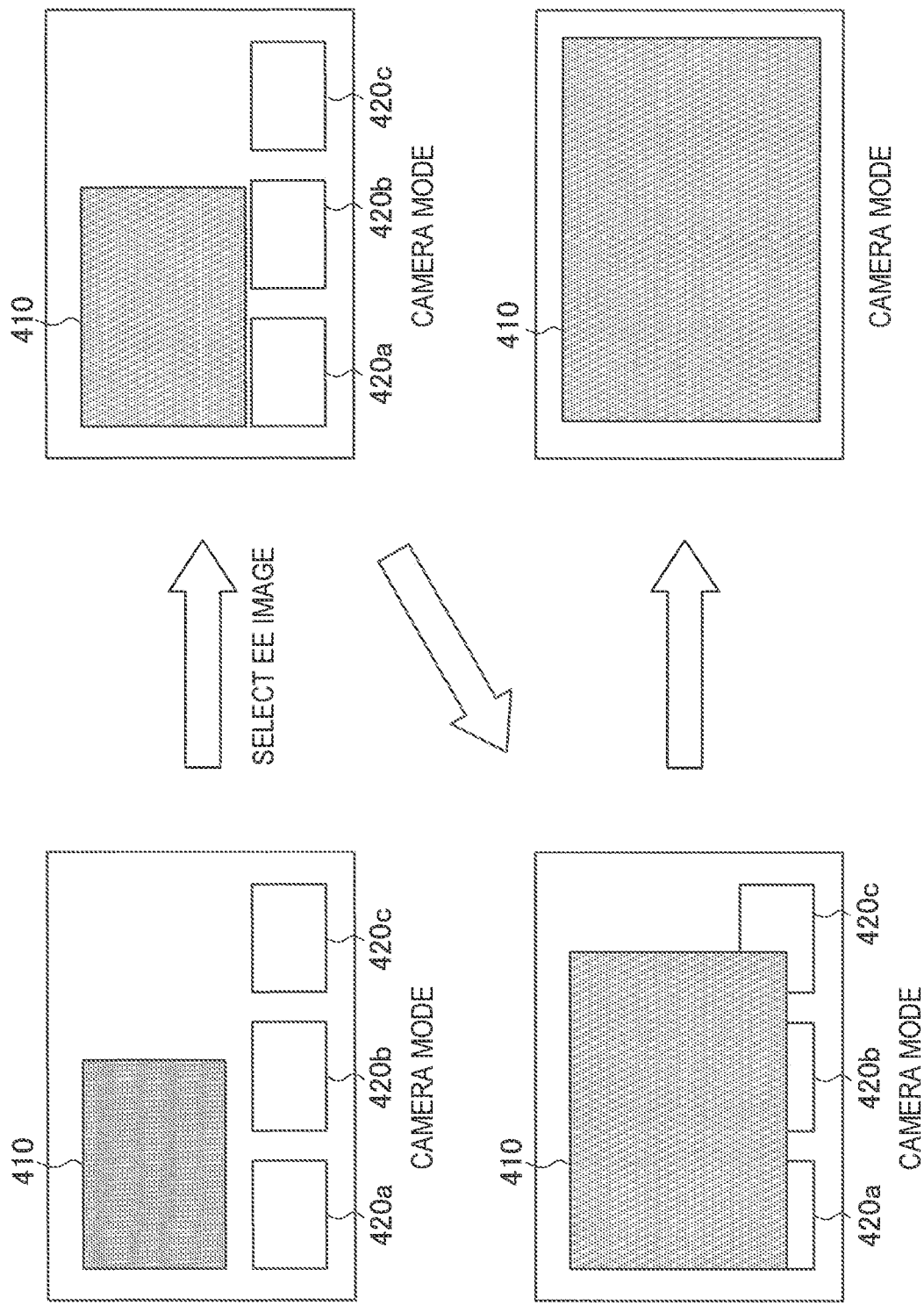
FIG. 6 is a diagram for describing a third example of display according to a first embodiment of the present disclosure.

FIG. 6 is a diagram for describing a first example of display in the third embodiment of the present disclosure. Referring to FIG. 6, in a way similar to the example in FIG. 4, the display control unit 215 arranges an EE image 410 and reproduced images 420a to 420c and causes the display unit 217 to display these images. Here, when the EE image 410 is selected through a user's operation, display of the EE image 410 is expanded. Accordingly, the display of the reproduced images 420a to 420c is hidden on the posterior side of the EE image 410. Such display is realized, for example, by separating a screen displaying the EE image 410 from a screen displaying the reproduced images 420a to 420c and superimposing the screens transparently.

In this state, the display of the display unit 217 by the display control unit 215 can be said to shift from the first display mode in which the EE image 410 and the reproduced images 420a to 420c are displayed to a display mode in which the EE image 410 is displayed and the reproduced images 420a to 420c are not displayed. In the embodiment, in this shift case, the power control unit 203 does not control the power supply to the imaging unit 135. Accordingly, the mode of the power supply to the imaging unit 135 remains to be the camera mode.

Figure 7:
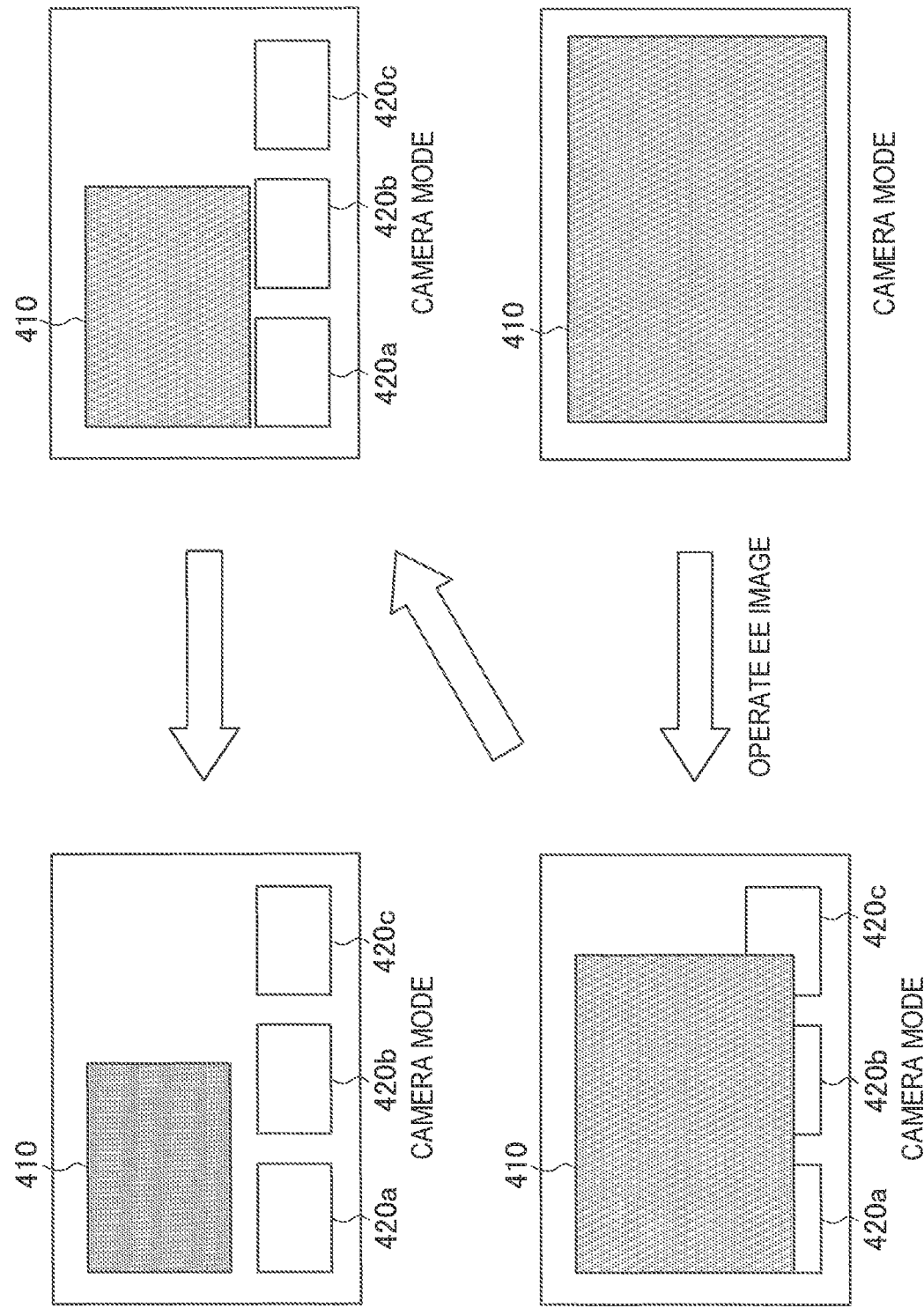
FIG. 7 is a diagram for describing a fourth example of display according to a first embodiment of the present disclosure.

FIG. 7 is a diagram for describing a fourth example of the display according to the first embodiment of the present disclosure. Referring to FIG. 7, the display control unit 215 causes the display unit 217 to display the EE image 410. This state is exactly the same as the state in which the change in the display illustrated in FIG. 6 described above ends. Here, when a predetermined user's operation on the EE image 410 is acquired, the display of the EE image 410 is contracted. Accordingly, the display of the reproduced images 420a to 420c hidden on the posterior side of the EE image 410 appears.

In this case, the display of the display unit 217 by the display control unit 215 can be said to shift from the display mode in which the EE image 410 is displayed and the reproduced images 420a to 420c are not displayed to the first display mode in which the EE image 410 and the reproduced images 420a to 420c are displayed. In the embodiment, in this shift case, the power control unit 203 does not control the power supply to the imaging unit 135 either. Accordingly, the mode of the power supply to the imaging unit 135 remains to be the camera mode.

Modification Example

Figure 8:
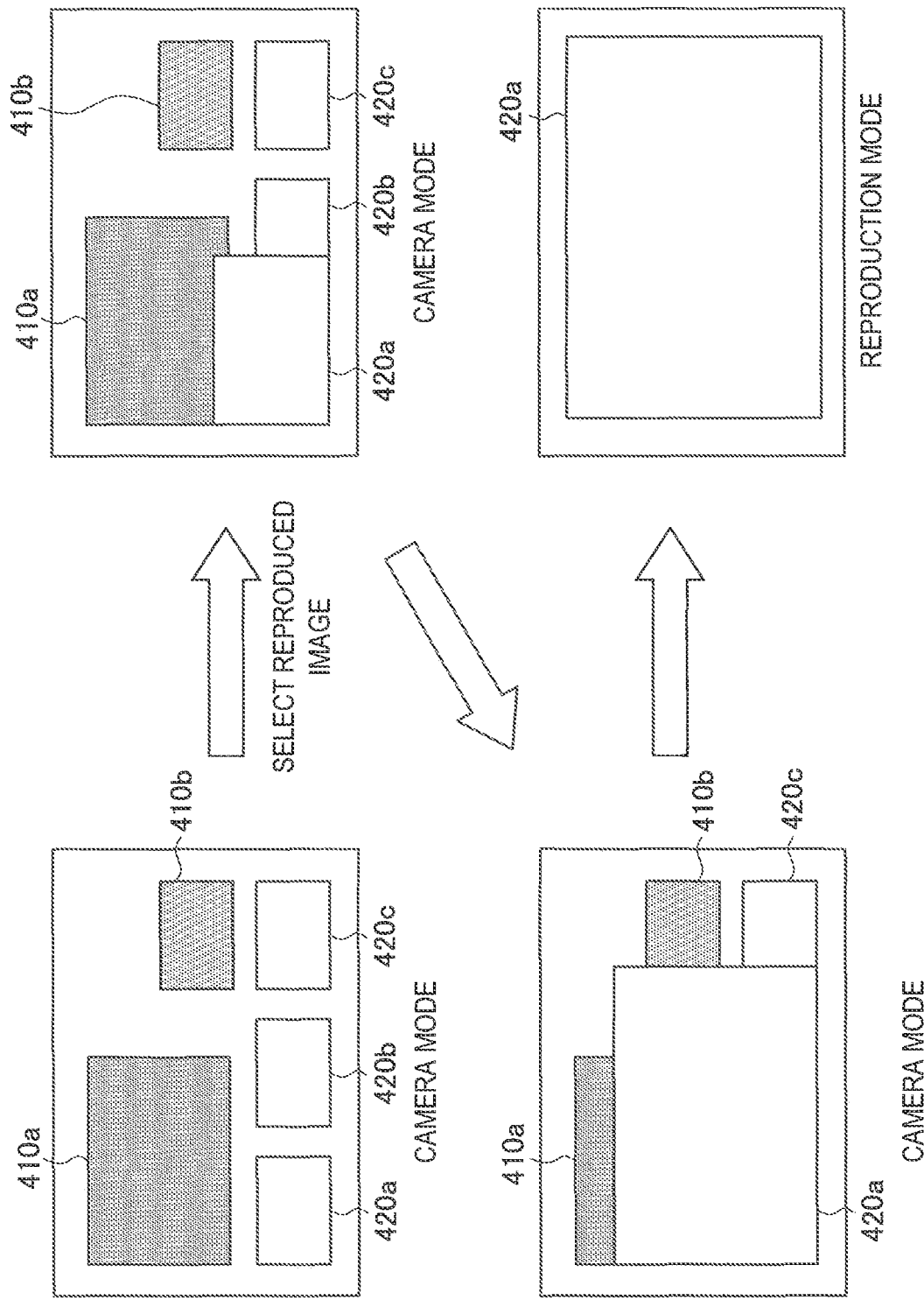
FIG. 8 is a diagram for describing the first example of the display according to a modification example of the first embodiment of the present disclosure.

FIG. 8 is a diagram for describing a first example of the display according to a modification example of the first embodiment of the present embodiment. Referring to FIG. 8, the display control unit 215 arranges EE images 410a and 410b and reproduced images 420a to 420c and causes the display unit 217 to display these images. This example is different from the example of FIGS. 4 to 7 described above in that the plurality of EE images 410a and 410b are displayed. The EE images 410a and 410b may be acquired by different imaging units. In this case, 10 illustrated in FIG. 2 includes the plurality of imaging devices 100 which can each transmit image data of the EE image to the display device 200. Alternatively, the device 1000 illustrated in FIG. 3 includes the plurality of imaging units 135 which can each acquire image data of the EE image and supply the image to the display control unit 215.

Alternatively, the EE images 410a and 410b may be acquired by the same imaging unit. In this case, the EE images 410a and 410b can be, for example, images for which EE images acquired by the same imaging unit are displayed at different magnifications.

Here, when the reproduced image 420a is selected through a user's operation, display of the reproduced image 420a is expanded. Accordingly, the display of the EE images 410a and 410b and the other reproduced images 420b and 420c is hidden on the posterior side of the reproduced image 420a. Such display is realized, for example, by separating a screen displaying the reproduced images 420a from a screen displaying the EE image 410a and 410b and the reproduced images 420b and 420c and superimposing the screens transparently.

In this case, the display of the display unit 217 by the display control unit 215 can be said to shift from the first display mode in which the EE images 140a and 410b and the reproduced images 420a to 420c are displayed to the second display mode in which the EE images 410a and 410b are not displayed and the reproduced image 420a is displayed.

In the shift between the display modes by the display control unit 215, the power control unit controls the power supply to the imaging unit 135. For example, the power control unit 203 may determine whether each of the EE images 410a and 410b is included in a display region. In this case, when the entire EE image 410a is shielded by the expanded reproduced image 420a and the EE image 410a is not included in the display region, the mode of the power supply to the imaging unit having acquired the EE image 410a is changed from the camera mode to the reproduction mode. Further, when the entire EE image 410b is shielded by the expanded reproduced image 420a and the EE image 410b is not included in the display region, the mode of the power supply to the imaging unit having acquired the EE image 410b is changed from the camera mode to the reproduction mode.

Alternatively, the power control unit 203 may collectively determine whether the EE images 410a and 410b are included in the display region. In this case, when both of the EE images 410a and 410b are shielded by the expanded reproduced image 420a and none of the EE images 410a and 410b is included in the display region, the mode of the power supply to each of the imaging units having acquired the EE images 410a and 410b is changed from the camera mode to the reproduction mode.

In any case, as illustrated, when none of the EE images 410a and 410b is displayed through the expansion of the reproduced image 420a, the mode of the power supply to each imaging unit is set to the reproduction mode.

Figure 9:
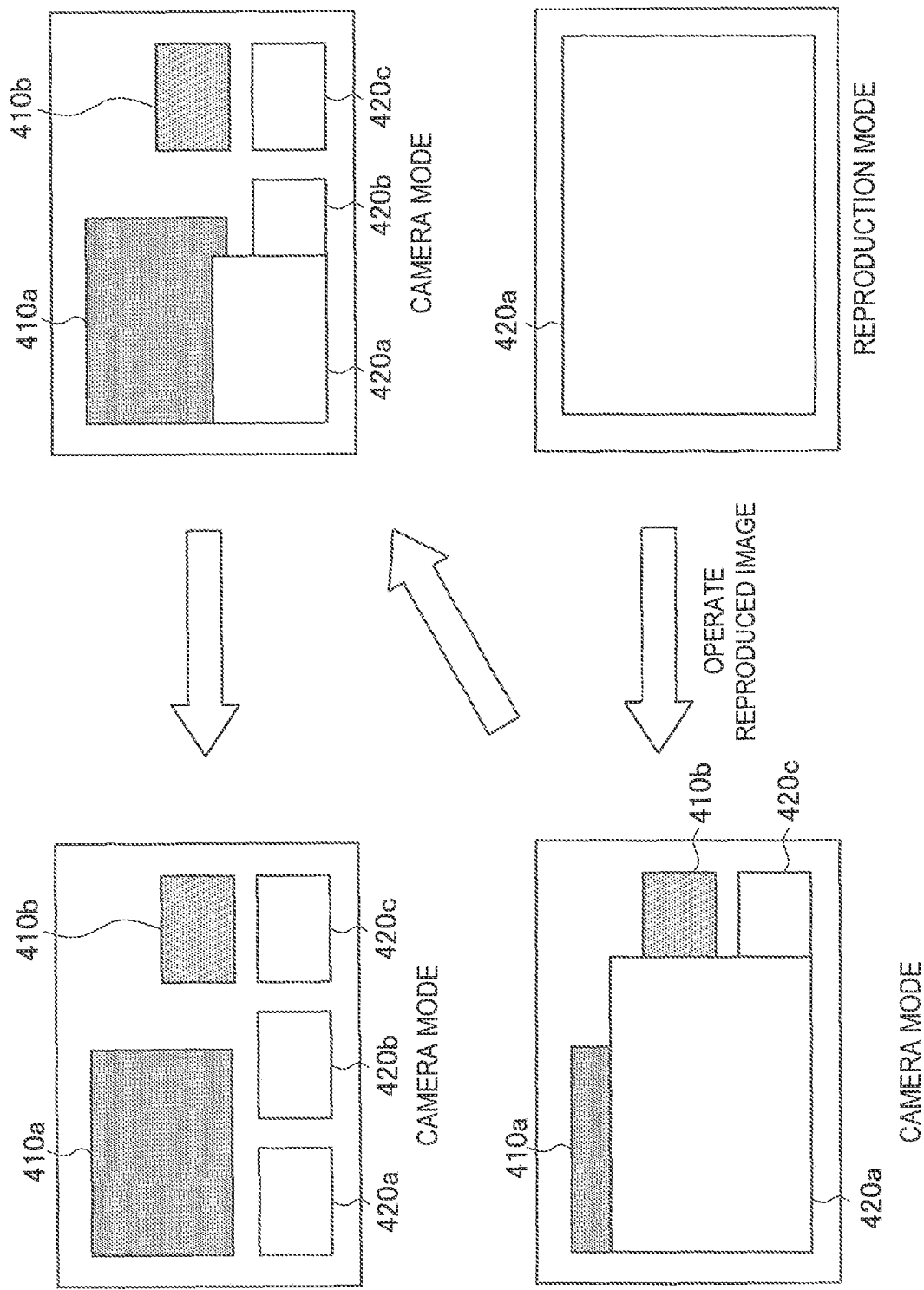
FIG. 9 is a diagram for describing the second example of the display according to a modification example of the first embodiment of the present disclosure.

FIG. 9 is a diagram for describing a second example of the display according to a modification example of the first embodiment of the present disclosure. Referring to FIG. 9, the display control unit 215 causes the display unit 217 to display the reproduced image 420a. This state is exactly the same as the state in which the change in the display illustrated in FIG. 8 described above ends. Here, when a predetermined user's operation on the reproduced image 420a is acquired, the display of the reproduced image 420a is contracted. Accordingly, the display of the EE images 410a and 410b and the other reproduced images 420b and 420c hidden on the posterior side of the reproduced image 420a appears.

In this case, the display of the display unit 217 by the display control unit 215 can be said to shift from the second display mode in which the EE images 410a and 410b are not displayed and the reproduced image 420a is displayed to the first display mode in which the EE images 410a and 410b and the reproduced images 420a to 420c are displayed.

In the shift between the display modes by the display control unit 215, the power control unit 203 controls the power supply to the imaging unit 135. For example, the power control unit 203 may determine whether each of the EE images 410a and 410b is included in the display region. In this case, when a part of the EE image 410a is not shielded through contraction of the reproduced image 420a and the EE image 410a is included in the display region, the mode of the power supply to the imaging unit having acquired the EE image 410a is changed from the reproduction mode to the camera mode. Further, when a part of the EE image 410b is not shielded through contraction of the reproduced image 420a and the EE image 410b is included in the display region, the mode of the power supply to the imaging unit having acquired the EE image 410b is changed from the reproduction mode to the camera mode.

Alternatively, the power control unit 203 may collectively determine whether the EE images 410a and 410b are included in the display region. In this case, when a part of one of the EE images 410a and 410b is not shielded through the contraction of the reproduced image 420a and the one of the EE images 410a and 410b is included in the display region, the mode of the power supply to each of the imaging units having acquired the EE images 410a and 410b is changed from the reproduction mode to the camera mode.

In any case, as illustrated, when each of the EE images 410a and 410b is displayed through the contraction of the reproduced image 420a, the mode of the power supply to each imaging unit is set to the camera mode.

The first example of the power control when a plurality of EE images are displayed is summarized in Table 1 below. Table 1 shows an example of normal display and zoomed display of images when two EE images acquired by the same imaging unit. Here, "display" indicates that these images are included in the display region of the display unit 217 and "no display" indicates that these images are not included in the display region of the display unit 217.

TABLE 1

Table 1: POWER CONTROL WHEN TWO EE IMAGES ARE ACQUIRED FROM SAME IMAGING UNIT

| EE Image | Display | Display | No Display | No Display |
|---|---|---|---|---|
| Zoomed EE Image | Display | No Display | Display | No Display |
| Mode of Power Supply | Camera Mode | Camera Mode | Camera Mode | Reproduction Mode |

A second example of the power control when a plurality of EE images are displayed is summarized in Table 2 below. Table 2 shows an example of separate control and collective control of the mode of the power supply to the imaging unit of each camera when two EE images are acquired by different imaging units (camera A and camera B).

TABLE 2

Table 2: POWER CONTROL WHEN TWO EE IMAGES ARE ACQUIRED BY DIFFERENT IMAGING UNITS

| EE Image (Camera A) | Display | Display | No Display | No Display |
|---|---|---|---|---|
| EE Image (Camera B) | Display | No Display | Display | No Display |
| Mode of Power Supply (Camera A: Separate Control) | Camera Mode | Camera Mode | Reproduction Mode | Reproduction Mode |
| Mode of Power Supply (Camera B: Separate Control) | Camera Mode | Reproduction Mode | Camera Mode | Reproduction Mode |
| Mode of Power Supply (Collective Control) | Camera Mode | Camera Mode | Camera Mode | Reproduction Mode |

In the first embodiment of the present disclosure described above, when the EE image and the reproduced images can be mixed and displayed, the power supply to the imaging unit is controlled depending on whether the EE image is displayed. Thus, for example, when there is a probability of the user performing imaging, the power supply to the imaging unit is maintained. Otherwise, the power supply to the imaging unit is reduced or stopped. In this way, it is possible to reduce the waste power supply while ensuring operability of the user.

3-2. Second Embodiment

Next, a second embodiment of the present disclosure will be described with reference to FIGS. 10 and 11.

Figure 10:
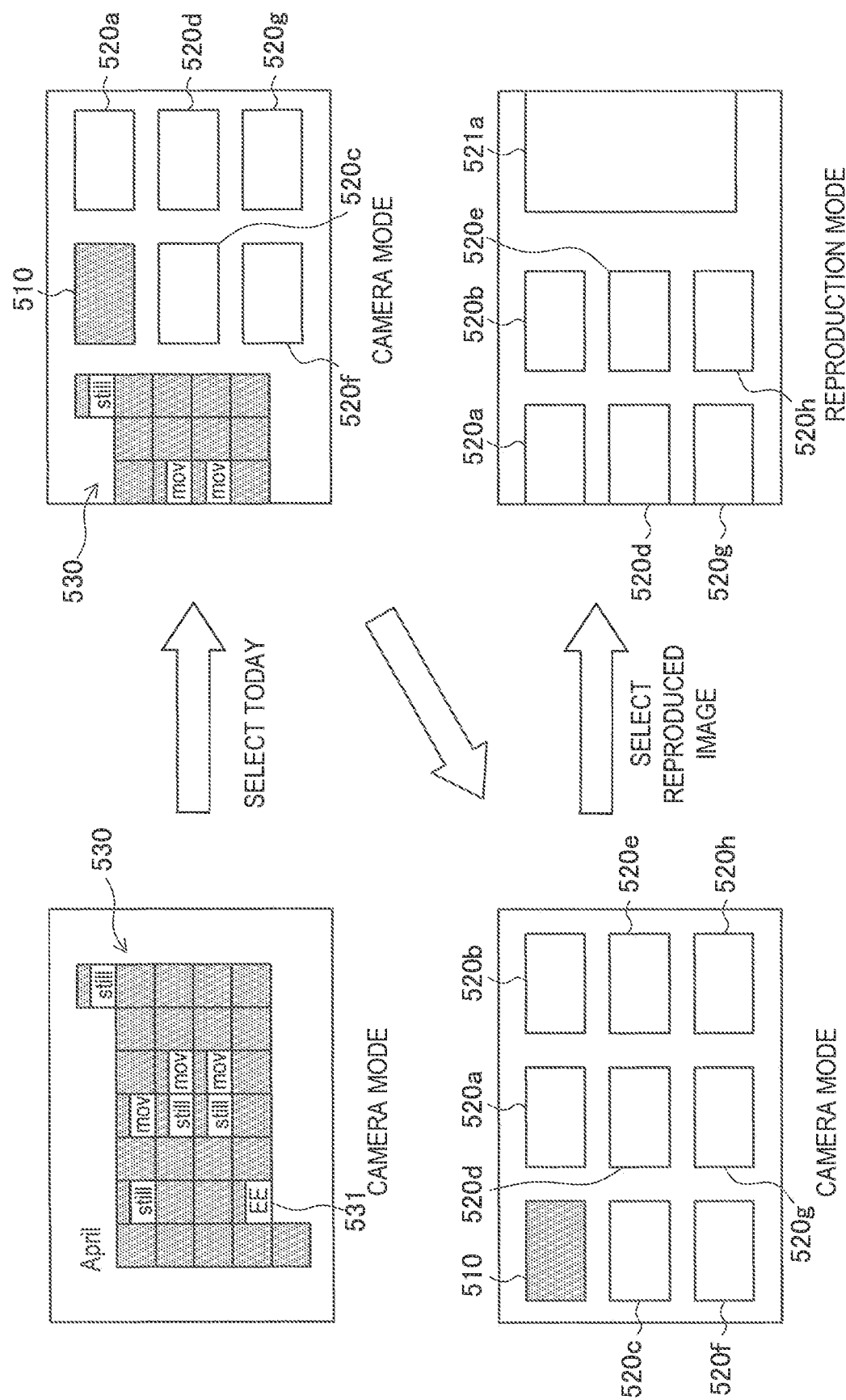
FIG. 10 is a diagram for describing an example of display according to a second embodiment of the present disclosure.

FIG. 10 is a diagram for describing a display example of the second embodiment of the present disclosure. Referring to FIG. 10, the display control unit 215 causes the display unit 217 to display calendar display 530 of images. The calendar display 530 is display in which the reproduced images recorded in the non-volatile storage unit 301 are arranged according to each date based on the photographing time. In the illustrated example, an EE image 531 is displayed in a region corresponding to the today's date of the calendar display 530 of the images.

The calendar display 530 of the images is used, for example, when the reproduced images are displayed as thumbnails. A still image or a moving image displayed in the region of each date can be, for example, a representative image of the date. On the other hand, the EE image 531 can be displayed in the region corresponding to the today's date and imaging can also be performed using the EE image 531.

Here, when a region corresponding to the today's date including the EE image 531 is selected through a user's operation, the entire display is scrolled left and an image group corresponding to the today's date is displayed. The image group includes, for example, an EE image 510 and reproduced images 520a to 520h. The reproduced images 520a to 520h can be still images or moving images of which the photographing dates are today. In this state, since the EE image 510 is included in the display region, the power control unit 203 allows the mode of the power supply to the imaging unit 135 to remain to be the camera mode.

When the reproduced image 520a is selected through a user's operation from the displayed image group, the entire display is further scrolled left and an expanded reproduced image 521a is displayed. Accordingly, the EE image 410 and the reproduced images 520a to 520h go out sequentially from the left lend of the display region.

In this case, the display of the display unit 217 by the display control unit 215 can be said to shift from the first display mode in which the EE image 510 and the reproduced images 520a to 520h are displayed to the second display mode in which the EE image 510 is not displayed and the reproduced image 521a is displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the EE image 510 is scrolled with the display of the expanded reproduced image 521a and the entire EE image 510 goes out from the left end of the display region.

In the foregoing example, the power control unit 203 does not necessarily control the power supply when the entire EE image 510 goes out from the display region. For example, the power control unit 203 may control the power supply when a predetermined ratio or more of the EE image 510 goes out from the display region and the content of the EE image 510 is substantially not viewable in the display region.

Modification Example

Figure 11:
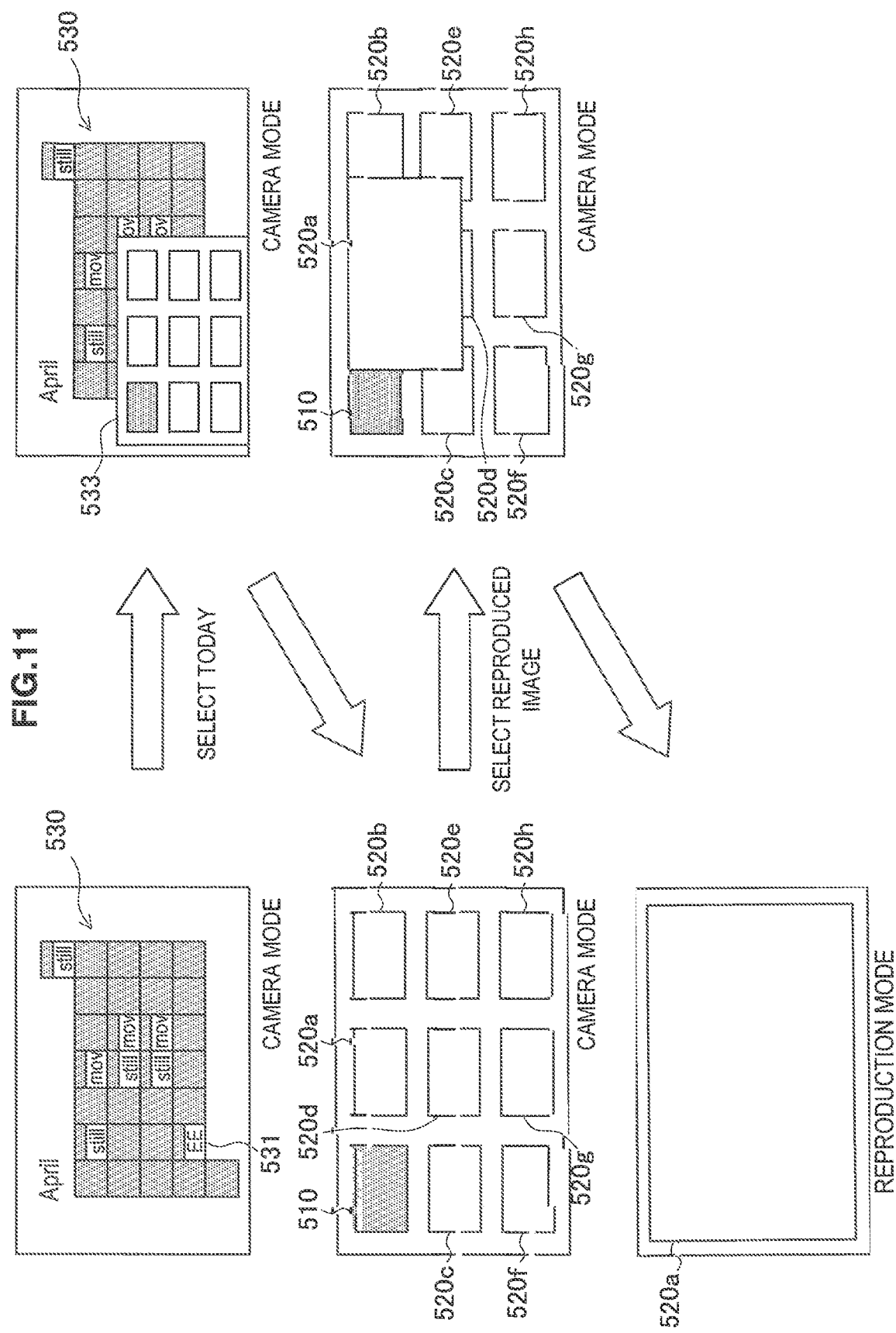
FIG. 11 is a diagram for describing an example of display according to a modification example of the second embodiment of the present disclosure.

FIG. 11 is a diagram for describing an example of display according to a modification example of the second embodiment of the present disclosure. Referring to FIG. 11, the display control unit 215 causes the display unit 217 to display calendar display 530 of the images. Here, when a region corresponding to the today's date including the EE image 531 is selected through a user's operation, an image group window 533 corresponding to the today's date is displayed and gradually expanded. When the image group window 533 is expanded up to a size corresponding to the entire display region, the display of the display unit 217 becomes a state in which the same image group as that of the example of FIG. 10 described above is displayed. The image group includes an EE image 510 and reproduced images 520a to 520h. In this state, since the EE image 510 is included in the display region, the power control unit 203 allows the mode of the power supply to the imaging unit 135 to remain to be the camera mode.

Here, when the reproduced image 520a is selected from among the displayed image group through a user's operation, display of the reproduced image 520a is expanded. Accordingly, the display of the EE images 510 and the other reproduced images 520b to 520h is hidden on the posterior side of the reproduced image 520a. Such display is realized, for example, by separating a screen displaying the reproduced images 520a from a screen displaying the EE image 510 and the reproduced images 520b to 520h and superimposing the screens transparently.

In this case, the display of the display unit 217 by the display control unit 215 can be said to shift from the first display mode in which the EE image 510 and the reproduced images 520a to 520h are displayed to the second display mode in which the EE image 510 is not displayed and the reproduced image 520a is displayed.

In the shift between the display modes by the display control unit 215, the power control unit 203 controls the power supply to the imaging unit 135. The power control unit 203 changes the mode of the power supply to the imaging unit 135 from the camera mode to the reproduction mode when the entire EE image 510 is shielded and the EE image does not included in the display region.

In the second embodiment of the present disclosure described above, the control of the power supply to the imaging unit can be combined depending on presence or absence of the calendar display of the images including the EE image and the display of the EE image. Thus, while maintaining visibility and operability of the images using the calendar display, it is possible to reduce the unnecessary power supply.

3-3. Third Embodiment

Next, a third embodiment of the present disclosure will be described with reference to FIGS. 12 and 13.

Figure 12:
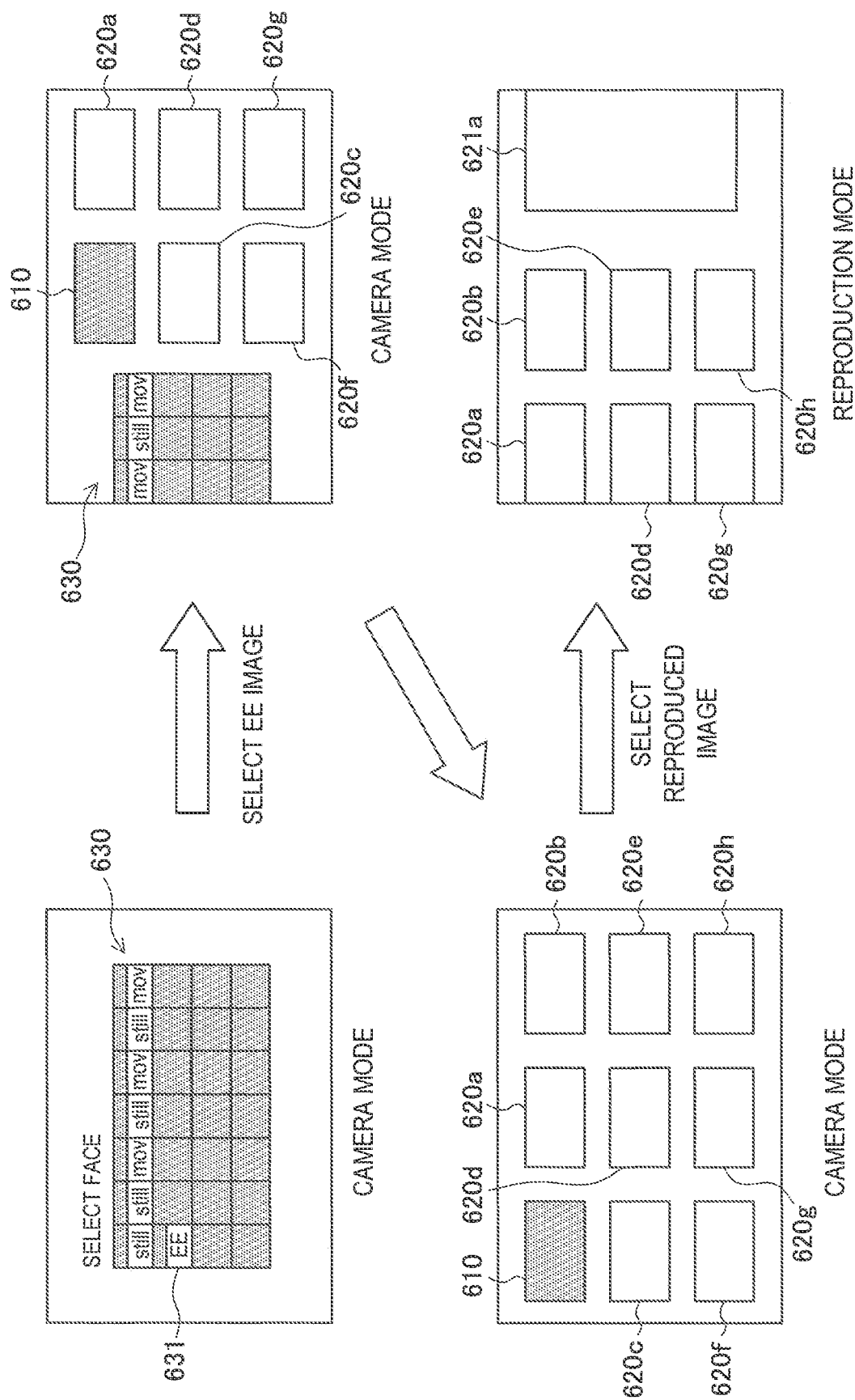
FIG. 12 is a diagram for describing an example of display according to a third embodiment of the present disclosure.

FIG. 12 is a diagram for describing an example of display according to the third embodiment of the present disclosure. Referring to FIG. 12, the display control unit 215 causes the display unit 217 to display facial attribute display 630 of images. The facial attribute display 630 is display in which reproduced images recorded in the non-volatile storage unit 301 are arranged for each face included as a subject in the reproduced images. In the illustrated example, an EE image 631 is displayed in a region corresponding to an image group in which the same face as the face included as the subject in the EE image is included.

The facial attribute display 630 is used, for example, when the reproduced images are displayed as thumbnails. A still image or a moving image displayed in the region of each face can be, for example, a representative image in which each face is included as the subject. On the other hand, the EE image 631 can be displayed in the region corresponding to the currently pictured face and imaging can also be performed using the EE image 631.

Here, when a region corresponding to the current face including the EE image 631 is selected through a user's operation, the entire display is scrolled left and an image group including the same face as the EE image is displayed. The image group includes, for example, an EE image 610 and reproduced images 620a to 620h. The reproduced images 620a to 620h can be still images or moving images including the same face as the face included as the subject in the EE image 610. In this state, since the EE image 610 is included in the display region, the power control unit 203 allows the mode of the power supply to the imaging unit 135 to remain to be the camera mode.

When the reproduced image 620a is selected through a user's operation from the displayed image group, the entire display is further scrolled left and an expanded reproduced image 621a is displayed. Accordingly, the EE image 410 and the reproduced images 620a to 620h go out sequentially from the left lend of the display region.

In this case, the display of the display unit 217 by the display control unit 215 can be said to shift from the first display mode in which the EE image 610 and the reproduced images 620a to 620h are displayed to the second display mode in which the EE image 610 is not displayed and the reproduced image 621a is displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the EE image 610 is scrolled with the display of the expanded reproduced image 621a and the entire EE image 610 goes out from the left end of the display region.

In the foregoing example, the power control unit 203 does not necessarily control the power supply when the entire EE image 610 goes out from the display region. For example, the power control unit 203 may control the power supply when a predetermined ratio or more of the EE image 610 goes out from the display region and the content of the EE image 610 is substantially not viewable in the display region.

Figure 13:
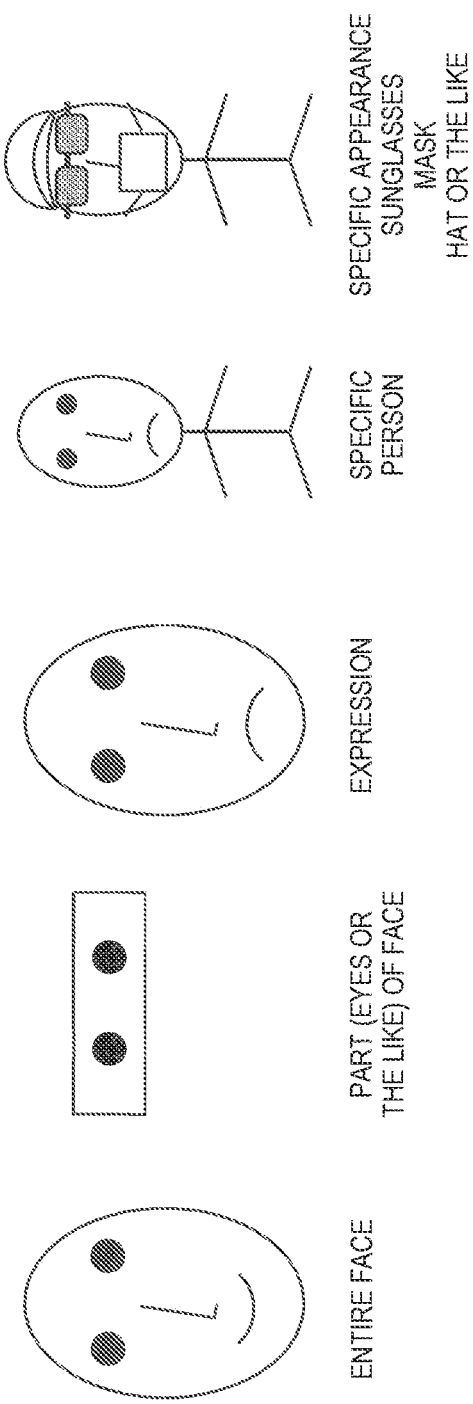
FIG. 13 is a diagram for describing an example of attribute classification of an image according to a third embodiment of the present disclosure.

FIG. 13 is a diagram for describing an example of attribute classification of images according to the third embodiment of the present disclosure. Referring to FIG. 13, in the embodiment, the reproduced images are classified according to the entire face, a part (eyes or the like) of the face, an expression, a specific person, a specific appearance (sunglasses, a mask, or a hat), or the like. Accordingly, for example, still images and moving images having the common attribute can be displayed in the same region in the facial attribute display 630. The still images and the moving images having the common attribute to the EE image can be displayed as the reproduced images 620a to 620h along with the EE image 610 when the EE image 631 is selected in the facial attribute display 630.

In the third embodiment of the present disclosure described above, the control of the power supply to the imaging unit can be combined depending on presence or absence of the facial attribute display of the images including the EE image and the display of the EE image. Thus, while maintaining visibility and operability of the images using the facial attribute display, it is possible to reduce the unnecessary power supply.

3-4. Fourth Embodiment

Next, a fourth embodiment of the present disclosure will be described with reference to FIG. 14.

Figure 14:
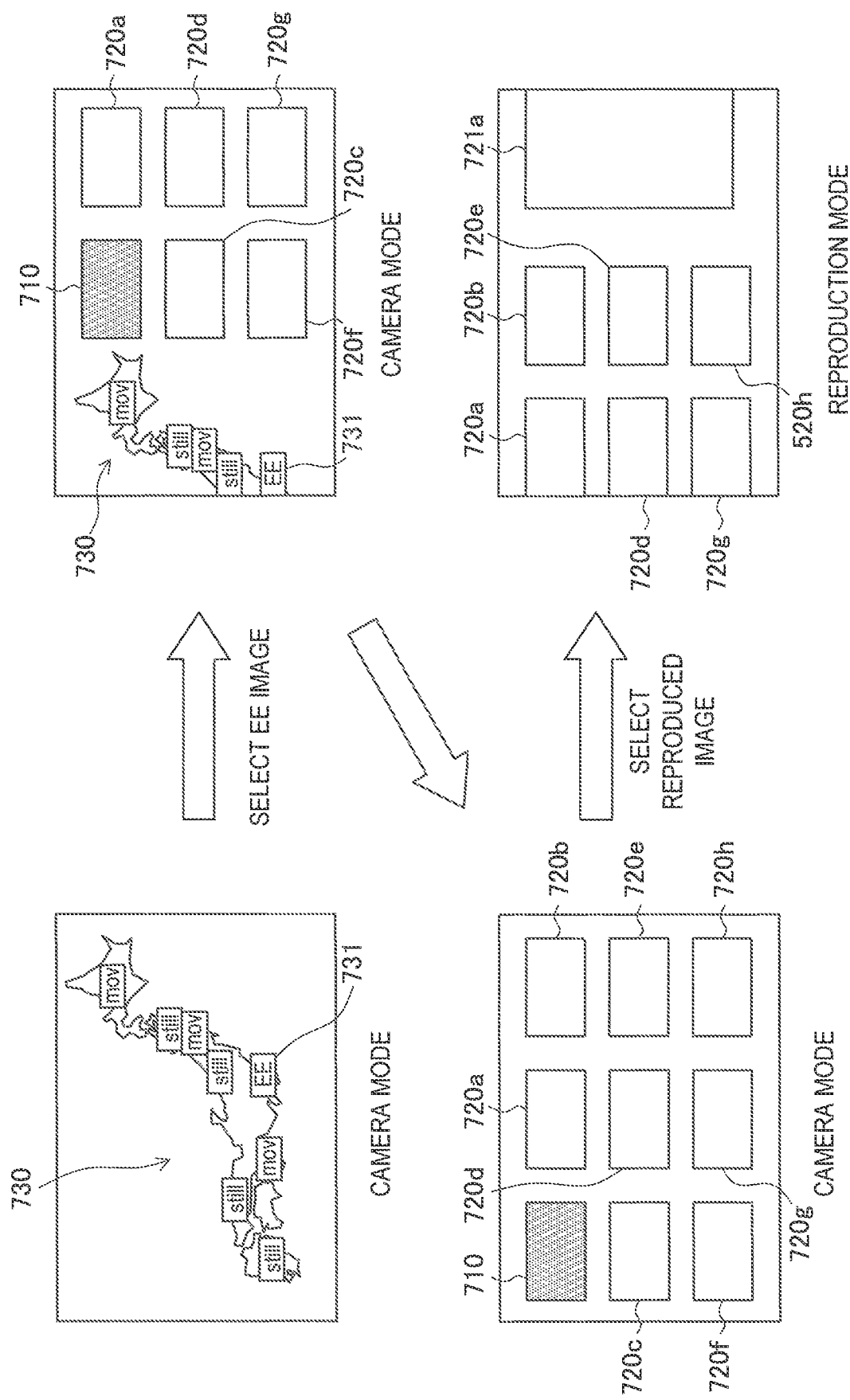
FIG. 14 is a diagram for describing an example of display according to a fourth embodiment of the present disclosure.

FIG. 14 is a diagram for describing an example of display according to the fourth embodiment of the present disclosure. Referring to FIG. 14, the display control unit 215 causes the display unit 217 to display position attribute display 730 of images. The position attribute display 730 is display in which reproduced images recorded in the nonvolatile storage unit 301 are arranged at each location based on photographing positions. In the illustrated example, the reproduced images are displayed at positions corresponding to locations on a map. An EE image 731 is displayed at the position corresponding to the current location on the map.

The position attribute display 730 of the images is used, for example, when the reproduced images are displayed as thumbnails. A still image or a moving image displayed in the region of each location can be, for example, a representative image of the location. On the other hand, the EE image 731 can be displayed in the position corresponding to the current location and imaging can also be performed using the EE image 731.

Here, when the EE image 731 is selected through a user's operation, the entire display is scrolled left and an image group corresponding to the current location is displayed. The image group includes, for example, an EE image 710 and reproduced images 720a to 720h. The reproduced images 720a to 720h can be still images or moving images of which the photographing position is close to the current location. In this state, since the EE image 710 is included in the display region, the power control unit 203 allows the mode of the power supply to the imaging unit 135 to remain to be the camera mode.

When the reproduced image 720a is selected through a user's operation from the displayed image group, the entire display is further scrolled left and an expanded reproduced image 721a is displayed. Accordingly, the EE image 410 and the reproduced images 720a to 720h go out sequentially from the left lend of the display region.

In this case, the display of the display unit 217 by the display control unit 215 can be said to shift from the first display mode in which the EE image 710 and the reproduced images 720a to 720h are displayed to the second display mode in which the EE image 710 is not displayed and the reproduced image 721a is displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the EE image 710 is scrolled with the display of the expanded reproduced image 721a and the entire EE image 510 goes out from the left end of the display region.

In the foregoing example, the power control unit 203 does not necessarily control the power supply when the entire EE image 710 goes out from the display region. For example, the power control unit 203 may control the power supply when a predetermined ratio or more of the EE image 710 goes out from the display region and the content of the EE image 710 is substantially not viewable in the display region.

In the fourth embodiment of the present disclosure described above, the control of the power supply to the imaging unit can be combined depending on presence or absence of the position attribute display of the images including the EE image and the display of the EE image. Thus, while maintaining visibility and operability of the images using the position attribute display, it is possible to reduce the unnecessary power supply.

3-5. Fifth Embodiment

Next, a fifth embodiment of the present disclosure will be described with reference to FIGS. 15 to 18.

Figure 15:
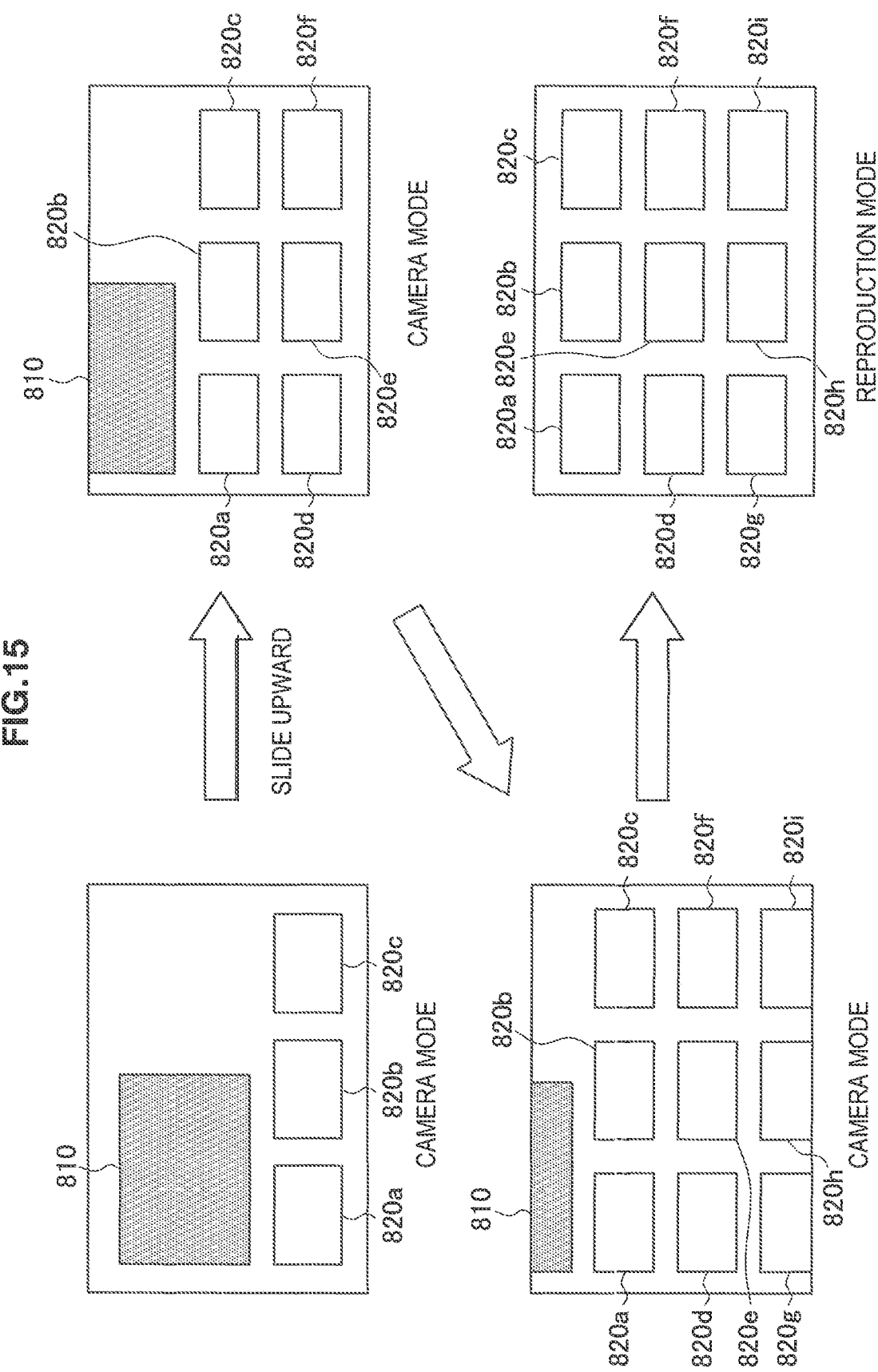
FIG. 15 is a diagram for describing an example of display according to a fifth embodiment of the present disclosure.

FIG. 15 is a diagram for describing an example of display according to the fifth embodiment of the present disclosure. Referring to FIG. 15, the display control unit 215 causes the display unit 217 to arrange and display an EE image 810 and reproduced images 820a to 820c. Here, when a screen is slid upward through a user's operation, the entire display is scrolled up. Accordingly, the EE image 810 goes out from the upper end of the display region. On the other hand, reproduced images 820d to 820i newly appear from the lower end of the display region.

In this case, the display of the display unit 217 by the display control unit 215 can be said to shift from the first display mode in which the EE image 810 and the reproduced images 820a to 820c are displayed to the second display mode in which the EE image 810 is not displayed and the reproduced images 820a to 820i are displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the entire EE image 810 goes out from the upper end of the display region with the scroll of the entire display.

In the foregoing example, the power control unit 203 does not necessarily control the power supply when the entire EE image 810 goes out from the display region. For example, the power control unit 203 may control the power supply when a predetermined ratio or more of the EE image 810 goes out from the display region and the content of the EE image 810 is substantially not viewable in the display region.

Figure 16:
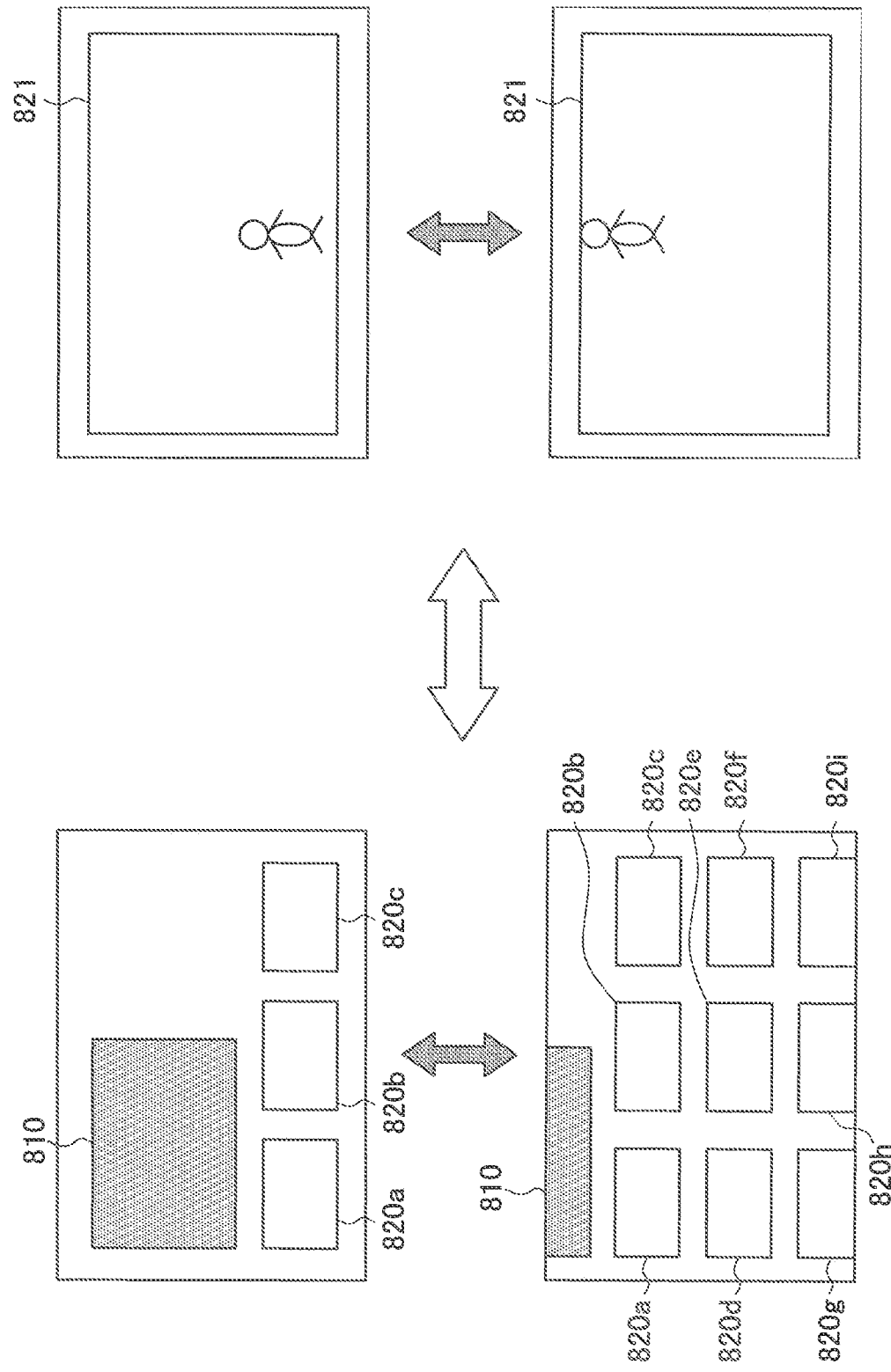
FIG. 16 is a diagram for describing a scroll operation according to a fifth embodiment of the present disclosure.

FIG. 16 is a diagram for describing a scroll operation in the fifth embodiment of the present disclosure. Referring to FIG. 16, in the embodiment, for example, different results are obtained between a scroll operation when the EE image 810 and the reproduced images 820a to 820i are displayed and a scroll operation when the single reproduced image 821 is displayed. In the former case, for example, as described in the example of FIG. 15 described above, the entire display including the plurality of images is scrolled and the power supply to the imaging unit 135 is controlled depending on whether the EE image 810 is included in the display region. On the other hand, in the latter case, for example, the displayed reproduced image 821 is expanded or contracted or a portion zoomed in and displayed in the reproduced image 821 is moved in a scroll direction.

A difference in the function by the scroll operation can be realized, for example, by setting a predetermined display mode in the display of the display unit 217 by the display control unit 215 and allocating the scroll operation to correspond to each display mode, as in the foregoing example of the power control.

First Modification Example

Figure 17:
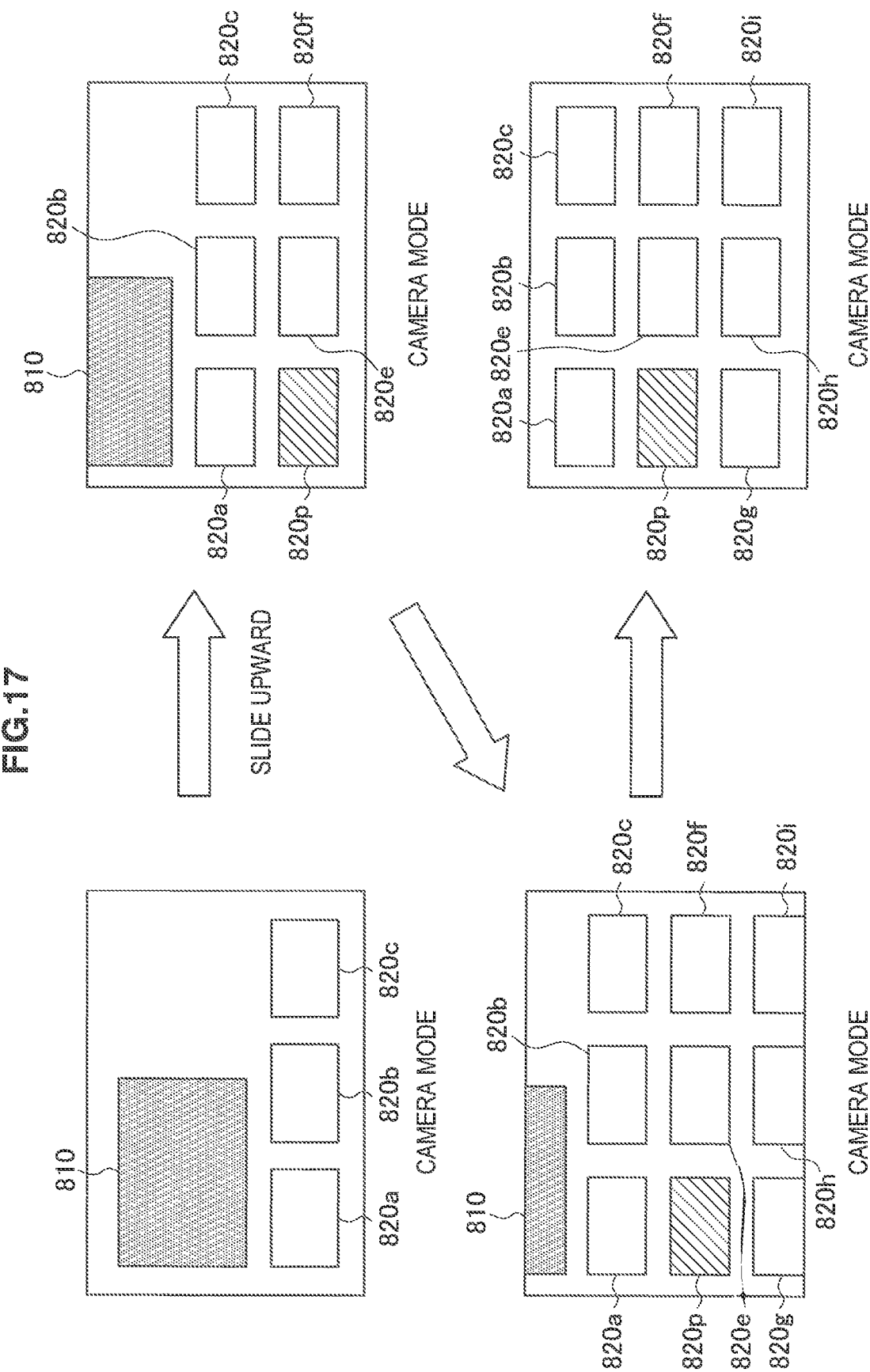
FIG. 17 is a diagram for describing an example of display according to a first modification example of the fifth embodiment of the present disclosure.

FIG. 17 is a diagram for describing an example of display according to a first modification of the fifth embodiment of the present disclosure. Referring to FIG. 17, the display control unit 215 causes the display unit 217 to arrange and display an EE image 810 and reproduced images 820a to 820c. Here, when a screen is slid upward through a user's operation, the entire display is scrolled up. Accordingly, the EE image 810 goes out from the upper end of the display region. On the other hand, reproduced image 820p and reproduced images 820e to 820i newly appear from the lower end of the display region.

Here, a reproduced image 820p is a reproduced image having a common attribute to the EE image 810. The common attribute between the reproduced image 820p and the EE image 810 can be, for example, an attribute regarding a photographing time, a photographing position, or a subject, as described in the foregoing embodiment. The reproduced image 820p and the EE image 810 may have only one common attribute or a plurality of common attributes.

In the modification example, the EE-relevant image includes the EE image and the reproduced images having the common attribute to that of the EE image, unlike the foregoing example of FIG. 15. In the illustrated example, the display of the display unit 217 by the display control unit 215 is changed from a state in which the EE image 810 and the reproduced images 820a to 820c are displayed to a state in which the reproduced image 820p is displayed without the display of the EE image 810 and the reproduced images 820a to 820c and 820e to 820i are further displayed via a state in which both of the EE image 810 and the reproduced image 820p are displayed.

According to the foregoing definition of the EE-relevant image, the display mode can be said to remain to be the first display mode in which the EE-relevant image is displayed through the change in the display state. Accordingly, irrespective of the foregoing change in the display, the power control unit 203 allows the mode of the power supply to the imaging unit 135 to remain to be the camera mode.

Thereafter, when the reproduced image 820p also goes out from the display region through a new user's operation and the other reproduced images having the common attribute to the EE image 810 are not displayed, the power control unit 203 switches the mode of the power supply to the imaging unit 135 from the camera mode to the reproduction mode. Acquisition of the attribute of the EE image when the mode of the power supply to the imaging unit 135 becomes the reproduction mode will be described below.

When the EE image 810 is not included in the display region despite the fact that the user scrolls up the entire display and the reproduced image, such as the reproduced image 820p, having the common attribute to the EE image 810 is further displayed, a probability of the user displaying the EE image 810 again and performing the imaging is higher than when the displayed reproduced image has no common attribute to the EE image 810. Accordingly, while the reproduced image 820p is displayed, it is desirable to maintain the power supply to the imaging unit 135, display the EE image 810 again, and perform the imaging.

Second Modification Example

Figure 18:
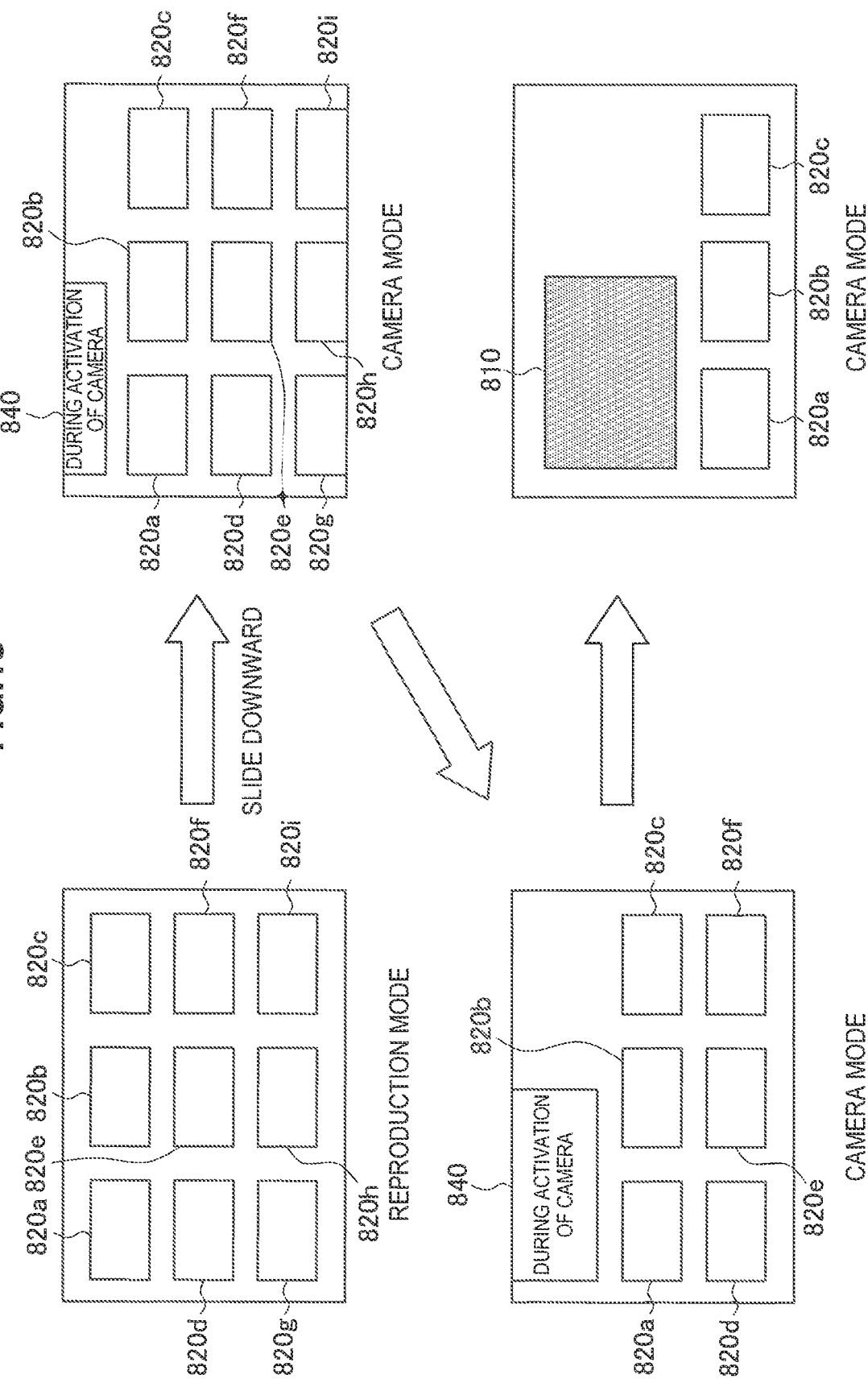
FIG. 18 is a diagram for describing an example of display according to a second modification example of the fifth embodiment of the present disclosure.

FIG. 18 is a diagram for describing an example of display in a second modification example of the fifth embodiment of the present disclosure. Referring to FIG. 18, the display control unit 215 causes the display unit 217 to display reproduced images 820a to 820i. This state is exactly the same as the state in which the change in the display illustrated in FIG. 15 described above ends. Here, when the screen is slid downward through a user's operation, the entire display is scrolled down. Accordingly, the reproduced images 820d to 820i sequentially go out from the lower end of the display region. On the other hand, an alternative EE image 840 newly appears from the upper end of the display region.

As in the other foregoing embodiments, even in the example of FIG. 15 described above, the mode of the power supply to the imaging unit 135 is changed from the reproduction mode to the camera mode by the power control unit 203, for example, when the EE image 810 appears again from the upper end of the display region by the scroll of the display. However, even when the mode of the power supply is switched to resume the power supply to each unit of the imaging unit 135, it takes a time to activate each unit. Therefore, the EE image 810 is not displayed immediately in some cases.

In this case, the configuration of the modification example can be applied. When the EE image 810 is not displayed due to a certain reason, e.g., non-acquisition of the image immediately after the power supply to the imaging unit 135 resumes, despite the fact that the region originally displaying the EE image 810 is included in the display region, the alternative EE image 840 can be displayed instead. When the power supply resumes, each unit of the imaging unit 135 is activated, and the images can be acquired, the EE image 810 is displayed instead of the alternative EE image 840.

That is, in the modification example, the EE-relevant image includes the EE image and the alternative EE image which is an image displayed as an alternative of the EE image. In the illustrated example, the display of the display unit 217 by the display control unit 215 is changed from a state in which none of the EE image 810 and the alternative EE image 840 is displayed and the reproduced images 820a to 820i are displayed to a state in which the EE image 810 and the reproduced images 820a to 820c are displayed via a state in which the alternative EE image 840 is displayed as an alternative of the EE image 810.

According to the foregoing definition of the EE-relevant image, the display mode can be said to cause the display mode, through the change in the display state, to shift from the second display mode in which the EE-relevant image is not displayed and the first display mode in which the EE-relevant image is displayed when the display of the alternative EE image 840 starts. While the power supply to the imaging unit 135 stops, the actual EE image is not acquired. Therefore, as in the modification example, the shift between the display modes can be appropriately defined by including the image displayed as the alternative of the EE image in the EE-relevant image.

In the fifth embodiment of the present disclosure described above, even when the display of the images is changed through a slide or scroll action on the screen as in the case in which the display of the images is changed through expansion or contraction by selecting the image, the power supply to the imaging unit can be controlled depending on presence or absence of the display of the EE-relevant image. Thus, it is possible to reduce the unnecessary power supply while ensuring the operability of the user.

3-6. Sixth Embodiment

Next, a sixth embodiment of the present disclosure will be described with reference to FIG. 19.

Figure 19:
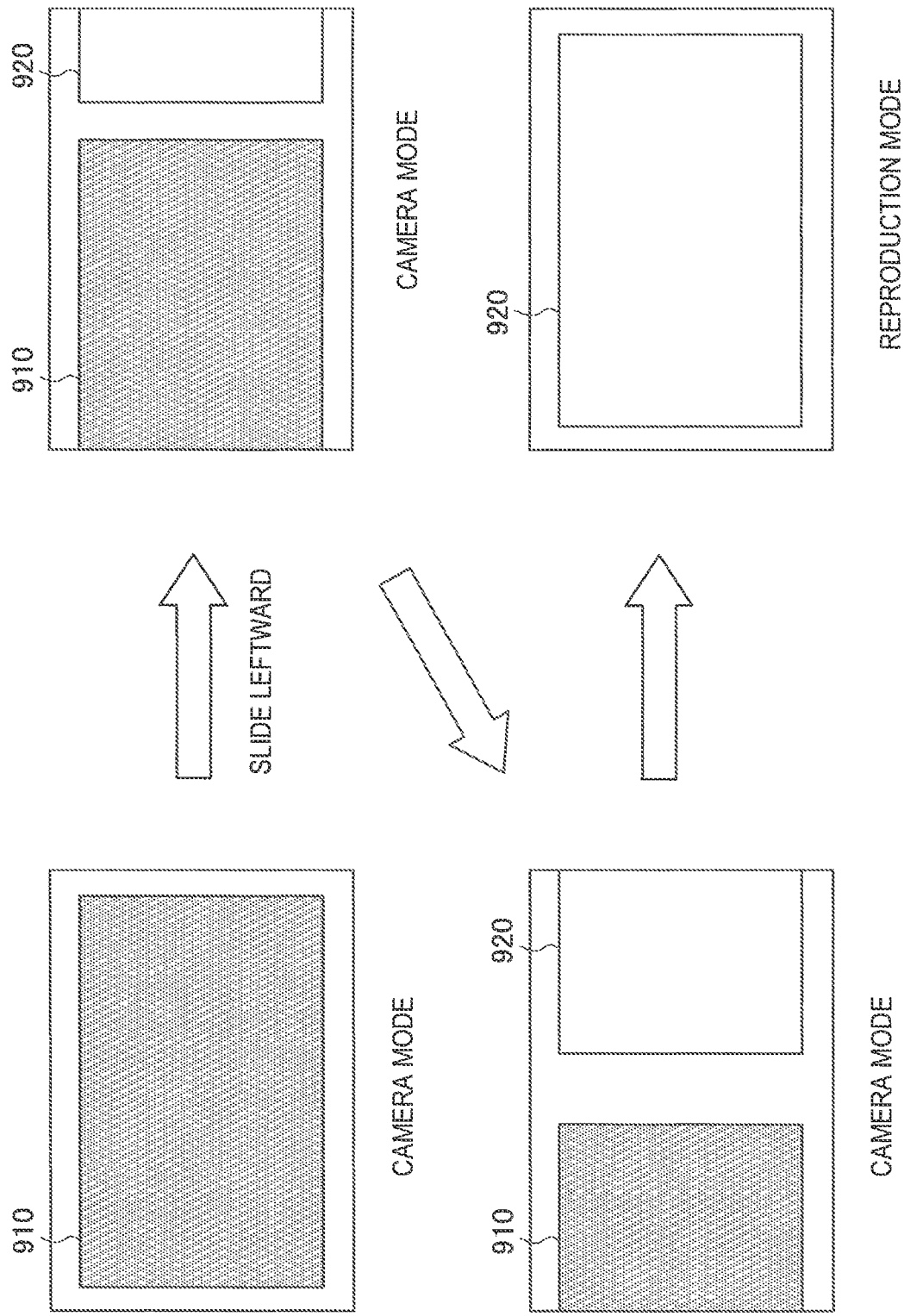
FIG. 19 is a diagram for describing an example of display according to a sixth embodiment of the present disclosure.

FIG. 19 is a diagram for describing an example of display according to the sixth embodiment of the present disclosure. Referring to FIG. 19, the display control unit 215 causes the display unit 217 to display an EE image 910. Here, when a screen is slid leftward through a user's operation, the entire display is scrolled left. Accordingly, a reproduced image 920 appears from the right end of the display region. On the other hand, the EE image 910 gradually goes out from the left end of the display region and the entire EE image 910 to be out from the display region before long. At this time, the reproduced image 920 is displayed on the display unit 217.

In this case, the display of the display unit 217 by the display control unit 215 can be said to shift from a mode in which the EE image 910 is displayed to the first display mode in which the EE image 910 and the reproduced image 920 are displayed and the second display mode in which the EE image 910 is not displayed and the reproduced image 920 is displayed.

During the foregoing shift between the display modes, the power control unit 203 controls the power supply to the imaging unit 135 in the shift from the first display mode to the second display mode. More specifically, the power control unit 203 changes the mode of the power supply to the imaging unit 135 from the camera mode to the reproduction mode when the entire EE image 910 goes out from the left end of the display region with the scroll of the entire display.

In the foregoing example, the power control unit 203 does not necessarily control the power supply when the entire EE image 910 goes out from the display region. For example, the power control unit 203 may control the power supply when a predetermined ratio or more of the EE image 910 goes out from the display region and the content of the EE image 910 is substantially not viewable in the display region.

In the foregoing example, the initial display mode, i.e., the mode in which the reproduced image 920 is not displayed and the EE image 910 is displayed, is not defined as the first or second mode, but the mode of the power supply to the imaging unit 135 is set as the camera mode due to the state in which the EE image 910 is mainly displayed.

In the sixth embodiment of the present disclosure described above, even when the display of the images is changed through the slide or scroll action in the left or right direction on the screen, the power supply to the imaging unit 135 is controlled depending on the present or absence of the display of the EE-relevant image, as in the case of the upper or lower direction. Thus, it is possible to reduce the unnecessary power supply while ensuring the operability of the user.

3-7. Seventh Embodiment

Next, a seventh embodiment of the present disclosure will be described with reference to FIG. 20.

Figure 20:
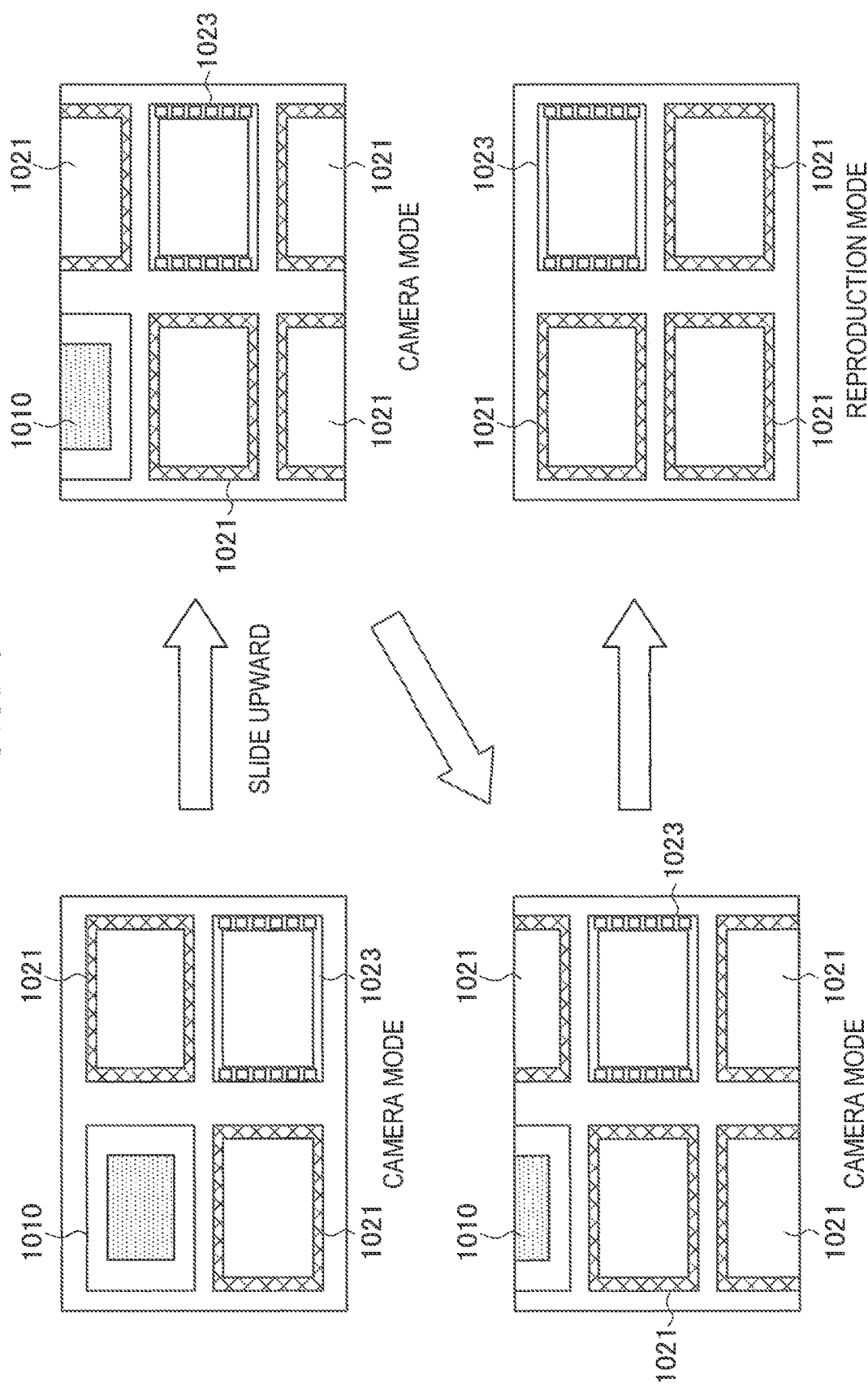
FIG. 20 is a diagram for describing an example of display according to a seventh embodiment of the present disclosure.

FIG. 20 is a diagram for describing an example of display according to the seventh embodiment of the present disclosure. Referring to FIG. 20, the display control unit 215 causes the display unit 217 to arrange and display an EE image 1010, reproduced still images 1021, and a reproduced moving image 1023. Here, when a screen is slid upward through a user's operation, the entire display is scrolled up. Accordingly, parts of the EE image 1010 and the reproduced still image 1021 go out from the upper end of the display region. On the other hand, new reproduced still images 1021 appear from the lower end of the display region.

In this case, the display of the display unit 217 by the display control unit 215 can be said to shift from the first display mode in which the EE image 1010, the reproduced still images 1021, and the reproduced moving image 1023 are displayed to the second mode in which the EE image 1010 is not displayed and the reproduced still images 1021 and the reproduced moving image 1023 are displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the entire EE image 1010 goes out from the upper end of the display region with the scroll of the entire display.

In the foregoing example, the power control unit 203 does not necessarily control the power supply when the entire EE image 1010 goes out from the display region. For example, the power control unit 203 may control the power supply when a predetermined ratio or more of the EE image 1010 goes out from the display region and the content of the EE image 1010 is substantially not viewable in the display region.

The embodiment is different from the other foregoing embodiments in that the EE image 1010, the reproduced still images 1021, and the reproduced moving image 1023 are displayed along with different display ranges. For example, the EE image 1010 is displayed along with a display frame imitating a camera. The reproduced still image 1021 is displayed along with a display range imitating the edge of a silver-halide photo. The reproduced moving image 1023 is displayed along with a display range imitating a movie film.

Thus, in the embodiment, even when the EE image 1010, the reproduced still images 1021, and the reproduced moving image 1023 are mixed and displayed, the user can easily recognize the kinds of images. When the user easily comprehends that the EE image 1010 is displayed along with the reproduced still image 1021 or the reproduced moving image 1023, a probability of the imaging performed during the display of the EE image 1010 is considered to be higher. Therefore, as described above, the control of the power supply to the imaging unit 135 by the power control unit 203 is effective.

3-8. Eighth Embodiment

Next, an eighth embodiment of the present disclosure will be described with reference to FIGS. 21 and 22.

Figure 21:
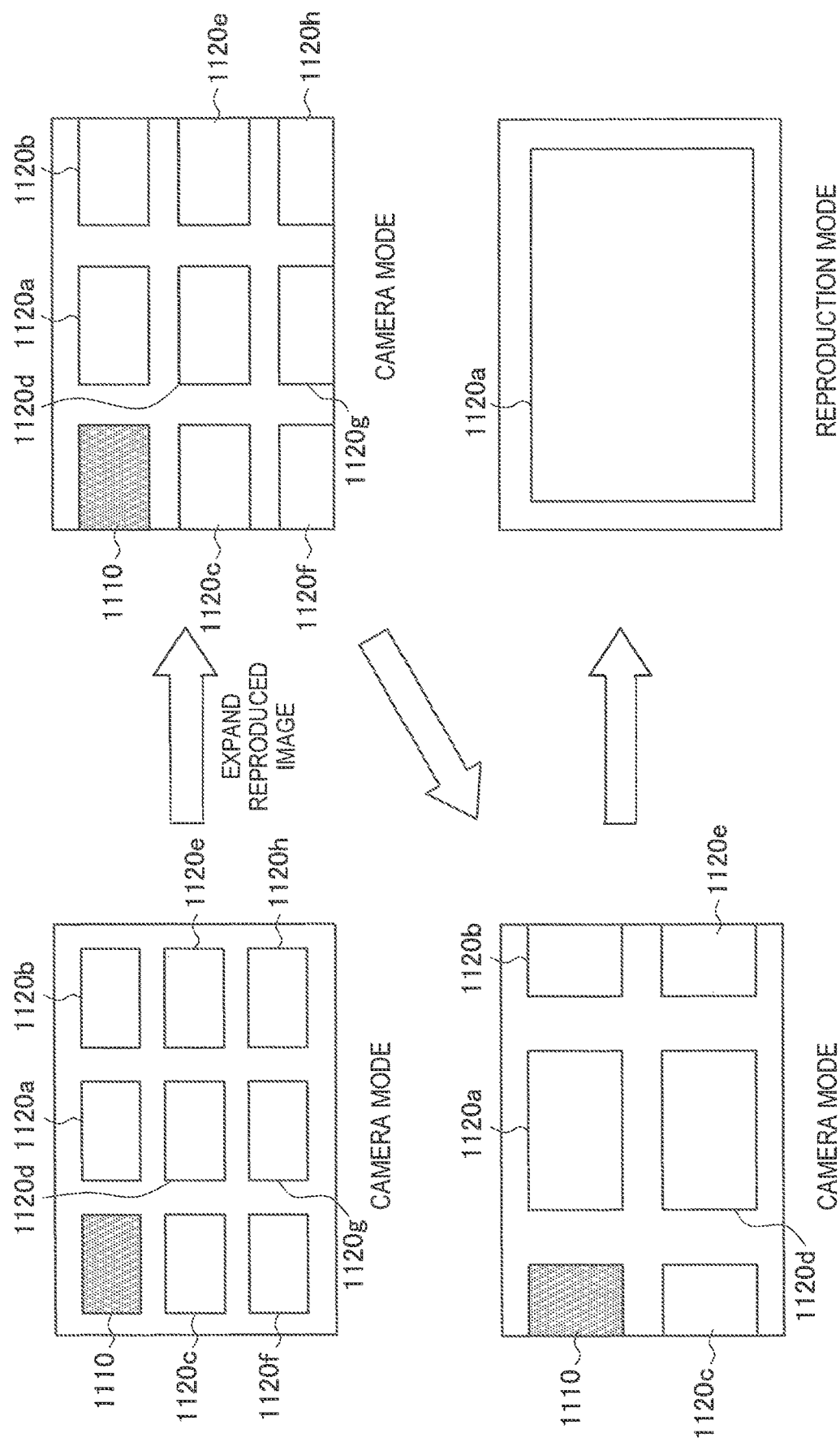
FIG. 21 is a diagram for describing a first example of display according to an eighth embodiment of the present disclosure.

FIG. 21 is a diagram for describing a first example of display according to the eighth embodiment of the present disclosure. Referring to FIG. 21, the display control unit 215 causes the display unit 217 to arrange and display an EE image 1110 and reproduced images 1120*a* to 1120*h*. Here, when the reproduced image 1120*a* is expanded through a user's operation, the display of the entire image group including the display of the reproduced image 420*a* is expanded centering on the reproduced image 420*a*. Accordingly, the display of the EE image 1110 and the other reproduced images 420*b* to 420*h* sequentially go out from the ends of the display region. Finally, the expanded reproduced image 1120*a* is solely displayed on the display unit 217.

In this case, the display of the display unit 217 by the display control unit 215 can be said to shift from the first display mode in which the EE image 1110 and the reproduced images 1120*a* to 1120*h* are displayed to the second display mode in which the EE image 1110 is not displayed and the reproduced image 1120*a* is displayed.

In the shift between the display modes by the display control unit 215, the power control unit 203 controls the power supply to the imaging unit 135. More specifically, the power control unit 203 changes the mode of the power supply to the imaging unit 135 from the camera mode to the reproduction mode when the entire EE image 1110 goes out from the end of the display region with the expansion of the display of the entire image group.

In the foregoing example, the power control unit 203 does not necessarily control the power supply when the entire EE image 1110 goes out from the display region. For example, the power control unit 203 may control the power supply when a predetermined ratio or more of the EE image 1110 goes out from the display region and the content of the EE image 1110 is substantially not viewable in the display region.

Figure 22:
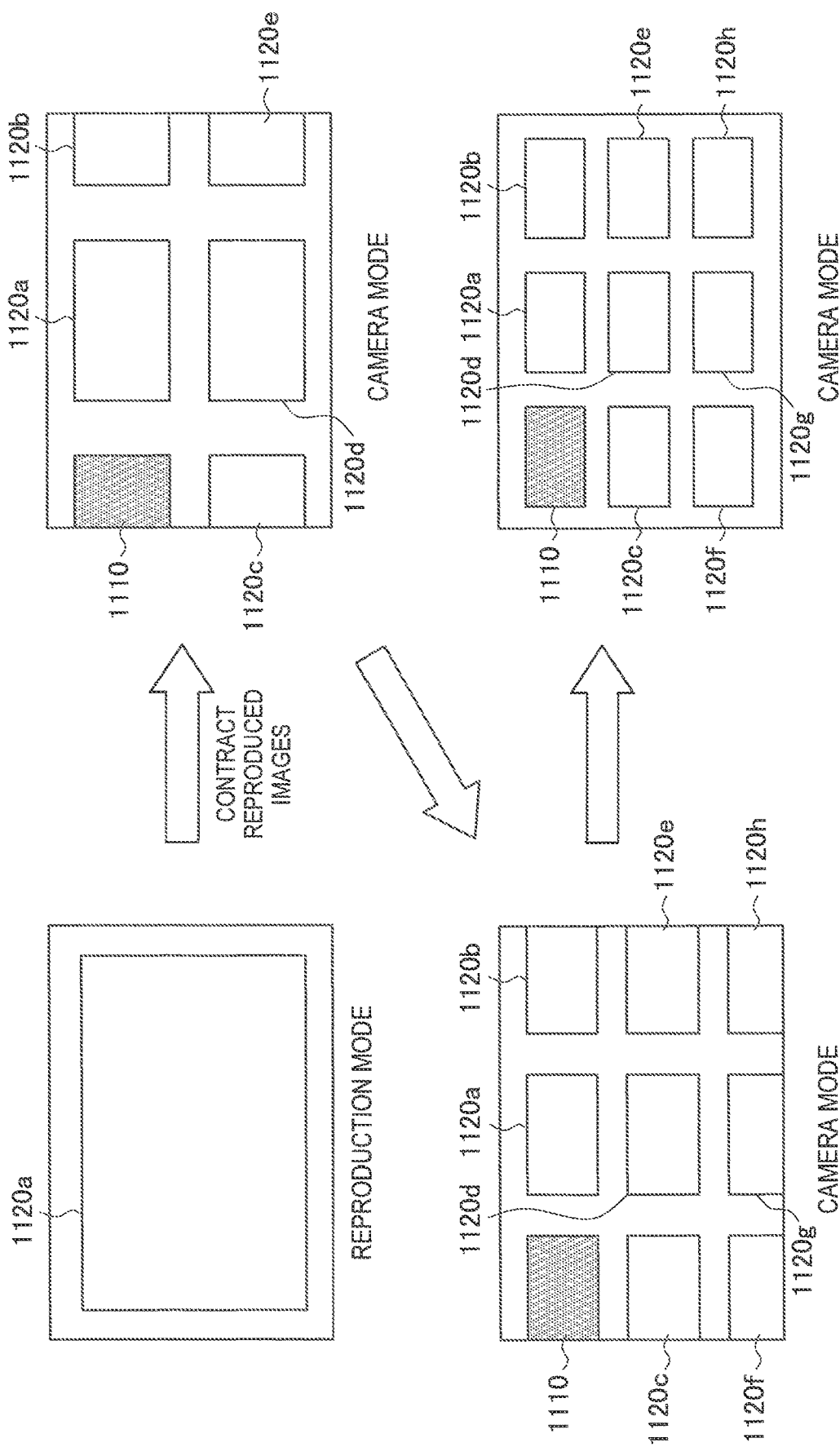
FIG. 22 is a diagram for describing a second example of display according to the eighth embodiment of the present disclosure.

FIG. 22 is a diagram for describing a second example of display according to the eighth embodiment of the present disclosure. Referring to FIG. 22, the display control unit 215 causes the display unit 217 to display the reproduced image 1120*a*. This state is exactly the same as the state in which the change in the display illustrated in FIG. 21 described above ends. Here, when the reproduced image 1120*a* is contracted through a user's operation, the display of the entire image group including the display of the reproduced image 420*a* (the images other than the reproduced image 1120*a* go out from the display region due to the change in the display illustrated in FIG. 21) is contracted centering on the reproduced image 420*a*. Accordingly, the display of the EE image 1110 and the other reproduced images 420*b* to 420*h* sequentially appears from the end of the display region. Finally, the EE image 1110 and the reproduced images 1120*a* to 1120*h* are displayed on the display unit 217.

In this case, the display of the display unit 217 by the display control unit 215 can be said to shift from the second display mode in which the EE image 1110 is not displayed and the reproduced image 1120*a* is displayed to the first display mode in which the EE image 1110 and the reproduced images 1120*a* to 1120*h* are displayed.

In the shift between the display modes by the display control unit 215, the power control unit 203 controls the power supply to the imaging unit 135. More specifically, the power control unit 203 changes the mode of the power supply to the imaging unit 135 from the reproduction mode to the camera mode when a part of the EE image 1110 appears in the display region with the expansion of the display of the entire image group.

In the foregoing example, the power control unit 203 does not necessarily control the power supply when the EE image 1110 slightly appears in the display region. For example, the power control unit 203 may control the power supply when a predetermined ratio or more of the EE image 1110 appears in the display region and the content of the EE image 1110 can be substantially viewed in the display region.

In the eighth embodiment of the present disclosure described above, even when the display of the images is changed through the expansion or contraction of the entire image group as in the case in which the display of the images is changed through expansion or contraction by selecting the image, the power supply to the imaging unit can be controlled depending on presence or absence of the display of the EE-relevant image. Thus, it is possible to reduce the unnecessary power supply while ensuring the operability of the user.

4. Embodiments Relating to Internal Processes

Next, several embodiments relating to internal processes will be described. The embodiments relate to the processes performed to realize the change in the display of the display unit exemplified in the embodiments of the foregoing display forms and the control of the power of the imaging unit performed with the change in the display. Accordingly, the embodiments can be combined with any of the embodiment of the above-described display forms.

4-1. Ninth Embodiment

First, a ninth embodiment of the present disclosure will be described with reference to FIGS. 23 to 33. The ninth embodiment of the present disclosure relates to region setting on a screen. In the foregoing embodiments, the power supply to the imaging unit 135 has been controlled according to the positional relation between the EE-relevant image and the display region of the display unit 217. The embodiment is applicable to each embodiment in which the control is performed, i.e., any of the foregoing embodiments.

Figure 23:
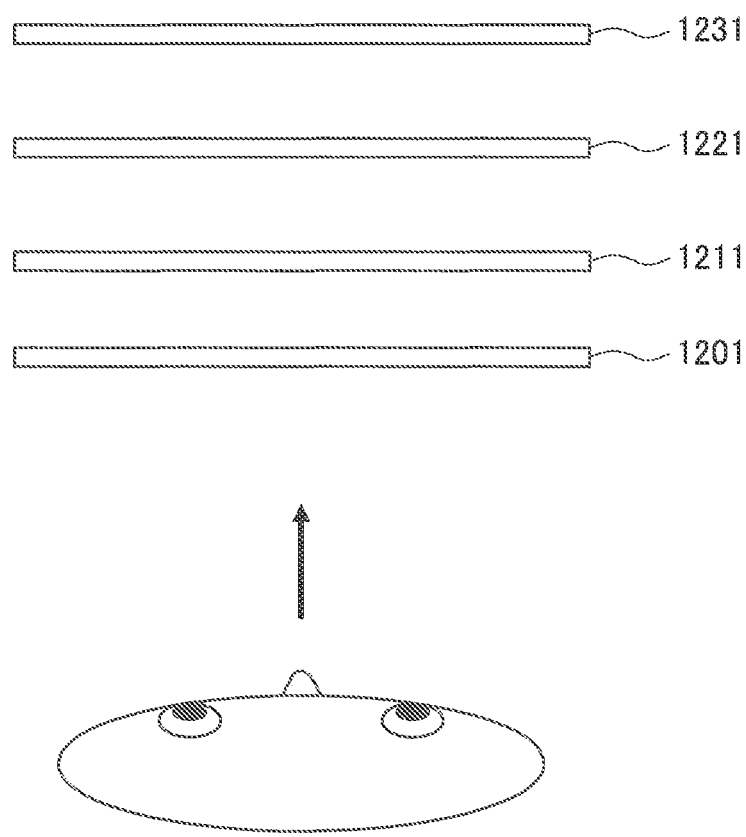
FIG. 23 is a diagram for describing an example of a screen configuration according to a ninth embodiment of the present disclosure.

FIG. 23 is a diagram for describing an example of a screen configuration according to the ninth embodiment of the present disclosure. Referring to FIG. 23, the screen displayed on the display unit 217 by the display control unit 215 according to the embodiment includes a plurality of screens 1201, 1211, 1221, and 1231 mutually superimposed to be displayed. For example, as described in the foregoing first embodiment and the like, expanding a selected image and displaying the selected image on the anterior side of the other images can be realized by superimposing the plurality of screens transparently in this way.

This screen is a screen imaginarily set to realize the display of the display unit 217 and the entire screen is not necessarily displayed to be viewable for the user. For example, as described in the foregoing eighth embodiment and the like, by setting the screen beyond the range of the display region and expanding or contracting the screen, it is possible to expand and display a specific image or contract each image and display the entire image group. FIG. 23 illustrates an example of a settable screen and four screens that are not necessarily be superimposed and displayed. For example, only the screen 1201 may be set or two, three, or five or more screens may be set according to the content displayed on the display unit 217.

4-1-1. Example of Screen on Foremost Side

Figure 24:
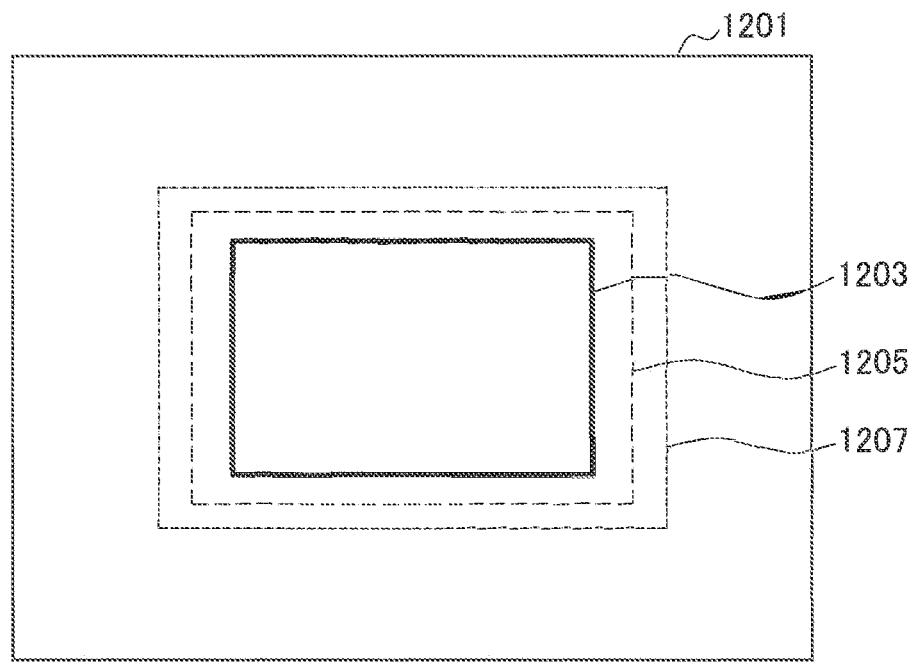
FIG. 24 is a diagram for describing an example of a region set in a first screen according to the ninth embodiment of the present disclosure.

FIG. 24 is a diagram for describing an example of a region set in a first screen according to the ninth embodiment of the present disclosure. A first screen 1201 is illustrated in FIG. 24. As illustrated in FIG. 23 described above, the first screen 1201 is a screen displayed on the foremost side among the plurality of screens. Even when only single screen is set, i.e., 2-dimensional display in which superimposition of screens is not used is set, the same screen as the first screen 1201 is set.

In the first screen 1201, a display region 1203, an ON region 1205, and an OFF region 1207 are set. The display region 1203 is a region that is displayed on the display unit 217 and is viewed by the user.

The ON region 1205 is a region in which the display mode is determined to shift to the first display mode and the mode of the power supply to the imaging unit 135 is set to the camera mode by the power control unit 203 when an EE-relevant image is included in the region.

The OFF region 1207 is a region in which the display mode is determined to shift to the second display mode and the mode of the power supply to the imaging unit 135 is set to the reproduction mode by the power control unit 203 when an EE-relevant image is not included in the region.

As the display region has been described in each of the foregoing embodiments, the fact that "an EE-relevant image is included in a region" may mean that the EE-relevant image is included in a small portion of the region or may mean that a portion with a predetermined ratio or more of the EE-relevant image is included in the region. Further, the fact that an EE-relevant image is not included in a region" may mean that the EE-relevant image is not entirely included in the region or may mean that only a portion with a ratio less than a predetermined ratio of the EE-relevant image is included in the region.

In the following description, for simplicity, it is assumed for description that the fact that "an EE-relevant image is included in a region" means that the EE-relevant image is included in a small portion of the region and the fact that an EE-relevant image is not included in a region" means that the EE-relevant image is not entirely included in the region. However, as described above, this description does not exclude another analysis of the phrase.

For example, as exemplified in each of the foregoing embodiments, a case in which an EE-relevant image comes in and goes out the display region 1203 by sliding a screen or by expanding or contracting the entire screen will be considered.

(Case in which EE-Relevant Image Goes Out)

In this case, first, the mode of the power supply is the camera mode when the EE-relevant image is completely located in the display region 1203. Even when the EE-relevant image is moved outward from this state and is not included in the display region 1203, the mode of the power supply remains to be the camera mode as long as the EE-relevant image is included in the OFF region 1207. This is because while the EE-relevant image is located close to the display region 1203, there is a relatively high probability of an operation of moving the EE-relevant image in the opposite direction therefrom being acquired and the EE-relevant image being included in the display region 1203 again.

As described above, once the mode of the power supply is set to the reproduction mode, it takes some time to return the mode of the power supply to the camera mode and to acquire the EE image. Accordingly, as described above, when the OFF region 1207 is set as a region including the display region 1203 and a positional relation between the OFF region 1207 and the EE-relevant image is used for the power control, it is possible to prevent a waiting time of the user caused due to unnecessary mode switching from occurring.

On the other hand, when the EE-relevant image is moved further outward and is not included in the OFF region 1207 either, the mode of the power supply is switched to the reproduction mode. This is because when the EE-relevant image becomes distant from the display region 1203 to some extent, there is a low probability of an operation of returning the EE-relevant image to the display region 1203 being acquired, and even when this operation is acquired, it takes some time for the EE-relevant image to come in the display region 1203 again, and thus there is a low probability of the waiting time of the user due to the mode switching occurring.

(Case in which EE-Relevant Image Comes in)

In this case, first, the mode of the power supply is the reproduction mode when the EE-relevant image is distant from the display region 1203 and is not included in the ON region 1205 either. When the EE-relevant image is moved toward the display region 1203 and is included in the ON region 1205 from this state, the mode of the power supply is switched from the reproduction mode to the camera mode despite the fact that the EE-relevant image is not yet included in the display region 1203. This is because when the EE-relevant image becomes close to the display region 1203 to the extent that the EE-relevant image is included in the ON region 1205, there is a high probability of the EE-relevant image being directly moved and included in the display region 1203.

As described above, once the mode of the power supply is set to the reproduction mode, it takes some time to return the mode of the power supply to the camera mode and acquire the EE image. Accordingly, as described above, the ON region 1205 is set as a region including the display region 1203 and a positional relation between the ON region 1205 and the EE-relevant image is used for the power control. When a probability of the EE-relevant image comes in the display region 1203 is estimated to be high and the mode of the power supply is thus switched to the camera mode in advance, it is possible to shorten or eliminate the waiting time of the user occurring when the EE-relevant image actually comes in the display region 1203.

(Relation of Each Region)

In the illustrated example, the ON region 1205 is set as the region including the display region 1203 and the OFF region 1207 is set as the region including the ON region 1205. That is, both of the ON region 1205 and the OFF region 1207 are the regions including the display region 1203, but the OFF region 1207 is larger than the ON region 1205.

Accordingly, a position at which the mode of the power supply is switched from the camera mode to the reproduction mode when the EE-relevant image goes out from the display region 1203 is different from a position at which the mode of the power supply is switched from the reproduction mode to the camera mode when the EE-relevant image comes in the display region 1203.

Therefore, for example, in a case in which the EE-relevant image goes out from the display region 1203, the mode of the power supply is already switched to the reproduction mode when the EE-relevant image goes outside the OFF region 1207 temporarily and then turns slightly and comes inside the OFF region 1207. Therefore, the further switching of the mode of the power supply does not occur. That is, unless the EE-relevant image is returned to the extent that the EE-relevant image comes inside the ON region 1205 again, then the mode of the power supply is returned to the camera mode.

In a case in which the EE-relevant image comes in the display region 1203, the mode of the power supply is already switched to the camera mode when the EE-relevant image comes in the ON region 1205 temporarily and slightly returns and goes outside the ON region 1205. Therefore, the further switching of the mode of the power supply does not occur. That is, unless the EE-relevant image is returned to the extent that the EE-relevant image goes outside the OFF region 1207 again, the mode of the power supply is not returned to the reproduction mode.

By setting the ON region 1205 and the OFF region 1207 in this way, it is possible to prevent the switching the mode of the power supply from being repeated frequently even when the EE image minutely reciprocates across any boundary of the ON region 1205 or the OFF region 1207. Depending on the configuration of the imaging unit 135, the repetition of the switching of the mode of the power supply is not desirable from the viewpoint of protection of the members or the device since the repetition of the switching of the mode of the power supply leads to repetition of activation and stop of each constituent element.

However, for example, when movement of the EE-relevant image is simple and a motion such as minute reciprocation beyond the boundary of the region is not assumed, the ON region 1205 and the OFF region 1207 may be set as the same region. For example, in this case, since there is a low probability of the EE-relevant image which has gone out temporarily from the display region 1203 being immediately returned, the OFF region 1207 may be set to be inside more than the ON region 1205 and the OFF region 1207 may be identical to the display region 1203.

For example, when the mode of the power supply is the reproduction mode, each unit of the imaging unit 135 supplied with no power can be reactivated rapidly, and little waiting time occurs until the display of the EE image even at the time of the switching from the reproduction mode to the camera mode, the ON region 1205 may be identical to the display region 1203.

4-1-2. Example of Screen Displayed on Posterior Side

Figure 25:
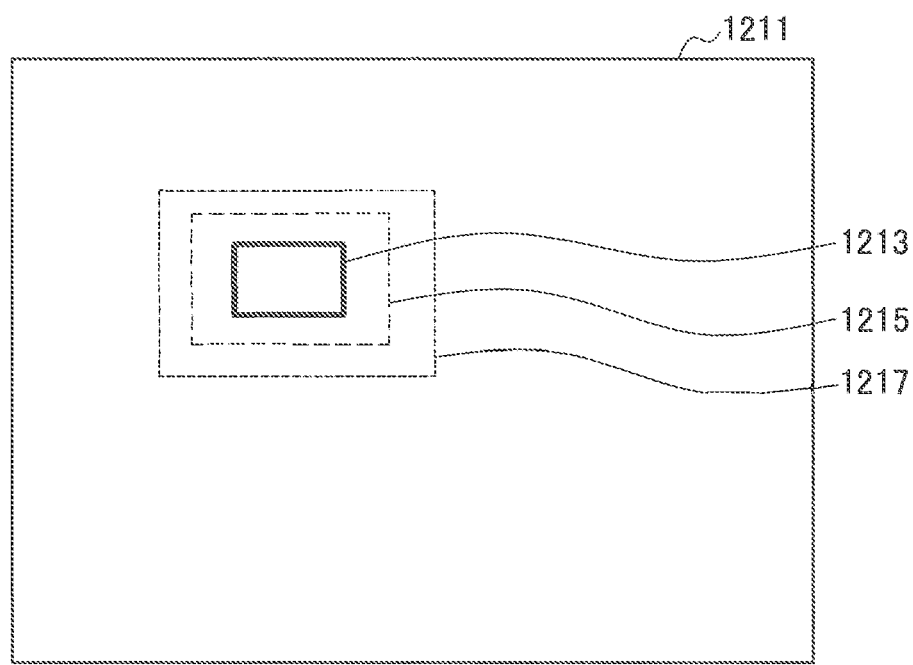
FIG. 25 is a diagram for describing an example of a region set in a second screen according to the ninth embodiment of the present disclosure.

FIG. 25 is a diagram for describing an example of a region set in a second screen according to the ninth embodiment of the present disclosure. The second screen 1211 is illustrated in FIG. 25. As illustrated in FIG. 23 described above, the second screen 1211 is a screen displayed on the posterior side of the first screen 1201.

In the second screen 1211, a display region 1213, an ON region 1215, and an OFF region 1217 are set. The display region 1213 is a region that is displayed on the display unit 217 and viewed by the user when the display of the first screen 1201 displayed on the anterior side is transparent. Accordingly, the shape of the display region 1213 can be different from the shape of the display unit 217.

The ON region 1215 and the OFF region 1217 are set to correspond to the display region 1213 as in the example of the foregoing first screen 1201. In the illustrated example, the ON region 1215 is set as a region including the display region 1213 and the OFF region 1217 is set as a region including the ON region 1215. When an EE-relevant image included in the second screen 1211 comes in and goes out each of the ON region 1215 and the OFF region 1217, the switching of the mode of the power supply is also the same as that of the example of the foregoing first screen 1201.

Figure 26:
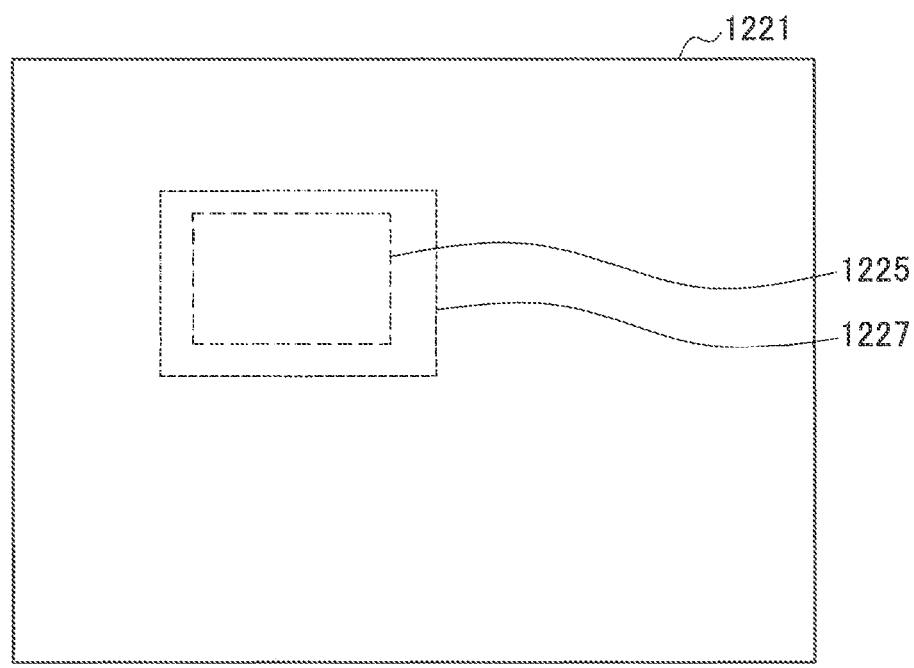
FIG. 26 is a diagram for describing an example of a region set in a third screen according to the ninth embodiment of the present disclosure.

FIG. 26 is a diagram for describing an example of a region set in a third screen according to the ninth embodiment of the present disclosure. The third screen 1221 is illustrated in FIG. 26. As illustrated in FIG. 23 described above, the third screen 1221 is a screen that is displayed on the posterior side of the second screen 1211.

In the third screen 1221, an ON region 1225 and an OFF region 1227 are set. In the third screen 1221, no display region is set. This is because a region of which display is transparent is not present in the display region 1213 of the second screen 1211 displayed on the anterior side in the illustrated example. That is, in the illustrated example, the third screen 1221 is shielded by the second screen 1211 superimposed to be displayed on the anterior side.

In this case, the ON region 1225 and the OFF region 1227 in the third screen 1221 are set to correspond to the display region 1213 of the second screen 1211 superimposed on the anterior side. This is because the region of the third screen 1221 located on the posterior side is displayed when a transparent region occurs in the display region 1213 of the second screen 1211 due to the change in the display and the shielding by the second screen 1211 is cancelled. When an EE-relevant image included in the third screen 1221 comes in and goes out each of the ON region 1225 and the OFF region 1227, the switching of the mode of the power supply is also the same as that of the example of the foregoing first screen 1201.

4-1-1. Example of Screen on Foremost Side

Figure 27:
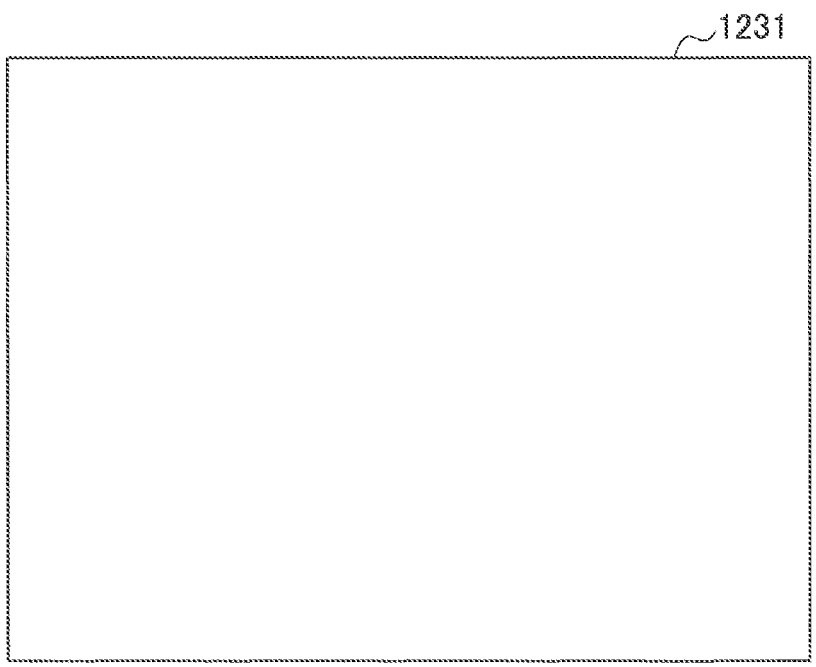
FIG. 27 is a diagram for describing an example of a region set in a fourth screen according to the ninth embodiment of the present disclosure.

FIG. 27 is a diagram for describing an example of a region set in a fourth screen according to the ninth embodiment of the present disclosure. A fourth screen 1231 is illustrated in FIG. 27. As illustrated in FIG. 23 described above, the fourth screen 1231 is a screen displayed on the posterior side of the third screen 1221.

Since the fourth screen 1231 is shielded by the third screen 1221, a display region is not set in the fourth screen 1231. As described above, since the third screen 1221 is also shielded by the second screen 1211, a display region is not set in the third screen 1221 either. In this case, not only a display region but also an ON region and an OFF region are not set in the fourth screen 1231. Even when a transparent region occurs in the display region 1213 of the second screen 1211 and the shielding by the second screen 1211 is cancelled, the displayed region is the region in the third screen 1221. This is because the region of the fourth screen 1231 remains shielded.

When the display region is set in the third screen 1221, an ON region and an OFF region can also be set to correspond to the display region in the fourth screen 1231. This is because the region of the fourth screen 1231 is displayed when a transparent region occurs in the display region of the third screen 1221.

4-1-3. Processing Flow

First Example

Figure 28:
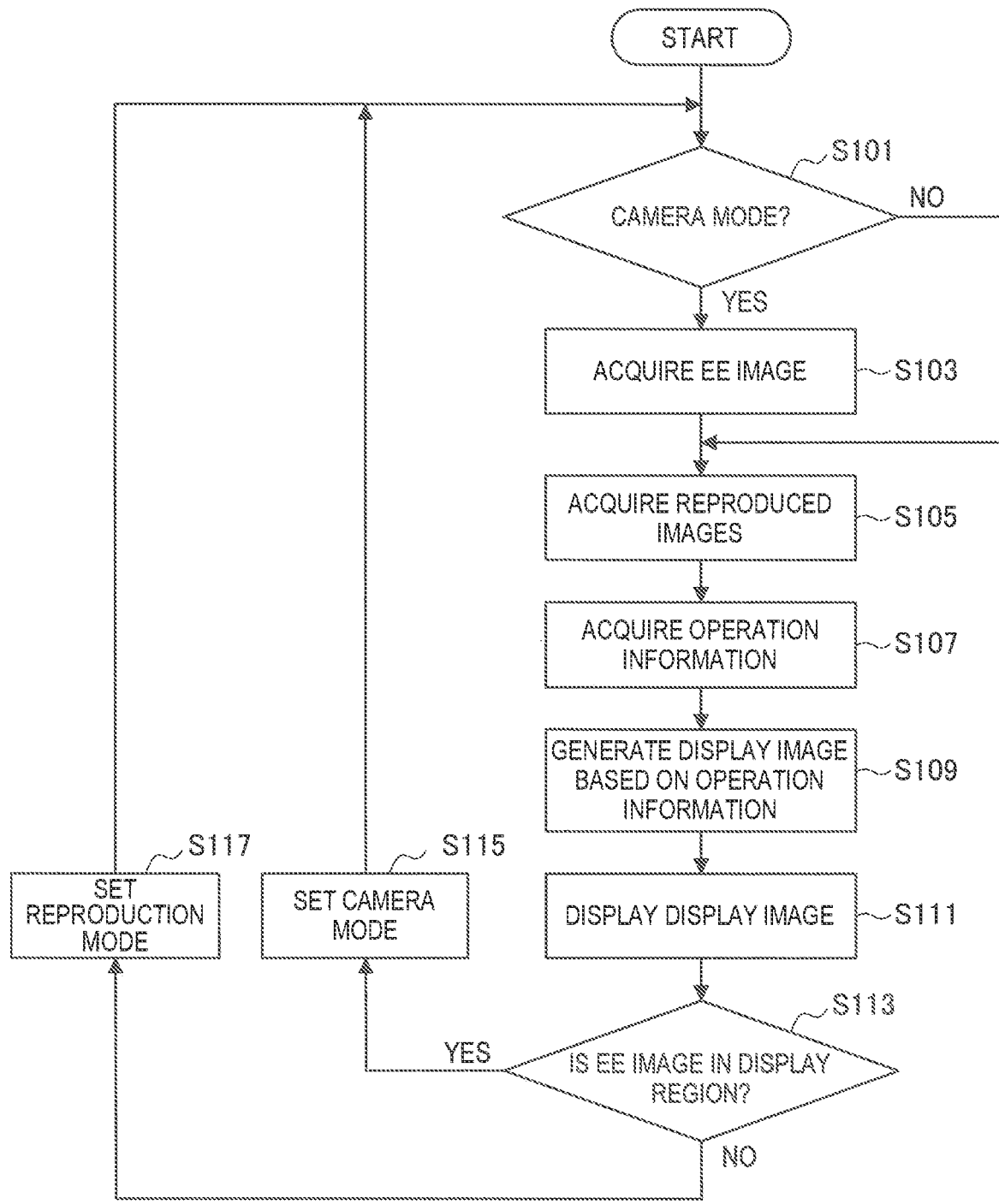
FIG. 28 is a diagram illustrating a first example of a processing flow according to the ninth embodiment of the present disclosure.

FIG. 28 is a diagram illustrating a first example of a processing flow according to the ninth embodiment of the present disclosure. The first example is an example when the display region, the ON region, and the OFF region are all the same region.

First, the display control unit 215 determines whether the mode of the power supply to the imaging unit 135 is the camera mode (step S101). Here, when the mode of the power supply is the camera mode, the display control unit 215 acquires an EE image from the imaging unit 135 (step S103). Conversely, when the mode of the power supply is the reproduction mode, the display control unit 215 does not acquire an EE image since no power is supplied to the image sensor 129 in the imaging unit 135 and the like and no image can be acquired.

Next, the display control unit 215 acquires predetermined reproduced images from the non-volatile storage unit 301 via the non-volatile storage I/F 303 (step S105). The reproduced images may already be read from the non-volatile storage unit 301 and may be cached in the volatile storage unit 207.

Next, the display control unit 215 acquires operation information from the input unit 211 via the input processing unit 213 (step S107). The operation information acquired herein can be, for example, an operation of selecting one of the displayed images, an operation of scrolling the display toward to one direction, or an operation of expanding or contracting one of the displayed images, as exemplified in each of the foregoing embodiments.

Next, the display control unit 215 generates a display image based on the acquired operation information (step S109) and causes the display unit 217 to display the display image (step S111). The display image displayed herein can be, for example, an image in which one image or the entire display for which the operation information is also displayed is expanded or extracted or a screen for which the displayed operation information is moved in one direction based on the acquired operation information.

Next, the power control unit 203 determines whether an EE-relevant image (simply referred to as an "EE image" for simplicity in the flowchart) is in the display region in the display image displayed on the display unit 217 by the display control unit 215 (step S113).

Herein, when the power control unit 203 determines that the EE-relevant image is in the display region, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein.

Conversely, when the power control unit 203 determines that the EE-relevant image is out of the display region, the power control unit 203 sets the mode of the power supply to the imaging unit 135 to the reproduction mode (step 117) and the process returns to step S101. When the mode of the power supply is set to the camera mode throughout the process performed hitherto, the switching of the mode is performed herein.

Second Example

Figure 29:
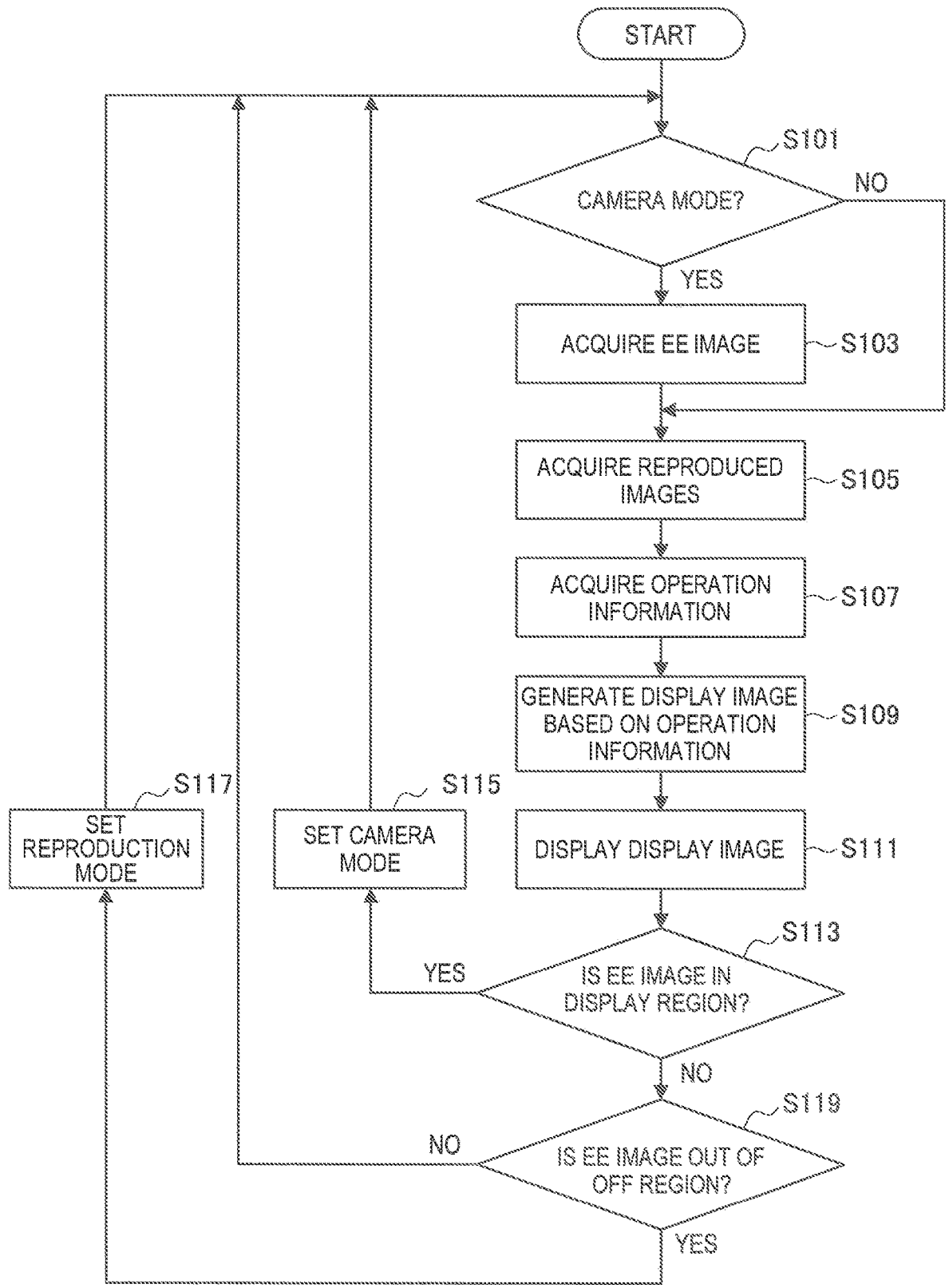
FIG. 29 is a diagram illustrating a second example of a processing flow according to the ninth embodiment of the present disclosure.

FIG. 29 is a diagram illustrating a second example of the processing flow according to the ninth embodiment of the present disclosure. The second example is an example when the display region is the same region as the ON region and the OFF region includes the display region. Since the processes of steps S101 to S115 are the same as those of the foregoing first example, the description thereof will be omitted.

When the power control unit 203 determines in step S113 that the EE-relevant image is out of the display region, the power control unit 203 determines whether the EE-relevant image is out of the OFF region (step S119).

Here, when the power control unit 203 determines that the EE-relevant image is out of the OFF region, the power control unit 203 sets the mode of the power supply to the imaging unit 135 to the reproduction mode (step 117) and the process returns to step S101. When the mode of the power supply is set to the camera mode throughout the process performed hitherto, the switching of the mode is performed herein.

Conversely, when the power control unit 203 determines that the EE-relevant image is in the OFF region, the power control unit 203 does not perform the process regarding the mode of the power supply and the process returns to step S101. That is, in this case, the mode of the power supply set throughout the process performed hitherto remains.

In the second example, when the EE-relevant image is out of the display region and in the OFF region, the mode of the power supply set throughout the process performed hitherto remains. Thus, it is possible to avoid frequent switching of the mode of the power supply due to a minute motion of the EE-relevant image.

Third Example

Figure 30:
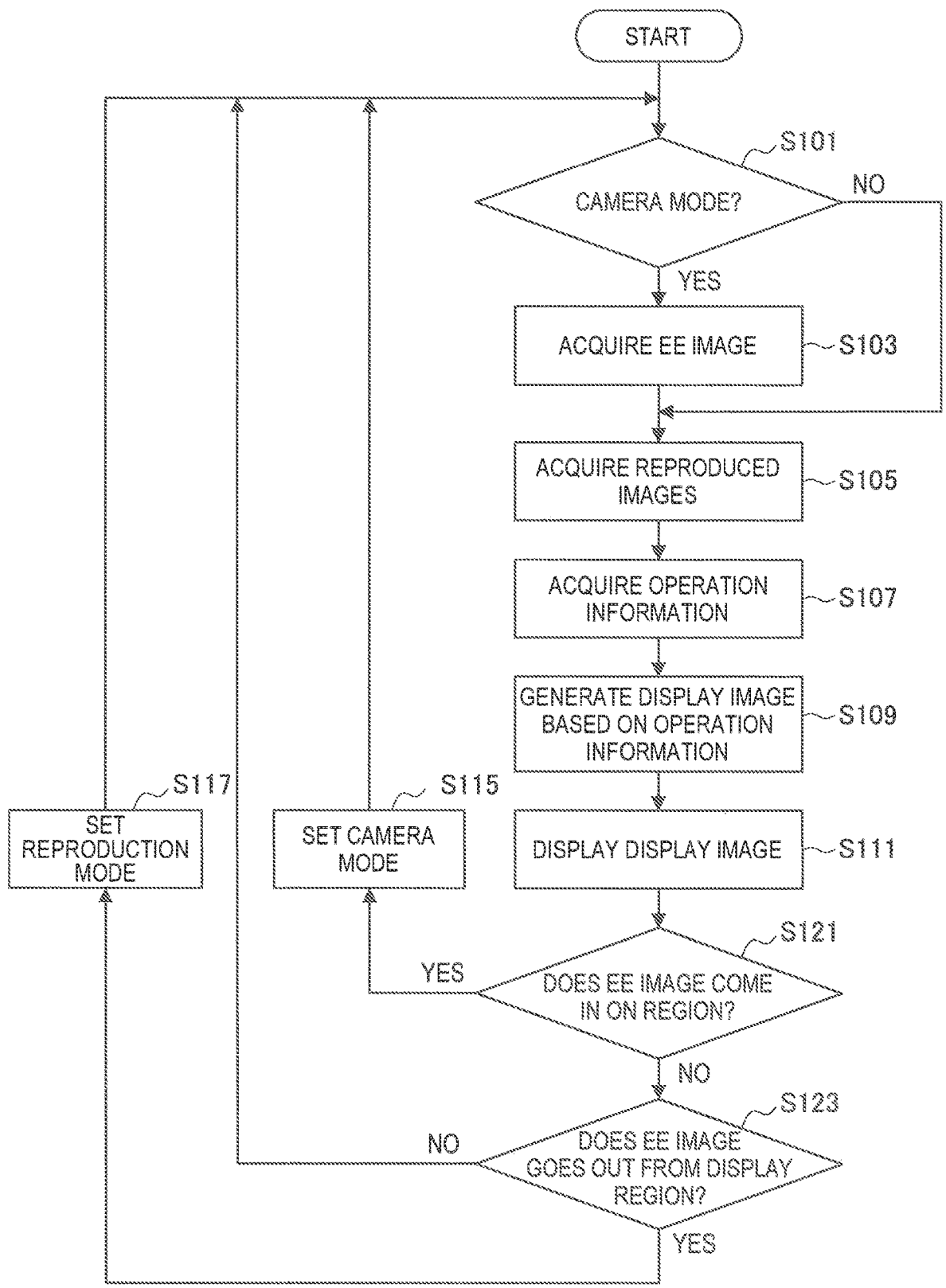
FIG. 30 is a diagram illustrating a third example of a processing flow according to the ninth embodiment of the present disclosure.

FIG. 30 is a diagram illustrating a third example of the processing flow according to the ninth embodiment of the present disclosure. The third example is an example when the display region is the same region as the OFF region and the ON region is set inside the display region=the OFF region. Since the processes of steps S101 to S111 are the same as those of the foregoing first example, the description thereof will be omitted.

After step S111, the power control unit 203 determines whether the EE-relevant image has come in the ON region in the display image displayed on the display unit 217 by the display control unit 215 (step S121).

Here, when the power control unit 203 determines that the EE-relevant image has come in the ON region, the power control unit 203 sets the mode of the power supply to the imaging unit 135 to the camera mode (step S115) and the process returns to step S101. The fact that "the EE-relevant image comes in the ON region" means that the EE-relevant image not included in the ON region is then included in the ON region through the change in the display. When the mode of the power supply is the reproduction mode before the EE-relevant image comes in the ON region, the switching of the mode is performed herein.

Conversely, when the power control unit 203 determines that the EE-relevant image has not come in the ON region, the power control unit 203 further determines whether the EE-relevant image has gone out from the display region (step S123).

Here, when the power control unit 203 determines that the EE-relevant image has gone out from the display region, the power control unit 203 sets the mode of the power supply to the imaging unit 135 to the reproduction mode (step S117) and the process returns to step S101. The fact that "the EE-relevant image goes out from the display region" means that the EE-relevant image included in the display region is then not included in the display region through the change in the display. When the mode of the power supply is the camera mode before the EE-relevant image goes out from the display region, the switching of the mode is performed herein.

Conversely, when the power control unit 203 determines that the EE-relevant image has not gone out from the display region, the power control unit 203 does not perform the process regarding the mode of the power supply and the process returns to step S101. That is, in this case, the mode of the power supply set throughout the process performed hitherto remains.

The third example is applicable, for example, to a case in which the mode of the power supply is set to the camera mode when the EE-relevant image sufficiently comes in the display region and the user can sufficiently view the EE-relevant image. In this case, since the EE-relevant image slightly coming in the display region is assumed to go out from the display region immediately, the mode of the power supply is not yet switched to the camera mode at this time. When the EE-relevant image further comes in the display region and also comes in the ON region set inside, the mode of the power supply is switched to the camera mode. Thus, only when the content of the EE-relevant image can be viewed, can the mode of the power supply be switched, and thus the power can be further saved. Conversely, when the EE-relevant image goes out from the display region, the EE-relevant image goes out from the display region, and then the mode of the power supply is switched to the reproduction mode.

Fourth Example

Figure 31:
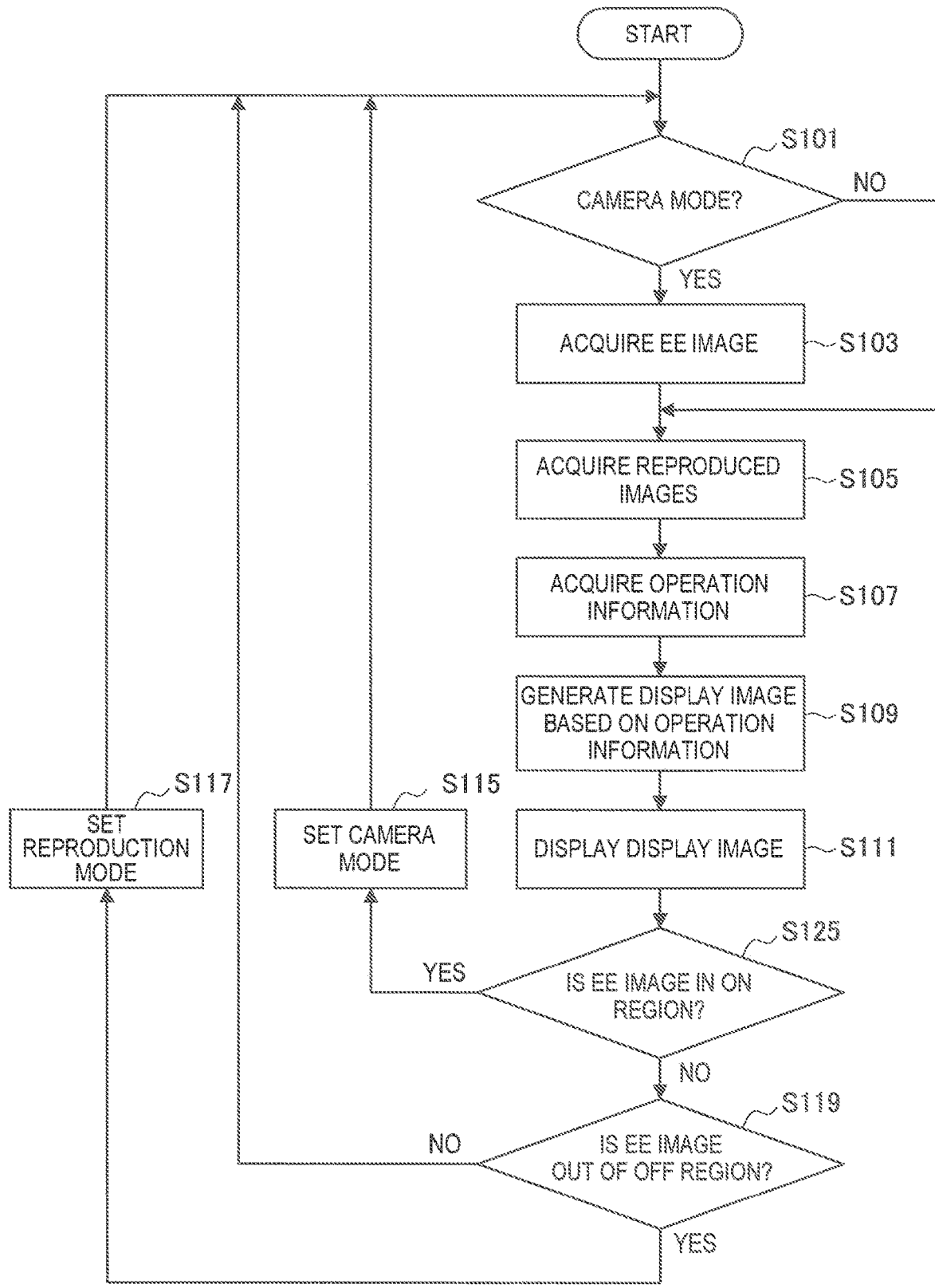
FIG. 31 is a diagram illustrating a fourth example of a processing flow according to the ninth embodiment of the present disclosure.

FIG. 31 is a diagram illustrating a fourth example of the processing flow according to the ninth embodiment of the present disclosure. The fourth example is an example when the ON region includes the display region and the OFF region also includes the display region. Since the processes of steps S101 to S111 are the same as those of the foregoing first example, the description thereof will be omitted.

After step S111, the power control unit 203 determines whether the EE-relevant image is in the ON region in the display image displayed on the display unit 217 by the display control unit 215 (step S125).

Herein, when the power control unit 203 determines that the EE-relevant image is in the ON region, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein.

Conversely, when the power control unit 203 determines that the EE-relevant image is out of the ON region, the power control unit 203 further determines whether the EE-relevant image is out of the OFF region (step S119).

Herein, when the power control unit 203 determines that the EE-relevant image is out of the OFF region, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein.

Conversely, when the power control unit 203 determines that the EE-relevant image is in the OFF region, the power control unit 203 does not perform the process regarding the mode of the power supply and the process returns to step S101. That is, in this case, the mode of the power supply set throughout the process performed hitherto remains.

In the second example, when the EE-relevant image is out of the ON region and in the OFF region, the mode of the power supply set throughout the process performed hitherto remains. Thus, it is possible to avoid frequent switching of the mode of the power supply due to a minute motion of the EE-relevant image.

When the EE-relevant image comes in the ON region located outside more than the display region, the mode of the power supply is set to the camera mode. Therefore, it is possible to further shorten or eliminate a waiting time up to a time in which the EE image is displayed after the EE-relevant image comes in the display region.

4-1-4. Modification Examples

First Modification Example

Figure 32:
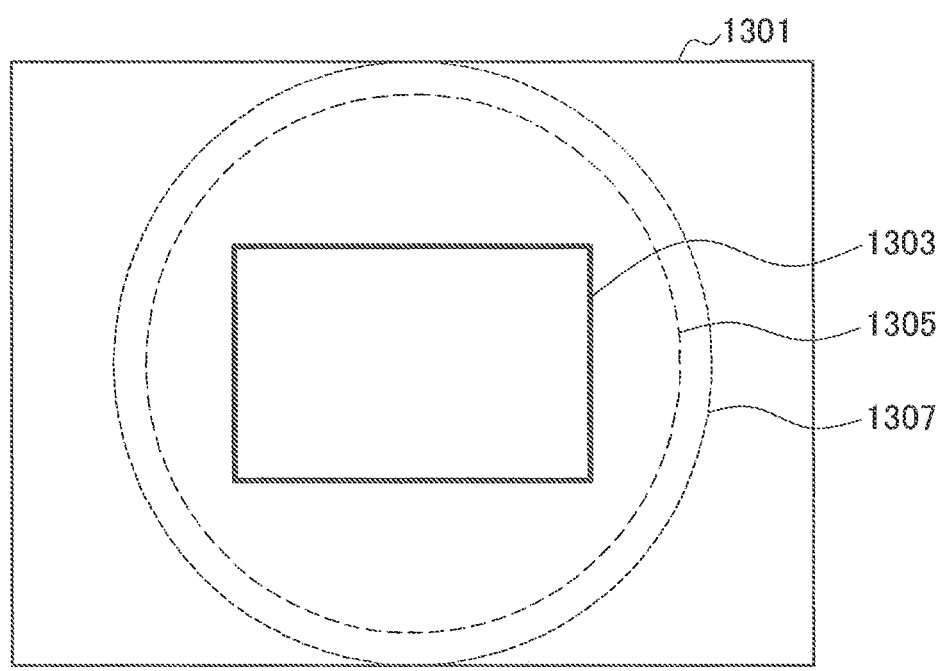
FIG. 32 is a diagram for describing a first modification example of the ninth embodiment of the present disclosure.

FIG. 32 is a diagram for describing a first modification example of the ninth embodiment of the present disclosure. A first screen 1301 is illustrated in FIG. 32. The natures of a display region 1303, an ON region 1305, and an OFF region 1307 set in the first screen 1301 are the same as those of the first screen 1201 described in the example of FIG. 24 described above.

In the illustrated example, the ON region 1305 is also set as a region including the display region 1303. However, the ON region 1305 is set as a region including a figure obtained by rotating the display region 1303 around its center. That is, even when the display region 1303 is rotated around its center, the display region 1303 is included in the ON region 1305.

This is a configuration in consideration of the rotation course of the display region 1303. For example, when a mobile device is held vertically or held horizontally, the display region 1303 is rotated in some cases. In this case, for example, when the mobile device is held vertically, a region not included in the display region 1303 can be included in the display region 1303 in some cases when the mobile device is held horizontally or while display region shifts.

Accordingly, in the illustrated example, even while the display region 1303 shifts from the vertically long shape to the horizontally long shape, the ON region 1305 is set in the foregoing way so that the mode of the power supply is not changed to the camera mode and the EE-relevant image does not come in the display region 1303. The OFF region 1307 is set as a region further including the ON region 1305.

Second Modification Example

Figure 33:
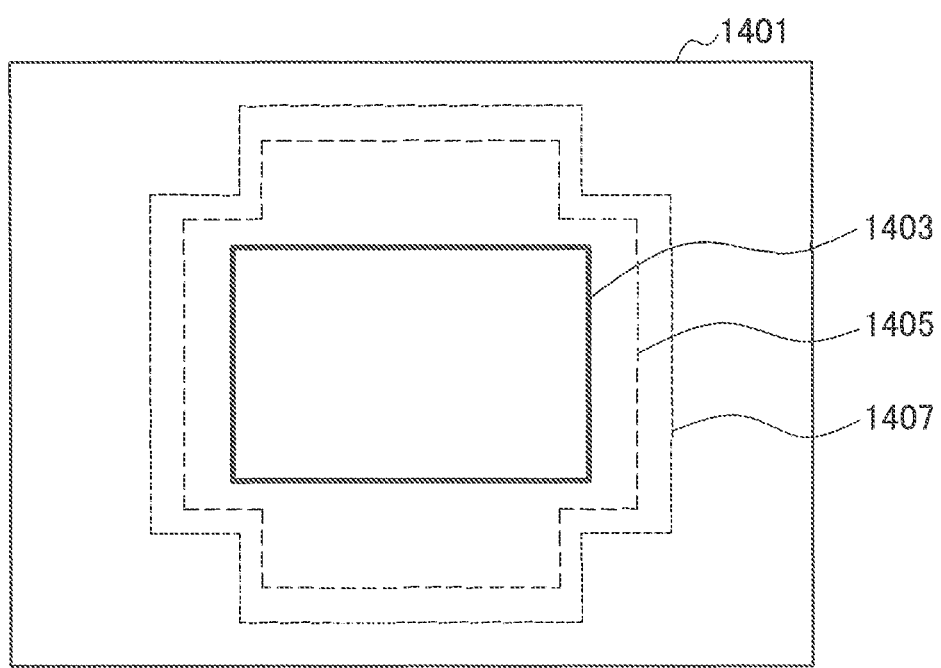
FIG. 33 is a diagram for describing a second modification example of the ninth embodiment of the present disclosure.

FIG. 33 is a diagram for describing a second modification example of the ninth embodiment of the present disclosure. A first screen 1401 is illustrated in FIG. 33. The natures of a display region 1403, an ON region 1405, and an OFF region 1407 set in the first screen 1401 are the same as those of the first screen 1201 described in the example of FIG. 24 described above.

In the illustrated example, the ON region 1405 is also set as a region including the display region 1403. However, the ON region 1405 is set as a region including a figure in which the vertically long shape and the horizontally long shape of the display region 1403 are superimposed. That is, even when the display region 1403 is changed from the horizontally long shape to the vertically long shape, the display region 1403 is included in the ON region 1405.

This is a configuration in consideration of the switching between the vertically long shape and the horizontally long shape of the display region 1403. For example, when a mobile device is held vertically or held horizontally, the display region 1403 can be switched from the horizontally long shape to the vertically long shape or vice versa. Thus, in the illustrated example, the ON region 1405 is set to have a shape corresponding to both of the horizontally long shape and the vertically long shape. Even when the display region 1403 is switched from the vertically long shape to the horizontally long shape, the mode of the power supply is not switched to the camera mode and the EE-relevant image does not come in the display region 1403. The OFF region 1407 is set as a region further including the ON region 1405.

4-2. Tenth Embodiment

Next, a tenth embodiment of the present disclosure will be described with reference to FIGS. 34 to 40. The tenth embodiment of the present disclosure relates to a timing of the power supply control. In each of the foregoing embodiments, the power supply to the imaging unit 135 has been controlled according to the display of the display unit 217. The embodiment is applicable to each embodiment in which the control is performed, i.e., each of the foregoing embodiments.

Figure 34:
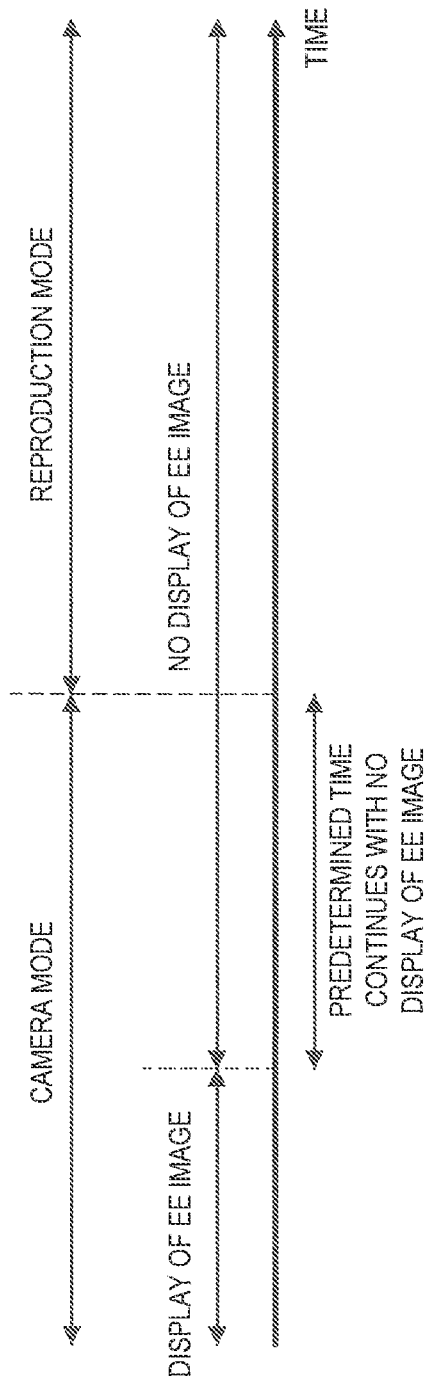
FIG. 34 is a diagram for describing an example of a timing of power supply control according to a tenth embodiment of the present disclosure.

FIG. 34 is a diagram for describing an example of a timing of the power supply control according to the tenth embodiment of the present disclosure. Referring to FIG. 34, shift occurs on a time axis from a state in which the display of the EE-relevant image is present on the display unit 217 and the mode of the power supply to the imaging unit 135 is set to the camera mode to a state in which the display of the EE-relevant image is not present on the display unit 217 and the mode of the power supply is set to the reproduction mode.

In the illustrated example, even after the display of the EE-relevant image disappears from the display unit 217, the mode of the power supply remains to be the camera mode for a predetermined time. Thereafter, the mode of the power supply is switched to the reproduction mode by the power control unit 203.

A time in which the display of the EE-relevant image disappears from the display unit 217 and the mode of the power supply is switched can be said to be a predetermined waiting time. The waiting time is a time as soon as the EE-relevant image vanishes from the display unit 217. Therefore, there is a relatively high probability of the EE-relevant image being returned to the display unit 217 again and the imaging being performed through a user's operation. Accordingly, in the embodiment, the switching of the mode of the power supply waits in the meantime.

In contrast to the foregoing example, a predetermined waiting time in which the display of the EE-relevant image appears on the display unit 217 and the mode of the power supply is switched may be set even in the shift from a state in which the display of the EE-relevant image is not present on the display unit 217 and the mode of the power supply is set to the reproduction mode to a state in which the display of the EE-relevant image is present on the display unit 217 and the mode of the power supply is set to the camera mode. In this case, the waiting time is estimated as a time in which the intention of the user to display the EE-relevant image on the display unit 217 is not ensured and there is a relatively high probability of the EE-relevant image immediately vanishing from the display unit 217.

Processing Flow: First Example

Figure 35:
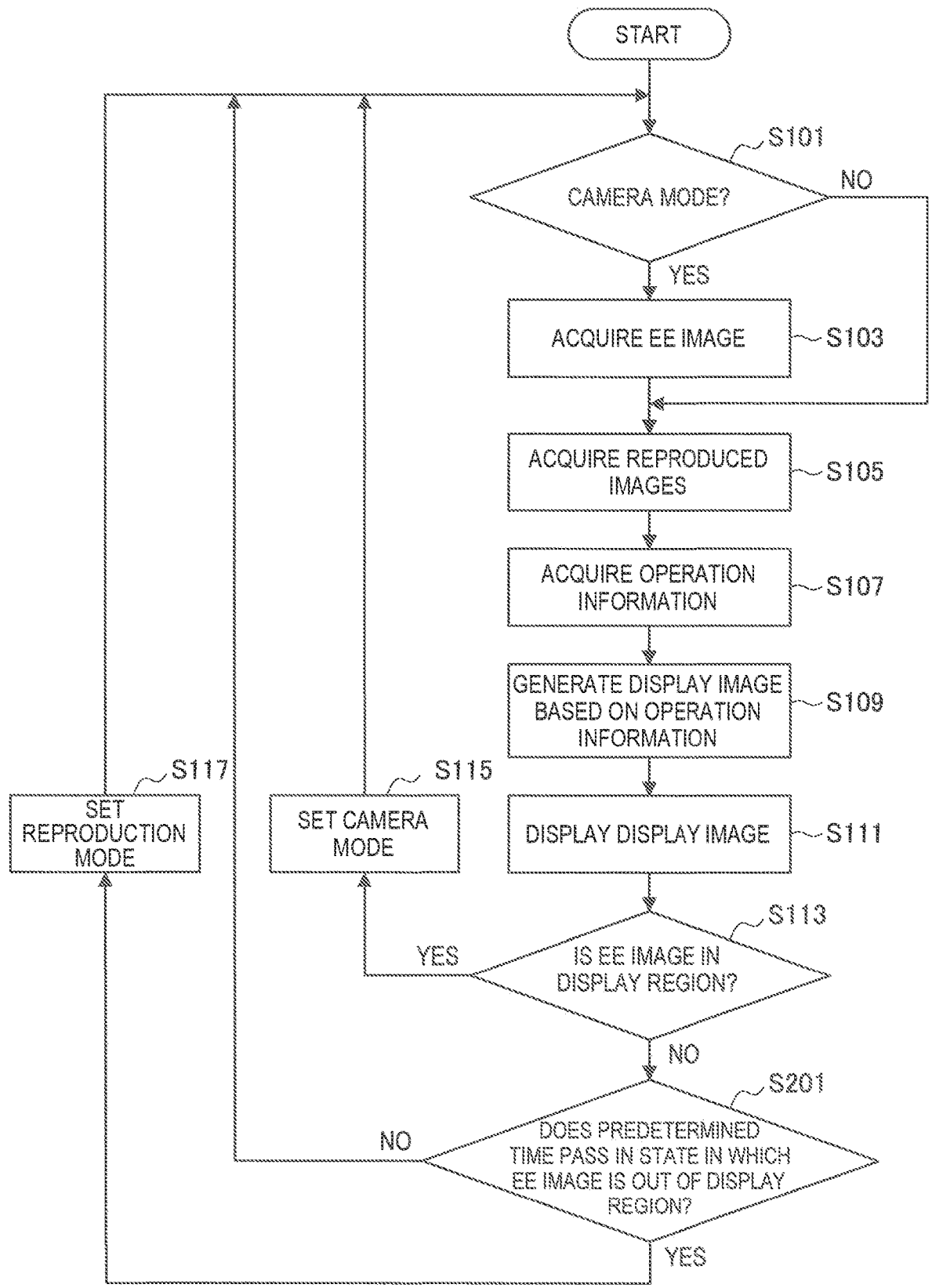
FIG. 35 is a diagram illustrating a first example of a processing flow according to the tenth embodiment of the present disclosure.

FIG. 35 is a diagram illustrating a first example of a processing flow according to the tenth embodiment of the present disclosure. The first example is an example in which a waiting time is provided when the mode of the power supply to the imaging unit 135 is switched from the camera mode to the reproduction mode. Since the processes of steps S101 to S115 are the same as those of the example described with reference to FIG. 28 in the foregoing ninth embodiment, the description thereof will be omitted.

When the power control unit 203 determines in step S113 that the EE-relevant image is out of the display region, the power control unit 203 determines whether the EE-relevant image is out of the display region and a predetermined time (waiting time) passes in this state (step S201).

Here, when the power control unit 203 determines that the predetermined time passes, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein.

Conversely, when the predetermined time does not pass i.e., when the EE-relevant image comes in the display region before the waiting time passes, the power control unit 203 does not perform the process regarding the mode of the power supply and the process returns to step S101. That is, in this case, the mode of the power supply set throughout the process performed hitherto remains.

Processing Flow: Second Example

Figure 36:
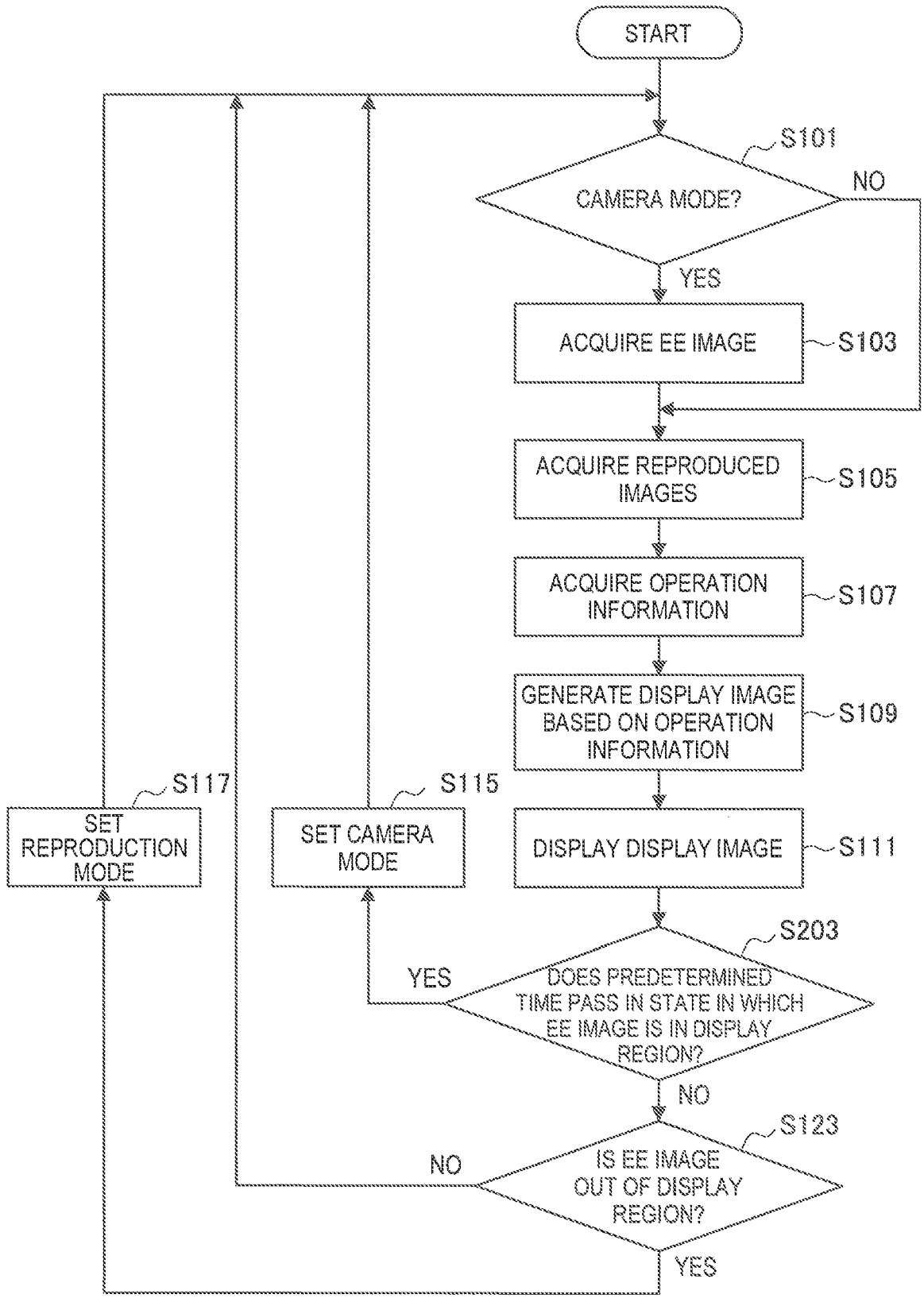
FIG. 36 is a diagram illustrating a second example of a processing flow according to the tenth embodiment of the present disclosure.

FIG. 36 is a diagram illustrating a second example of the processing flow according to the tenth embodiment of the present disclosure. The second example is an example in which a waiting time is provided when the mode of the power supply to the imaging unit 135 is switched from the reproduction mode to the camera mode. Since the processes of step S101 to step S111 are the same as those of the example described with reference to FIG. 28 in the foregoing ninth embodiment, the description thereof will be omitted.

After step S111, the power control unit 203 determines whether the EE-relevant image is in the display region and a predetermined time (waiting time) passes in this state (step S203).

Here, when the power control unit 203 determines that the predetermined time passes, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein.

Conversely, when the predetermined time does not pass, i.e., when the EE-relevant image goes out from the display region before the waiting time passes, the power control unit 203 determines whether the EE-relevant image further goes out from the display region (step S123).

Here, when the power control unit 203 determines that the EE-relevant image has gone out from the display region, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein.

Conversely, when the power control unit 203 does not determine that the EE-relevant image has gone out from the display region, the power control unit 203 does not perform the process regarding the mode of the power supply and the process returns to step S101. That is, in this case, the mode of the power supply set throughout the process performed hitherto remains.

Processing Flow: Third Example

Figure 37:
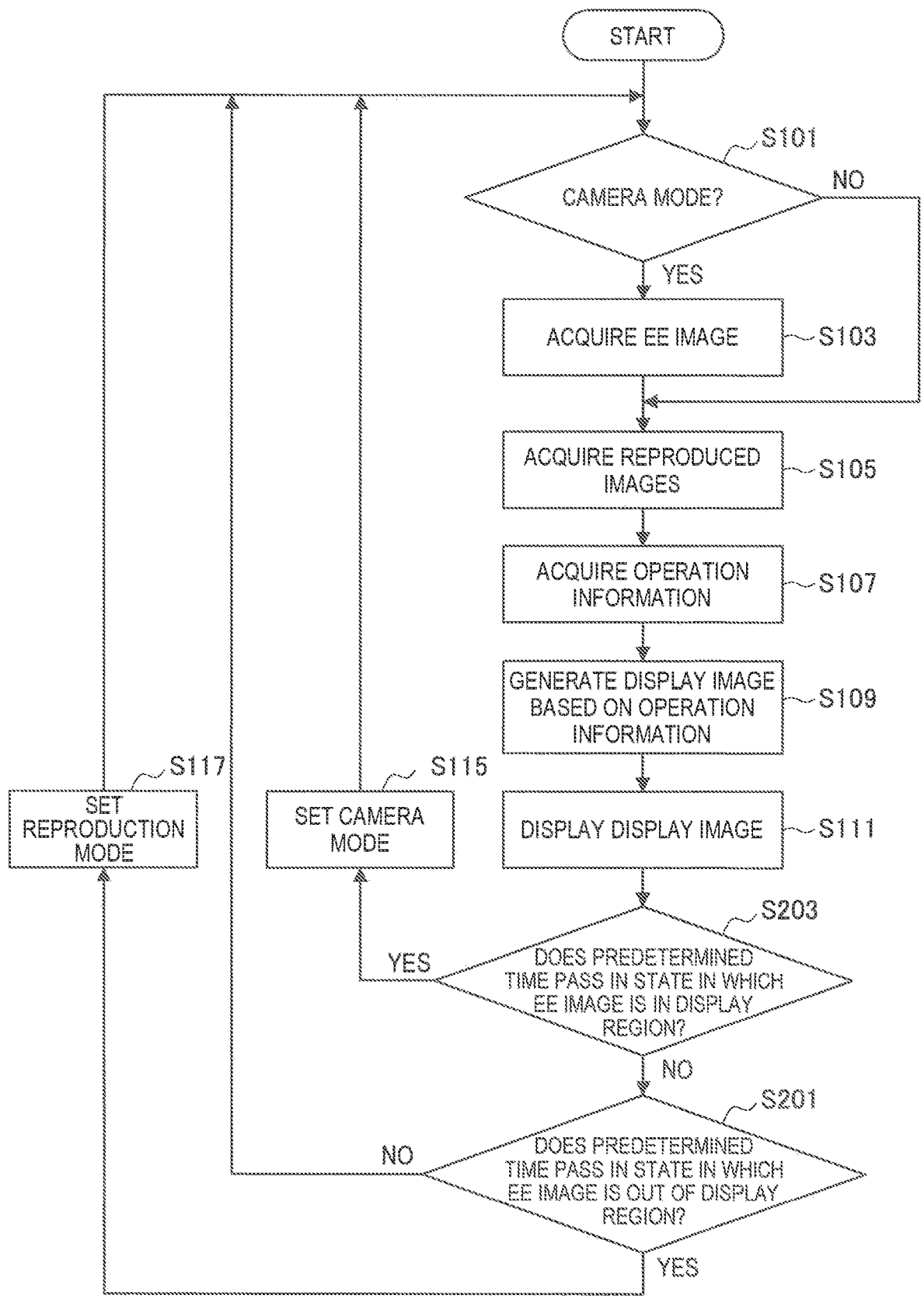
FIG. 37 is a diagram illustrating a third example of a processing flow according to the tenth embodiment of the present disclosure.

FIG. 37 is a diagram illustrating a third example of the processing flow according to the tenth embodiment of the present disclosure. The third example is an example in which a waiting time is provided both when the mode of the power supply to the imaging unit 135 is switched from the reproduction mode to the camera mode and when the mode of the power supply is switched from the camera mode to the reproduction mode. Since the processes of step S101 to step S111 are the same as those of the example described with reference to FIG. 28 in the foregoing ninth embodiment, the description thereof will be omitted.

After step S111, the power control unit 203 determines whether the EE-relevant image is in the display region and a predetermined time (waiting time) passes in this state (step S203).

Here, when the power control unit 203 determines that the predetermined time passes, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein.

Converse, when the predetermined time does not pass in step S203, i.e., when the EE-relevant image returns to the inside of the display region before the waiting time passes, the power control unit 203 determines whether the EE-relevant image is out of the display region and a predetermined time (waiting time) passes in this state (step S201).

Here, when the power control unit 203 determines that the predetermined time passes, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein.

Conversely, when the predetermined time does not pass i.e., when the EE-relevant image comes in the display region before the waiting time passes, the power control unit 203 does not perform the process regarding the mode of the power supply and the process returns to step S101. That is, in this case, the mode of the power supply set throughout the process performed hitherto remains.

First Modification Example

Figure 38:
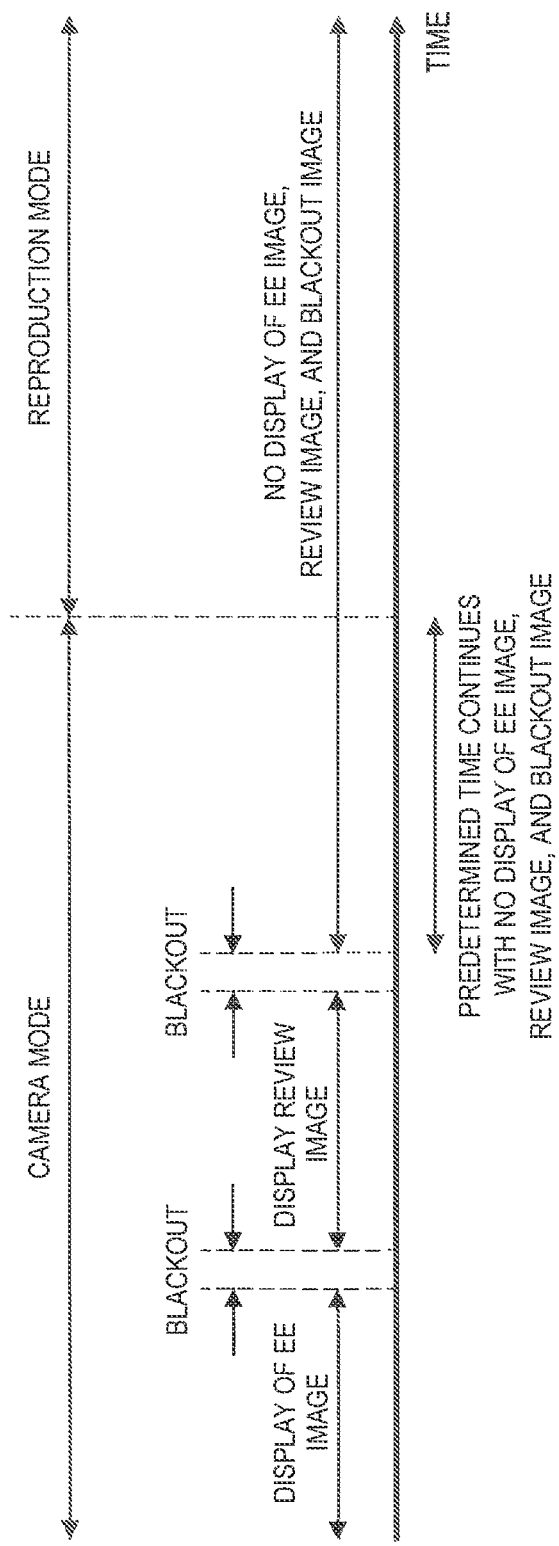
FIG. 38 is a diagram for describing a first modification example of the tenth embodiment of the present disclosure.

FIG. 38 is a diagram for describing a first modification example of the tenth embodiment of the present disclosure. As in FIG. 34, FIG. 38 illustrates an example in which the mode of the power supply to the imaging unit 135 shifts from the camera mode to the reproduction mode. Only in the first and second modification examples to be described below, the description will be made by classifying the "EE-relevant image" into an "EE image," a "blackout image," a "review image," and an "image during processing a still image."

In the illustrated example, when the EE image is displayed on the display unit 217 and imaging is performed through a user's operation in this state, a blackout image is displayed instead of the EE image during the execution of the imaging process. Thereafter, after a captured image is displayed as a review image, the display of the display unit 217 returns to display including the normal reproduced image. At this time, the EE image is already not included in the display unit 217.

Here, the power control unit 203 causes the mode of the power supply to remain to be the camera mode for a predetermined time, and then switches the mode of the power supply to the reproduction mode. That is, in this case, when a state in which none of the EE image, the review image, and the blackout image is displayed on the display unit 217 continues for a predetermined time or more, the mode of the power supply is switched. As described above, when the EE image, the review image, and the blackout image are referred to as the "EE-relevant image," in the foregoing example, the power control can be said to be performed when the EE-relevant image is not displayed on the display unit 217 and then the predetermined waiting time passes.

Second Modification Example

Figure 39:
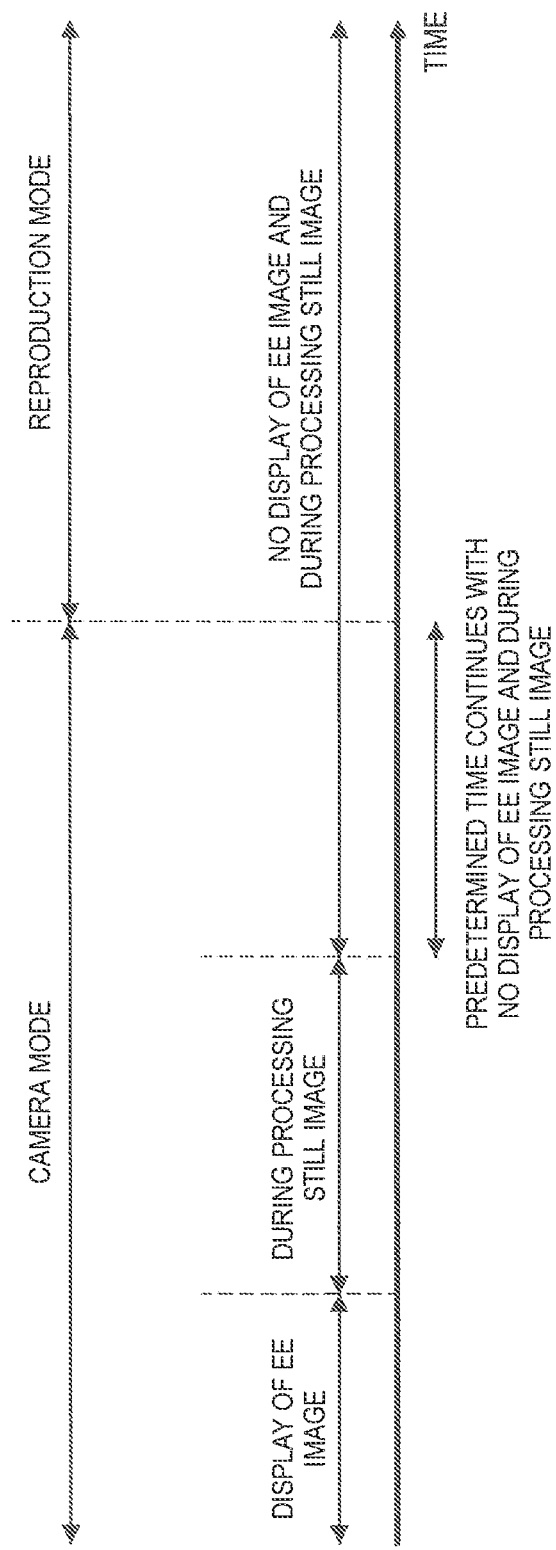
FIG. 39 is a diagram for describing a second modification example of the tenth embodiment of the present disclosure.

FIG. 39 is a diagram for describing a second modification example of the tenth embodiment of the present disclosure. As in FIG. 34, FIG. 39 illustrates an example in which the mode of the power supply to the imaging unit 135 shifts from the camera mode to the reproduction mode.

In the illustrated example, when the EE image is displayed on the display unit 217 and imaging is performed through a user's operation in this state, the predetermined image during processing the still image is displayed instead of the EE image during the execution of the imaging process. Thereafter, the display of the display unit 217 returns to the display including the normal reproduced images. At this time, the EE image is already not included in the display unit 217.

Here, the power control unit 203 causes the mode of the power supply to remain to be the camera mode for a predetermined time, and then switches the mode of the power supply to the reproduction mode. That is, in this case, when a state in which none of the EE image and the image during processing a still image is displayed on the display unit 217 continues for a predetermined time or more, the mode of the power supply is switched. As described above, when the EE image and the image during processing a still image are referred to as the "EE-relevant image," in the foregoing example, the power control can be said to be performed when the EE-relevant image is not displayed on the display unit 217 and then the predetermined waiting time passes.

Third Modification Example

Figure 40:
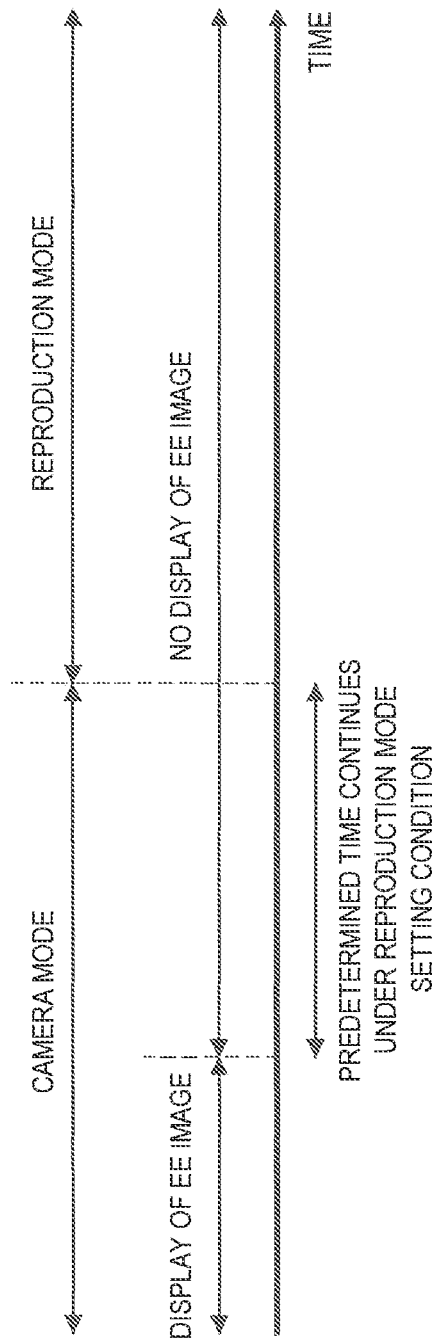
FIG. 40 is a diagram for describing a third modification example of the tenth embodiment of the present disclosure.

FIG. 40 is a diagram for describing a third modification example of the tenth embodiment of the present disclosure. As in FIG. 34, FIG. 40 illustrates an example in which the mode of the power control to the imaging unit 135 shifts from the camera mode to the reproduction mode.

In the illustrated example, a predetermined reproduction mode setting condition is satisfied by movement of the display position of the EE-relevant image beyond the predetermined region, as described in the foregoing ninth embodiment, from the state of the display of the EE-relevant image on the display unit 217. In this case, after the reproduction mode setting condition is satisfied, the power control unit 203 allows the mode of the power supply to remain to be the camera mode for a predetermined time, and then switches the mode of the power supply to the reproduction mode.

Thus, each configuration of the tenth embodiment of the present disclosure described above can be combined with each configuration of the ninth embodiment.

4-3. Eleventh Embodiment

Next, an eleventh embodiment of the present disclosure will be described with reference to FIGS. 41 and 42. The eleventh embodiment of the present disclosure relates to a power supply control target. As in each of the embodiments described hitherto, the embodiment can be combined with any of the foregoing embodiments.

Figure 41:
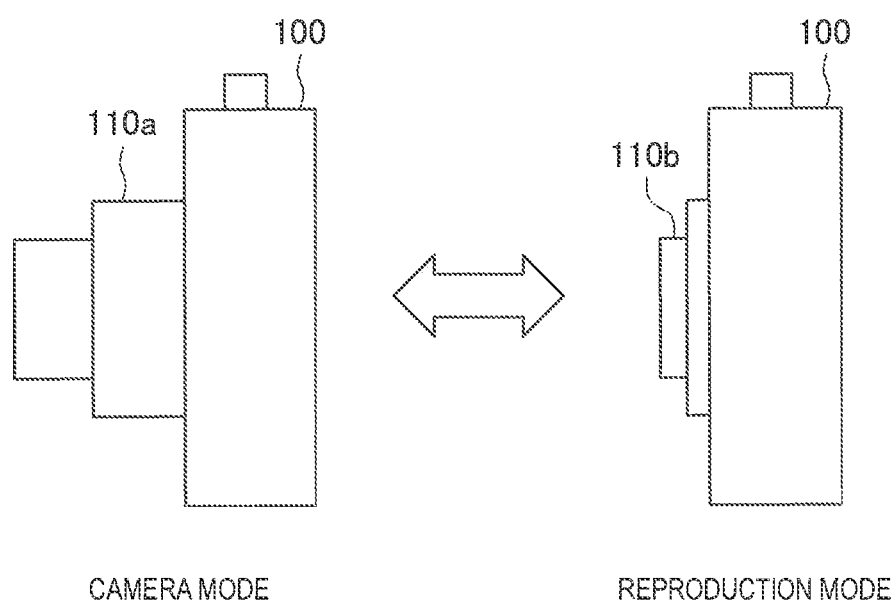
FIG. 41 is a diagram for describing a comparison example according to an eleventh embodiment of the present disclosure.

FIG. 41 is a diagram for describing the eleventh embodiment of the present disclosure. In the embodiment, the imaging device 100 having an illustrated collapsible (storage type) lens tube is a power control target. For example, when an operation input of cutting off power of the device is acquired from a power button included in the input unit 211 via the input processing unit 213 and the mode of the power supply to the imaging unit 135 is the camera mode, a developed lens tube 110*a* is changed to a storage state (lens tube 110*b*).

When the mode of the power supply is switched from the camera mode to the reproduction mode by the power control of each of the foregoing embodiments, for example, the storage state of the storage type lens may be changed as in the case of the foregoing power cutoff. However, since it is necessary to drive a motor or the like in this change, power consumption occurs. The power consumption is greater than power consumption when another portion of the imaging unit 135, e.g., the AF mechanism 123, the diaphragm 125, the camera-shake correction mechanism 127, or the image sensor 129, is activated or stopped.

Figure 42:
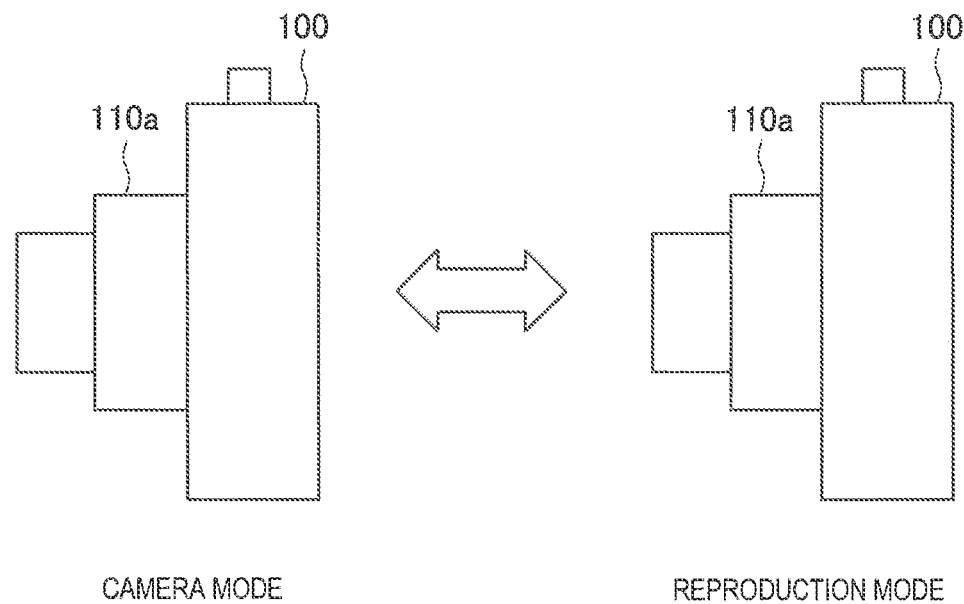
FIG. 42 is a diagram for describing an example according to the eleventh embodiment of the present disclosure.

FIG. 42 is a diagram for describing the eleventh embodiment of the present disclosure. In view of the foregoing circumstance, in the embodiment, the developed lens tube 110*a* remains in the state without change even when the mode of the power supply to the imaging unit 135 is switched from the camera mode to the reproduction mode. That is, even when the power supply to another portion of the imaging unit 135 ends through the switching of the mode of the power supply, the storage state of the lens tube 110*a* is not changed.

Thus, it is possible to suppress the power consumption caused due to the change in the storage state of the lens tube. When the mode of the power supply is switched through the change in the display of the display unit 217, a probability of the user continuously viewing the display unit 217 and the imaging device 100 being stored in a case or the like is considered to be low. Accordingly, even when the lens tube 110*a* remains developed in the reproduction mode, a probability of a trouble occurring is low. Therefore, for example, when the user performs an operation of turning off power of the imaging device in the reproduction mode or the display of the reproduced images on the display unit 217 ends, the lens tube 110*a* may be stored again.

4-4. Twelfth Embodiment

Next, a twelfth embodiment of the present disclosure will be described with reference to FIGS. 43 to 48. The twelfth embodiment of the present disclosure relates to an example in which a reproduced image having a common attribute to an EE image is used as the EE-relevant image to determine the power supply control. In each of the foregoing embodiments, the power supply to the imaging unit 135 is controlled according to the display of the display unit 217. However, the embodiment is applicable to each embodiment in which this control is performed, i.e., any of the foregoing embodiments.

Processing Flow: First Example

Figure 43:
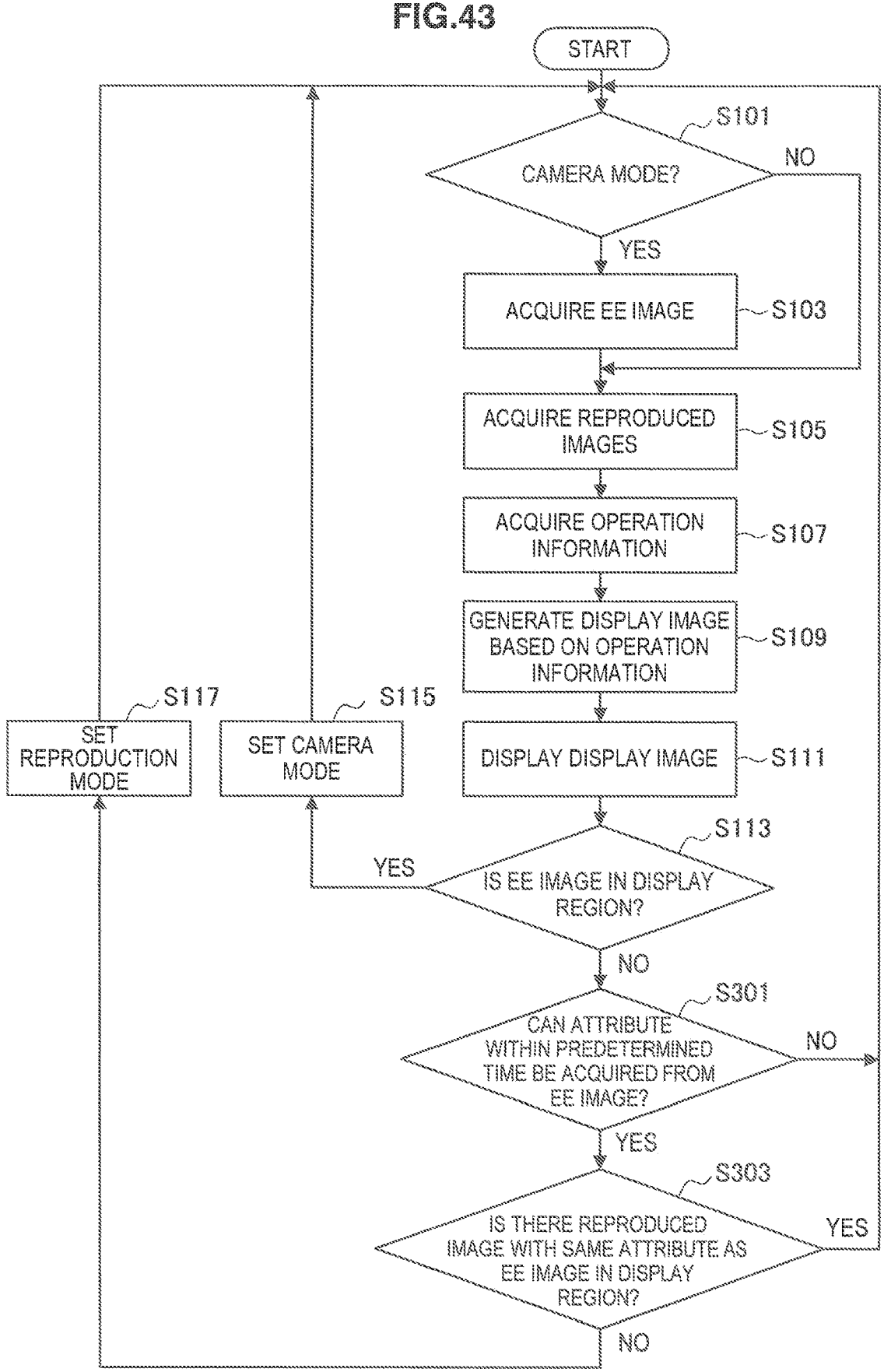
FIG. 43 is a diagram illustrating a first example of a processing flow according to a twelfth embodiment of the present disclosure.

FIG. 43 is a diagram illustrating a first example of the processing flow according to the twelfth embodiment of the present disclosure. The first example is an example in which an attribute of an EE image is acquired when the mode of the power supply to the imaging unit 135 is switched from the camera mode to the reproduction mode. Since the processes of step S101 to step S115 are the same as those of the example described with reference to FIG. 28 in the foregoing ninth embodiment, the description thereof will be omitted.

When the power control unit 203 determines in step S113 that the EE-relevant image is out of the display region, the power control unit 203 determines whether an attribute within the predetermined time can be acquired from the EE image (step S301). Here, the attribute within the predetermined time can be said to be an attribute in which a predetermined time does not pass after acquisition of the EE image.

When the EE image is out of the display region, the EE image is not already displayed. Therefore, the attribute of the EE image is not acquired in real time. Accordingly, the attribute of the referable EE image can be an attribute when the EE image is finally displayed. When a time considerably passes after the acquisition of the attribute, a difference increases between the attribute (which is not actually acquired) of the current EE image and the attribute of the referable EE image, and thus there is a probability of the determination using the attribute of the EE image not being adequate. Accordingly, in the foregoing step S301, it is determined whether the attribute acquirable from the EE image is the attribute within a predetermined time.

When the attribute within the predetermined time can be acquired from the EE image in the foregoing step S301, the power control unit 203 determines whether the reproduced image with the same attribute as this attribute is present in the display region (step S303). Here, when the reproduced image with the same attribute as the EE image is not present in the display region, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein.

Conversely, when the attribute within the predetermined time may not be acquired from the EE image in the foregoing step S301, the power control unit 203 does not perform the process regarding the mode of the power supply and the process returns to step S101. That is, in this case, the mode of the power supply set throughout the process performed hitherto remains. This is treated as being similar to a case in which an image with the common attribute to the EE image is present in the reproduced images when an effective attribute of the EE image is not available.

In addition, even when the reproduced image with the same attribute as the EE image is present in the display region in step S303, the power control unit 203 does not perform the process regarding the mode of the power supply and the process returns to step S101. That is, in this case, the mode of the power supply set throughout the process performed hitherto remains. This means that when the set mode of the power supply is the camera mode, the camera mode remains as long as the reproduced image with the same attribute as the EE image is present in the display region. Further, this means that when the set mode of the power supply is the reproduction mode, the reproduction mode is not switched to the camera mode despite the fact that the reproduced image with the same attribute as the EE image comes in the display region.

Processing Flow: Second Example

Figure 44:
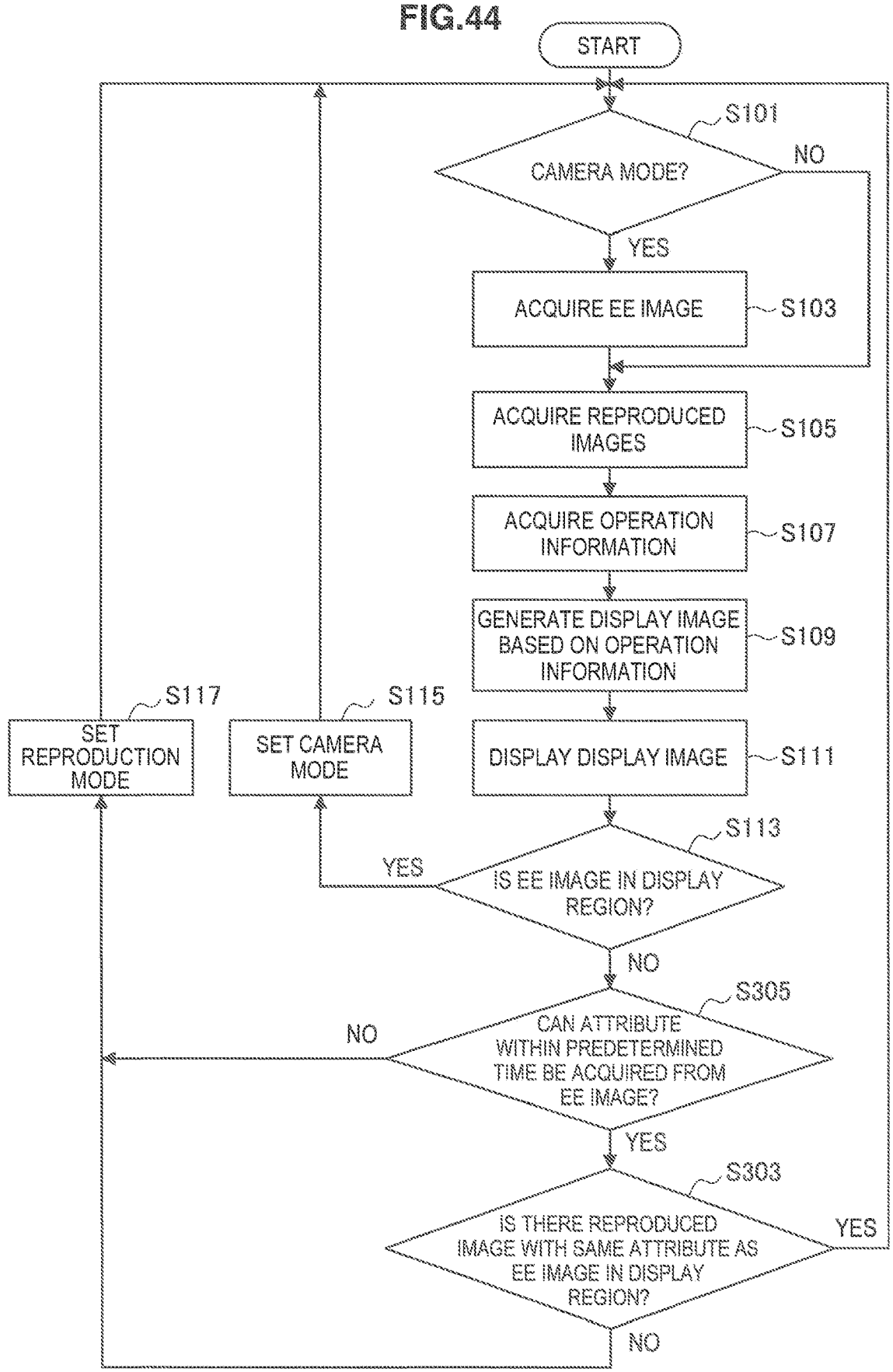
FIG. 44 is a diagram illustrating a second example of a processing flow according to a twelfth embodiment of the present disclosure.

FIG. 44 is a diagram illustrating a second example of the processing flow according to the twelfth embodiment of the present disclosure. The second example is also an example in which an attribute of an EE image is acquired when the mode of the power supply to the imaging unit 135 is switched from the camera mode to the reproduction mode. Since the processes of step S101 to step S115, S117, and S303 are the same as those of the example described with reference to FIG. 43 in the foregoing ninth embodiment, the description thereof will be omitted.

When the power control unit 203 determines in step S113 that the EE-relevant image is out of the display region, the power control unit 203 determines whether the attribute within the predetermined time can be acquired from the EE image (step S305). Here, when the attribute within the predetermined time can be acquired from the EE image, the power control unit 203 determines whether the reproduced image with the same attribute as this attribute is present in the display region (step S303).

Conversely, when the attribute within the predetermined time may not be acquired from the EE image in step S305, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein. This is treated as being similar to a case in which an image with the common attribute to the EE image is not present in the reproduced images when an effective attribute of the EE image is not available.

Processing Flow: Third Example

Figure 45:
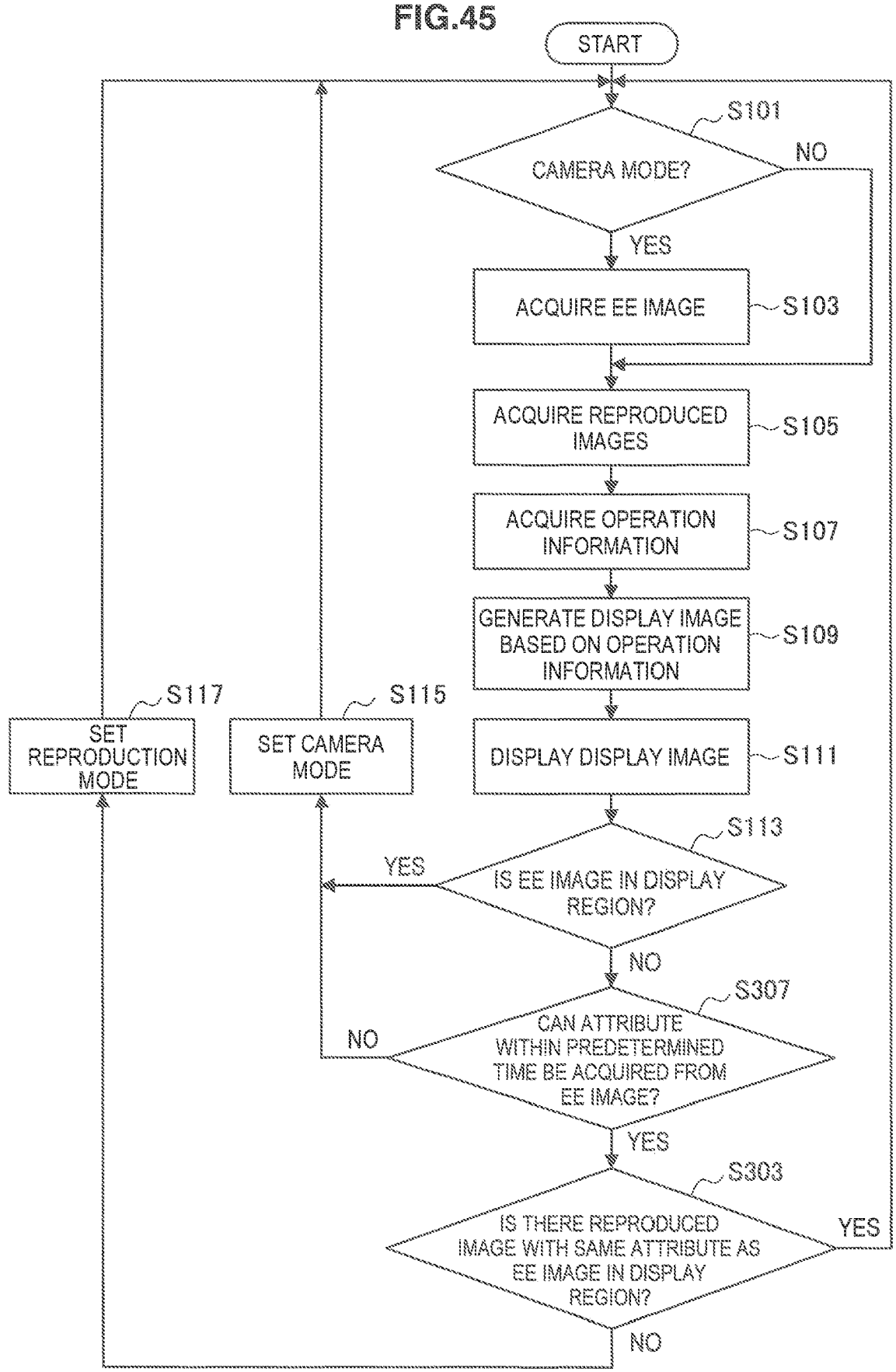
FIG. 45 is a diagram illustrating a third example of a processing flow according to a twelfth embodiment of the present disclosure.

FIG. 45 is a diagram illustrating a third example of the processing flow according to the twelfth embodiment of the present disclosure. The third example is also an example in which an attribute of an EE image is acquired when the mode of the power supply to the imaging unit 135 is switched from the camera mode to the reproduction mode. Since the processes of step S101 to step S115, S117, and S303 are the same as those of the example described with reference to FIG. 43 in the foregoing ninth embodiment, the description thereof will be omitted.

When the power control unit 203 determines in step S113 that the EE-relevant image is out of the display region, the power control unit 203 determines whether the attribute within the predetermined time can be acquired from the EE image (step S307). Here, when the attribute within the predetermined time can be acquired from the EE image, the power control unit 203 determines whether the reproduced image with the same attribute as this attribute is present in the display region (step S303).

Conversely, when the attribute within the predetermined time may not be acquired from the EE image in step S307, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein. This is treated as being similar to the case in which an image with the common attribute to the EE image is present in the reproduced images when an effective attribute of the EE image is not available and also means that the mode of the power supply is set to the camera mode when the image with the common attribute to the EE image is present in the reproduced images.

Processing Flow: Fourth Example

Figure 46:
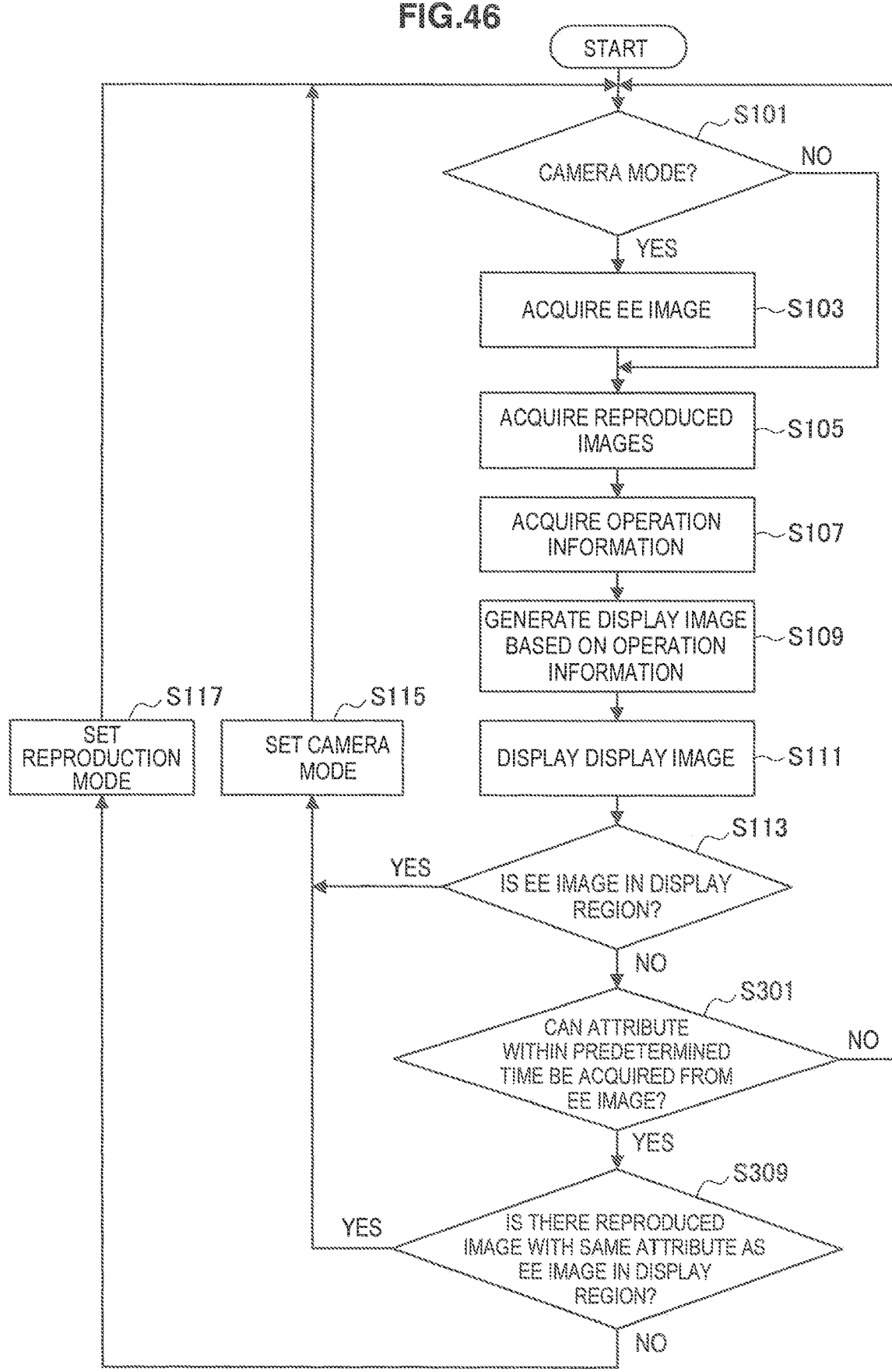
FIG. 46 is a diagram illustrating a fourth example of a processing flow according to a twelfth embodiment of the present disclosure.

FIG. 46 is a diagram illustrating a fourth example of the processing flow according to the twelfth embodiment of the present disclosure. The fourth example is an example in which an attribute of an EE image is also acquired when the mode of the power supply to the imaging unit 135 is switched from the reproduction mode to the camera mode. Since the processes of step S101 to step S115 and S301 are the same as those of the example described with reference to FIG. 28, the description thereof will be omitted.

When the attribute within the predetermined time can be acquired from the EE image in the foregoing step S301, the power control unit 203 determines whether the reproduced image with the same attribute as this attribute is present in the display region (step S309). Here, when the reproduced image with the same attribute as the EE image is not present in the display region, the power control unit 203 sets the mode of the power supply to the imaging unit 135 to the camera mode (step S115) and the process returns to step S101. When the mode of the power supply is set to the reproduction mode throughout the process performed hitherto, the switching of the mode is performed herein.

Conversely, when the reproduced image with the same attribute as the EE image is not present in the display region in step S309, the power control unit 203 sets the mode of the power supply to the imaging unit 135 to the reproduction mode (step S117) and the process returns to step S101. When the mode of the power supply is set to the camera mode throughout the process performed hitherto, the switching of the mode is performed herein. That is, in the fourth example, the mode of the power supply is switched to the camera mode in some cases and is switched to the reproduction mode depending on whether the reproduced image with the common attribute to the EE image is displayed.

Processing Flow: Fifth Example

Figure 47:
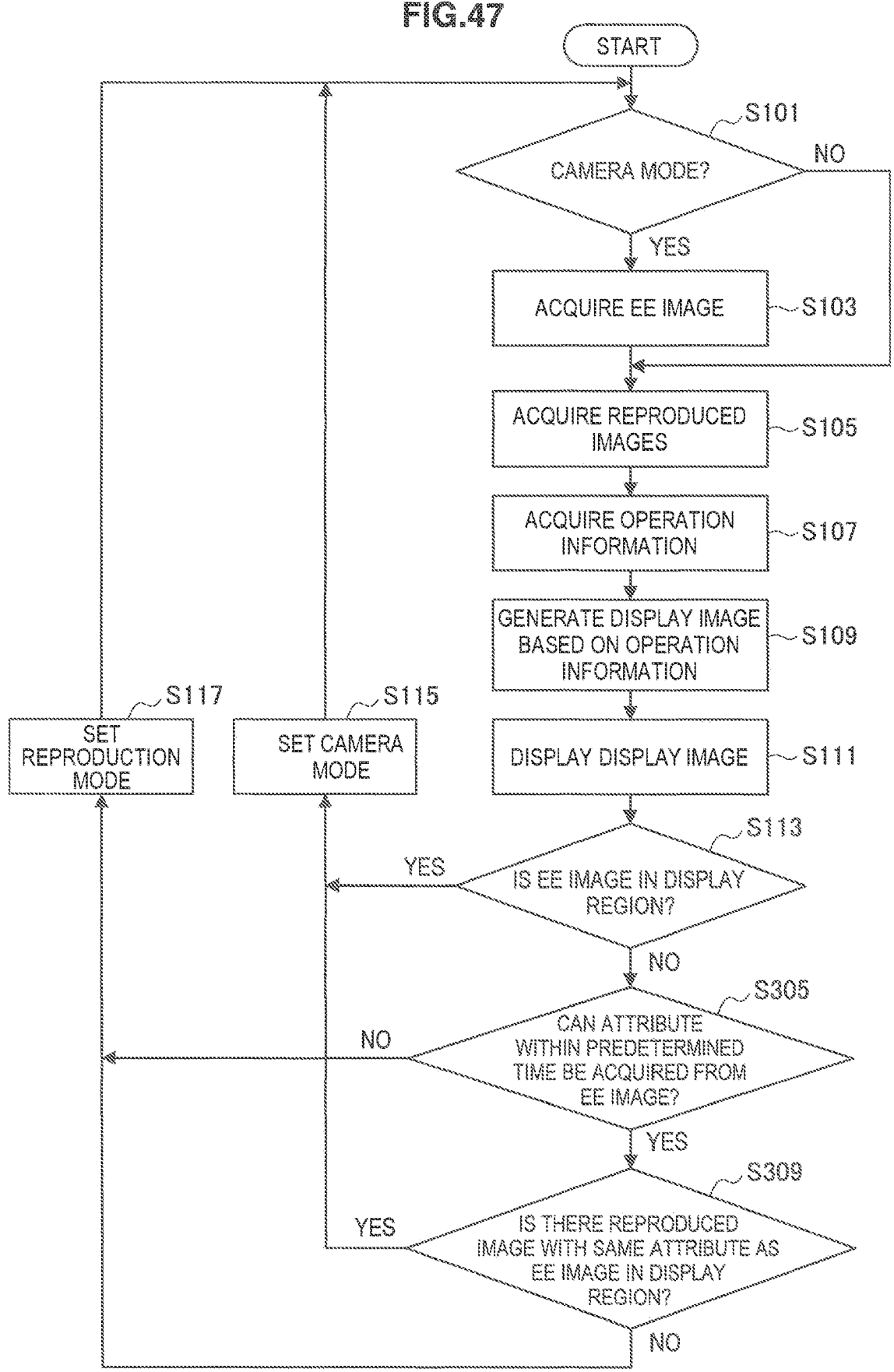
FIG. 47 is a diagram illustrating a fifth example of a processing flow according to a twelfth embodiment of the present disclosure.

FIG. 47 is a diagram illustrating a fifth example of the processing flow in the twelfth embodiment of the present disclosure. The fifth example is an example in which the attribute of the EE image is acquired even when the mode of the power supply to the imaging unit is switched from the reproduction mode to the camera mode. This example is an example in which the processes of steps S101 to S115 and step S309 described above with reference to FIG. 46 and the process of step S305 described with reference to FIG. 44 are combined. Since each step has already been described, the detailed description thereof will be omitted herein.

Processing Flow: Sixth Example

Figure 48:
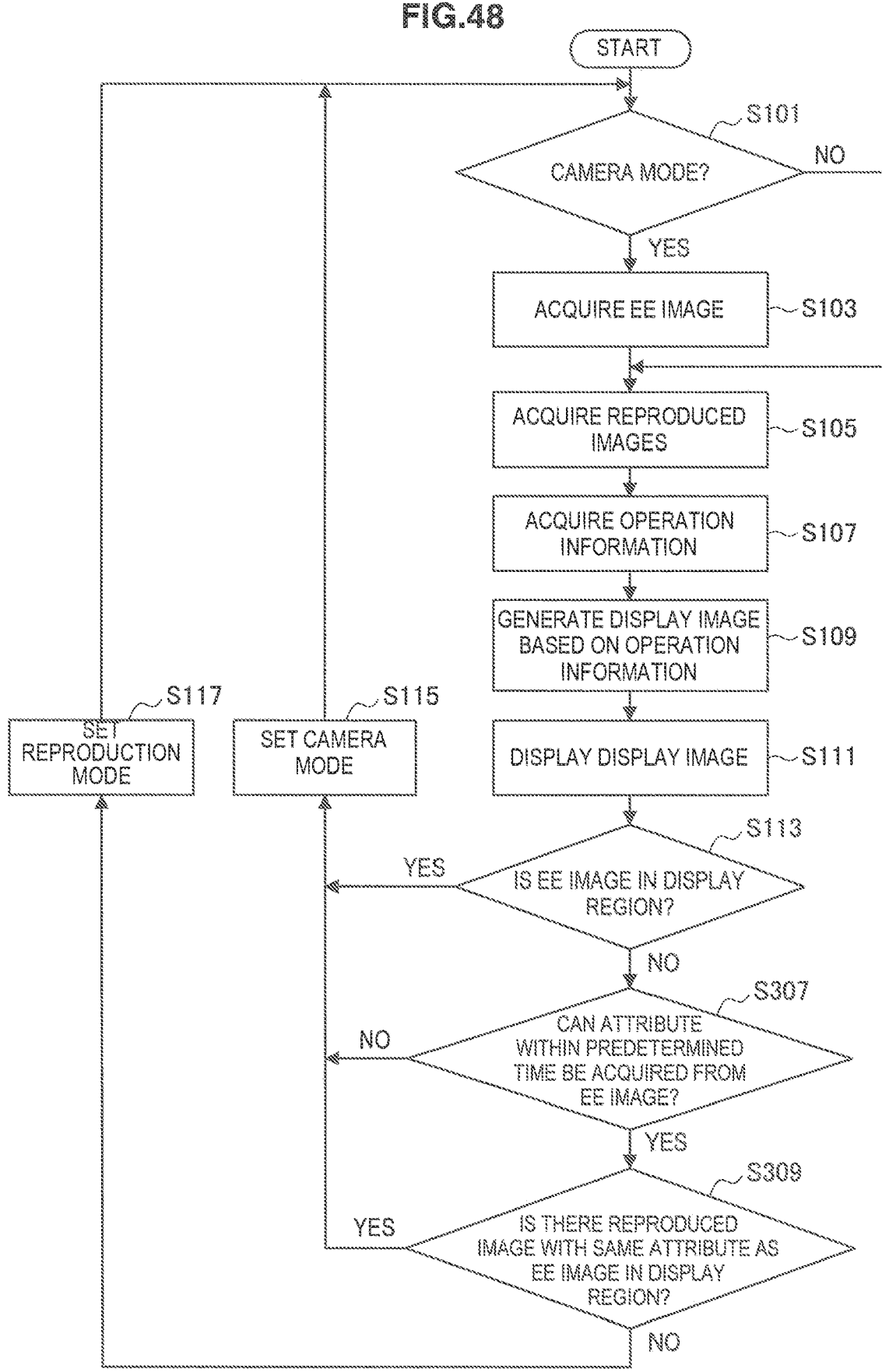
FIG. 48 is a diagram illustrating a sixth example of a processing flow according to a twelfth embodiment of the present disclosure.

FIG. 48 is a diagram illustrating a sixth example of the processing flow in the twelfth embodiment of the present disclosure. The sixth example is an example in which the attribute of the EE image is acquired even when the mode of the power supply to the imaging unit is switched from the reproduction mode to the camera mode. This example is an example in which the processes of steps S101 to S115 and step S309 described above with reference to FIG. 46 and the process of step S307 described with reference to FIG. 45 are combined. Since each step has already been described, the detailed description thereof will be omitted herein.

4-5. Thirteenth Embodiment

Next, a twelfth embodiment of the present disclosure will be described with reference to FIG. 49. The thirteenth embodiment of the present disclosure is a combination of the ninth and twelfth embodiments described above.

Figure 49:
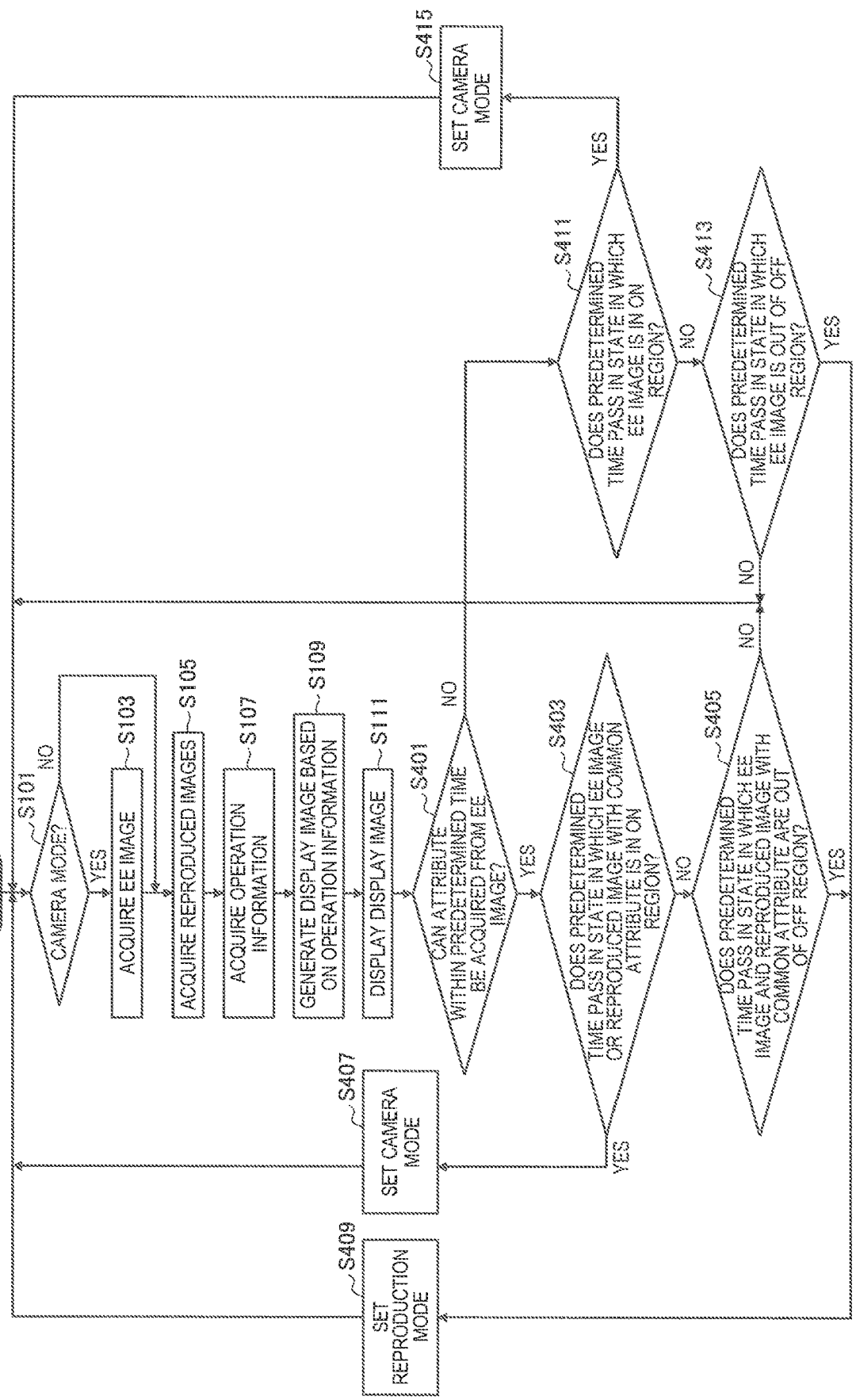
FIG. 49 is a diagram illustrating an example of a processing flow according to a thirteenth embodiment of the present disclosure.

FIG. 49 is a diagram illustrating an example of a processing flow according to the thirteenth embodiment of the present disclosure. Since the processes of steps S101 to S111 are the same as those of the example described with reference to FIG. 28 in the foregoing ninth embodiment, the description thereof will be omitted.

After step S111, the power control unit 203 determines whether the attribute within the predetermined time can be acquired from the EE image (step S401). Here, when the attribute within the predetermined time can be acquired from the EE image, the power control unit 203 causes the process to proceed to perform determination using the attribute of the EE image in steps S403 and S405. Conversely, when the attribute within the predetermined time may not be acquired from the EE image, the power control unit 203 causes the process to proceed to perform determination not using the attribute of the EE image in steps S411 and S413.

In the determination using the attribute after the foregoing step S401, the power control unit 203 first determines whether a predetermined time passes in the state in which the EE image or the reproduced image with the common attribute to the EE image is in the ON region set in the screen (step S403). Here, when a predetermined time passes in the state in which one or both of the foregoing images are in the ON region, the power control unit 203 sets the mode of the power supply to the imaging unit 135 to the camera mode (step S407). When the mode of the power supply is set to the reproduction mode throughout the process performed hitherto, the switching of the mode is performed herein.

Conversely, when one or both of the foregoing images are out of the ON region or go out from the ON region before the predetermined time passes in step S403, the power control unit 203 further determines whether a predetermined time passes in the state in which the EE image and the reproduced image with the common attribute to the EE image are out of the OFF region set in the screen (step S405).

Here, when the predetermined time passes in the state in which both of the foregoing images are out of the OFF region, the power control unit 203 sets the mode of the power supply to the imaging unit 135 to the reproduction mode (step S409). When the mode of the power supply is set to the camera mode throughout the process performed hitherto, the switching of the mode is performed herein.

Conversely, when one of the foregoing images is in the OFF region or comes in the OFF region before the predetermined time passes in step S405, the power control unit 203 does not perform the process regarding the mode of the power supply and the process returns to step S101. That is, in this case, the mode of the power supply set throughout the process performed hitherto remains.

In the determination not using the attribute after the foregoing step S401, the power control unit 203 first determines whether a predetermined time passes in the state in which the EE image is in the ON region set in the screen (step S411). Here, when a predetermined time passes in the state in which the EE image is in the ON region, the power control unit 203 sets the mode of the power supply to the imaging unit 135 to the camera mode (step S415). When the mode of the power supply is set to the reproduction mode throughout the process performed hitherto, the switching of the mode is performed herein.

Conversely, when EE image is out of the ON region or goes out from the ON region before the predetermined time passes in step S411, the power control unit 203 further determines whether a predetermined time passes in a state in which the EE image is out of the OFF region set in the screen (step S413).

Here, when the predetermined time passes in the state in which the EE image is out of the OFF region, the power control unit 203 sets the mode of the power supply to the imaging unit 135 to the reproduction mode (step S409). When the mode of the power supply is set to the camera mode throughout the process performed hitherto, the switching of the mode is performed herein.

Conversely, when the EE image is in the OFF region or comes in the OFF region before the predetermined time passes in step S413, the power control unit 203 does not perform the process regarding the mode of the power supply and the process returns to step S101. That is, in this case, the mode of the power supply set throughout the process performed hitherto remains.

4-6. Fourteenth Embodiment

Next, a fourteenth embodiment of the present disclosure will be described with reference to FIGS. 50 to 53. The fourteenth embodiment of the present disclosure relates to the more detailed configuration of the power control using the display of the reproduced image with the common attribute to the EE image. Accordingly, the embodiment is applicable to each of the foregoing embodiments in which the power control is performed using the attribute of the EE image.

Processing Flow: First Example

Figure 50:
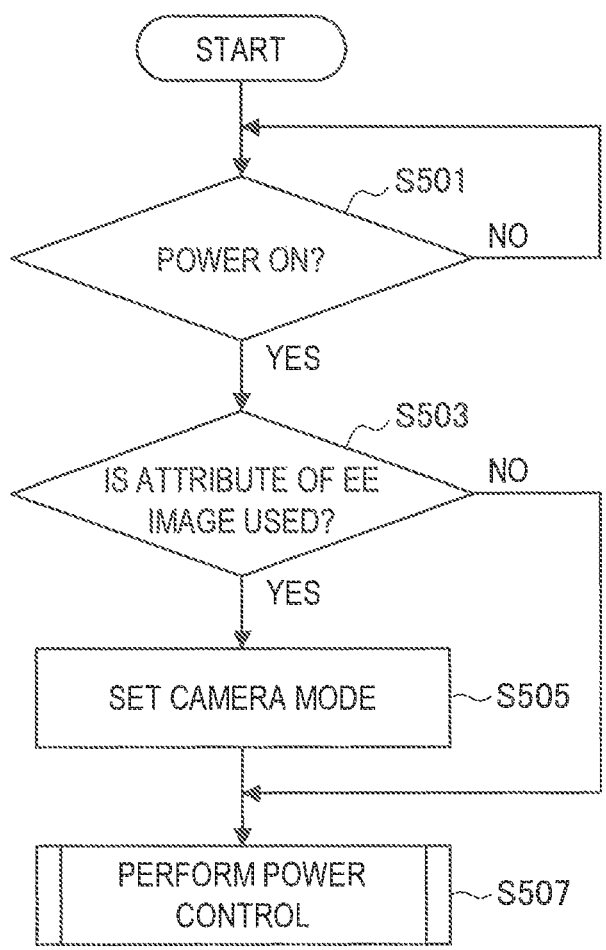
FIG. 50 is a diagram illustrating a first example of a processing flow according to a fourteenth embodiment of the present disclosure.

FIG. 50 is a diagram illustrating a first example of a processing flow according to the fourteenth embodiment of the present disclosure. The first example is an example in which the mode of the power supply to the imaging unit 135 is switched to the camera mode to acquire the attribute of the EE image used for the power control.

When power is applied to the control device (step S501), the process starts. For example, referring to set information stored in the non-volatile storage unit 301 or the like, the power control unit 203 determines whether the attribute of the EE image is used at the time of the power control (step S503). Here, when the attribute of the EE image is used, the power control unit 203 switches the mode of the power supply to the imaging unit 135 to the camera mode (step S505).

Thereafter, the power control of the imaging unit 135 described in each of the foregoing embodiments starts (step S507).

Processing Flow: Second Example

Figure 51:
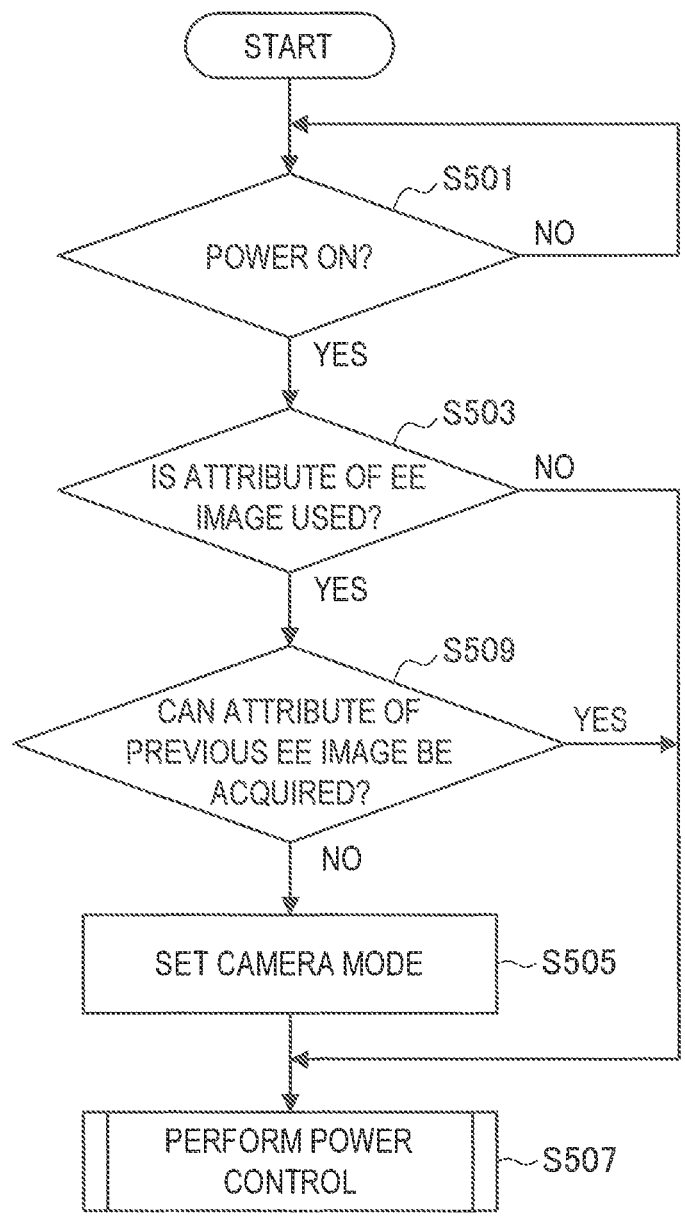
FIG. 51 is a diagram illustrating a second example of a processing flow according to a fourteenth embodiment of the present disclosure.

FIG. 51 is a diagram illustrating a second example of the processing flow according to the fourteenth embodiment of the present disclosure. The second example is an example in which the mode of the power supply to the imaging unit 135 is switched to the camera mode when the previously acquired attribute of the EE image used for the power control is not usable.

When power is applied to the control device (step S501), the process starts. For example, referring to the set information stored in the non-volatile storage unit 301 or the like, the power control unit 203 determines whether the attribute of the EE image is used at the time of the power control (step S503).

Here, when the attribute of the EE image is used, the power control unit 203 further determines whether an attribute of a previous EE image can be acquired (step S509). The attribute of the previous EE image is, for example, the attribute of the EE image acquired when the power is cut off at previous time. For example, when the attribute is stored in the non-volatile storage unit 301 or the like at the time of the cutoff of the power, the power control unit 203 can acquire the attribute at the time of reapplication of power.

When the attribute of the previous EE image may not be acquired in step S509, the power control unit 203 switches the mode of the power supply to the imaging unit 135 to the camera mode (step S505).

Thereafter, the power control of the imaging unit 135 described in each of the foregoing embodiments starts (step S507).

Thus, when the attribute of the previous EE image can be acquired, the mode of the power supply is set to the reproduction mode, and thus power consumption can be saved.

Processing Flow: Third Example

Figure 52:
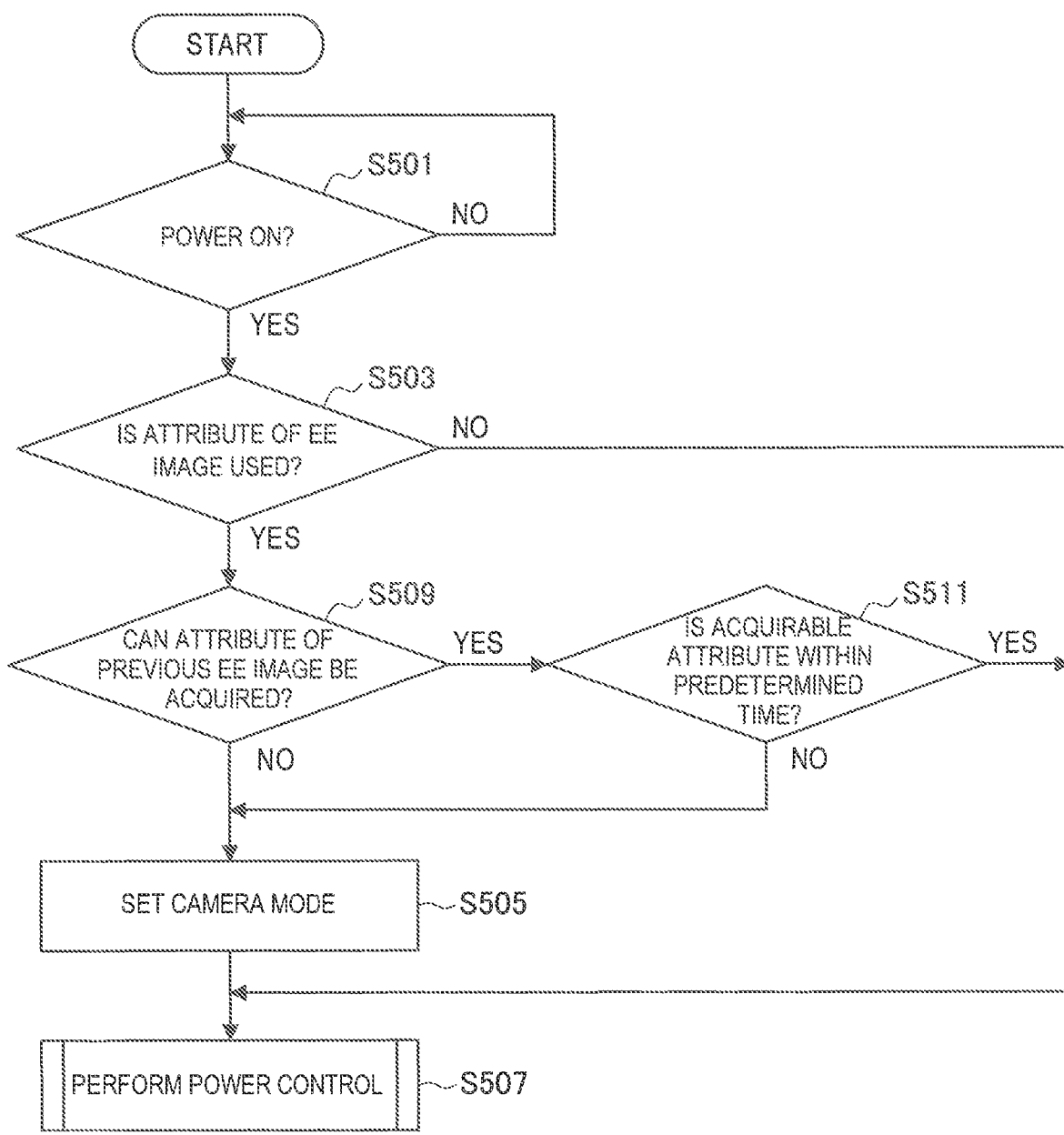
FIG. 52 is a diagram illustrating a third example of a processing flow according to a fourteenth embodiment of the present disclosure.

FIG. 52 is a diagram illustrating a third example of the processing flow according to the fourteenth embodiment of the present disclosure. The third example is an example in which the mode of the power supply to the imaging unit 135 is switched to the camera mode when the previously acquired attribute of the EE image used for the power control is not usable, the attribute being within predetermined time.

When power is applied to the control device (step S501), the process starts. For example, referring to the set information stored in the non-volatile storage unit 301 or the like, the power control unit 203 determines whether the attribute of the EE image is used at the time of the power control (step S503).

Here, when the attribute of the EE image is used, the power control unit 203 further determines whether the attribute of the previous EE image can be acquired (step S509). When the attribute of the previous EE image may not be acquired, the power control unit 203 switches the mode of the power supply to the imaging unit 135 to the camera mode (step S505).

Conversely, when the attribute of the previous EE image can be acquired in step S509, the power control unit 203 further determines whether the acquirable attribute is the attribute within the predetermined time (step S511). Here, even when the acquirable attribute is not the attribute within the predetermined time, the power control unit 203 switches the mode of the power supply to the imaging unit 135 to the camera mode (step S505).

Thereafter, the power control of the imaging unit 135 described in each of the foregoing embodiments starts (step S507).

Processing Flow: Fourth Example

Figure 53:
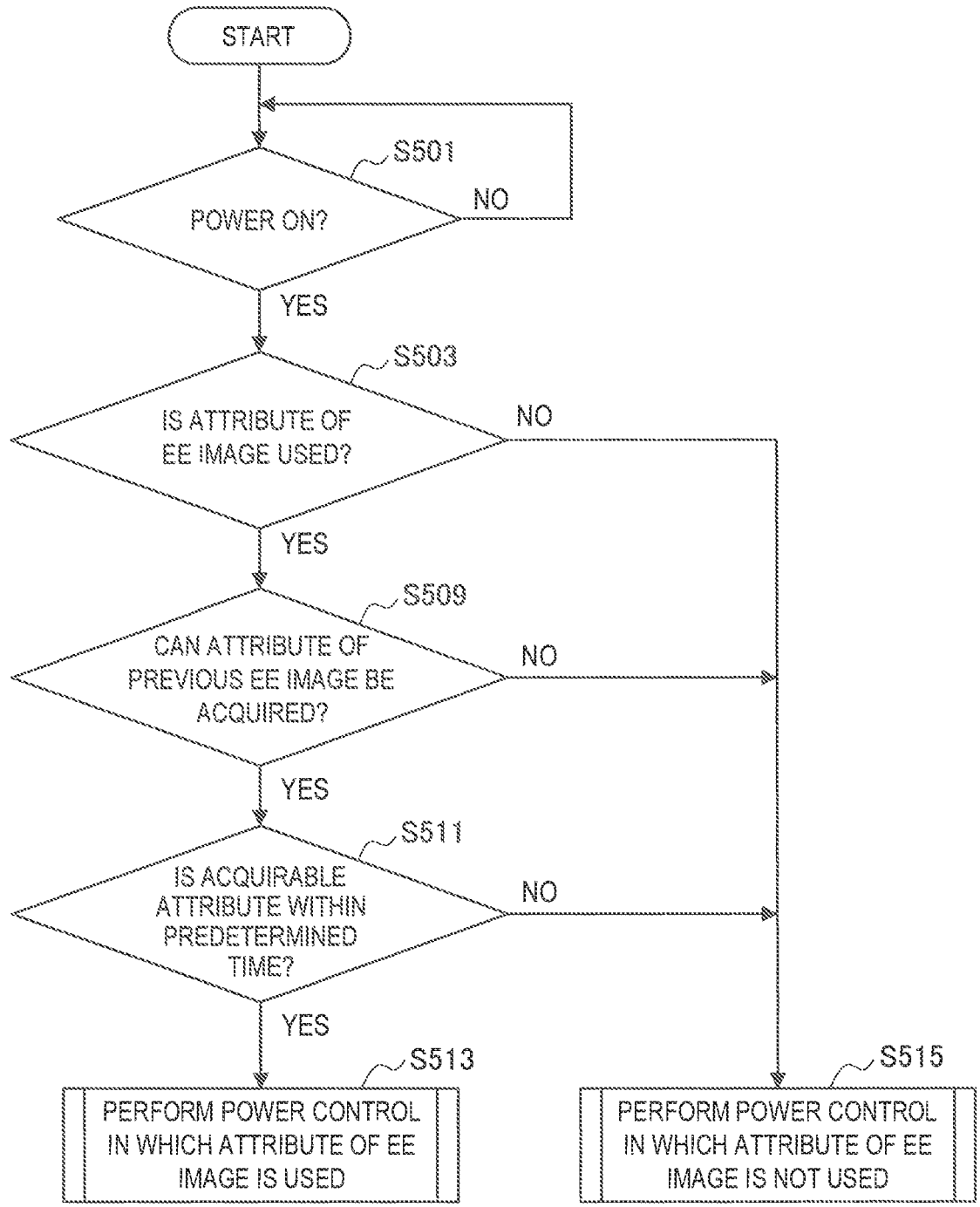
FIG. 53 is a diagram illustrating a fourth example of a processing flow according to a fourteenth embodiment of the present disclosure.

FIG. 53 is a diagram illustrating a fourth example of the processing flow according to the fourteenth embodiment of the present disclosure. The fourth example is an example in which the mode of the power control is switched based on whether the attribute of the EE image used for the power control can be acquired.

When power is applied to the control device (step S501), the process starts. For example, referring to the set information stored in the non-volatile storage unit 301 or the like, the power control unit 203 determines whether the attribute of the EE image is used at the time of the power control (step S503).

Here, when the attribute of the EE image is used, the power control unit 203 further determines whether the attribute of the previous EE image can be acquired (step S509). Conversely, when the attribute of the EE image is not used, power control of the imaging unit 135 in which the attribute of the EE image is not used starts (step S515).

When the attribute of the previous EE image can be acquired in the foregoing step S509, the power control unit 203 further determines whether the acquirable attribute is the attribute within the predetermined time (step S511). Conversely, when the attribute of the previous EE image may not be acquired, the power control of the imaging unit 135 in which the attribute of the EE image is not used starts (step S515).

When the acquirable attribute is the attribute within the predetermined time in the foregoing step S511, power control of the imaging unit 135 in which the attribute of the EE image is used starts (step S513). Conversely, when the acquirable attribute is not the attribute within the predetermined time in the foregoing step S511, the power control of the imaging unit 135 in which the attribute of the EE image is not used starts (step S515).

The power control of the imaging unit 135 in which the attribute of the EE image is not used in step S515 may be switched to the power control of the imaging unit 135 in which the attribute of the EE image is used, when the mode of the power supply is set to the camera mode during the control and the attribute of the EE image can be acquired.

5. Supplement

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, in the foregoing embodiments, the EE-relevant image has been exemplified as the image including the EE image, the reproduced image having the common attribute to the EE image, a blackout image, the review image, an image during processing a still image, and the image displayed as an alternative of the EE image, but the setting of the region may be changed according to which kind of image the EE-relevant image is. In this case, for example, the ON region or the OFF region in the foregoing embodiments may be changed according to the forgoing kinds of EE-relevant images.

Additionally, the present technology may also be configured as below.

(1)

A control device including:

a display control unit configured to cause display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed; and a power control unit configured to control power supply to the imaging unit in the shift between the first and second display modes.

(2)

The control device according to (1), wherein the power control unit controls the power supply to the imaging unit according to a positional relation between a first region set to correspond to a display region in a screen of the display unit and the first kind of image disposed in the screen.

(3)

The control device according to (2), wherein the power control unit does not supply power to a predetermined portion of the imaging unit when the first kind of image is not included in the first region.

(4)

The control device according to (3), wherein the first region is a region including the display region.

(5)

The control device according to (3) or (4), wherein the power control unit ends the power supply to the predetermined portion of the imaging unit when a predetermined time passes in a state in which the first kind of image is not included in the first region.

(6)

The control device according to any one of (3) to (5), wherein the power control unit supplies the power to the predetermined portion of the imaging unit when at least a part of the first kind of image is included in a second region set to correspond to the display region.

(7)

The control device according to (6), wherein the first region is a region including the second region.

(8)

The control device according to (6), wherein the first region is the same region as the second region.

(9)

The control device according to (2), wherein the power control unit supplies the power to a predetermined portion of the imaging unit when at least a part of the first kind of image is included in the first region.

(10)

The control device according to any one of (2) to (9), wherein the screen includes first and second screens superimposed to be displayed, and wherein the first region is set in each of the first and second screens.

(11)

The control device according to (10), wherein the first region in the second screen is set to correspond to the display region of the first screen when the second screen is shielded by the first screen and the first screen includes the display region.

(12)

The control device according to any one of (1) to (11), wherein the power control unit controls the power supply to the imaging unit when shift between the first and second display modes occurs and a predetermined time passes.

(13)

The control device according to any one of (1) to (12), wherein the first kind of image includes the EE image, an image displayed as an alternative of the EE image, or a reproduced image having a common attribute to the EE image.

(14)

The control device according to (13), wherein the first kind of image includes a reproduced image having the common attribute to the EE image in regard to at least one of a photographing time, a photographing position, and a subject.

(15)

The control device according to (13) or (14), wherein the power control unit starts to supply the power to a predetermined portion of the imaging unit when the reproduced image displayed on the display unit has the common attribute to the EE image acquired within a predetermined time in a state in which no power is supplied to the predetermined portion of the imaging unit.

(16)

The control device according to any one of (13) to (15), wherein the first kind of image includes a plurality of EE images acquired by a plurality of imaging units.

(17)

The control device according to any one of (13) to (16), wherein the first kind of image includes a plurality of EE images for which images acquired by the single imaging unit are displayed in different states.

(18)

The control device according to any one of (1) to (17), further including:

an input processing unit configured to acquire an operation input of a user, wherein the power control unit changes a storage state of a storage type lens included in the imaging unit when the power supply to a predetermined portion of the imaging unit ends according to the operation input, and does not change the storage state when the power supply to the predetermined portion of the imaging unit ends in the shift between the first and second display modes.

(19)

A control method including:

causing display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed; and controlling power supply to the imaging unit in the shift between the first and second display modes.

(20)

A computer-readable recording medium recording a program for causing a computer to realize:

a function of causing display of a display unit to shift between a first display mode in which a first kind of image having a predetermined relation with an electric-to-electric (EE) image acquired by an imaging unit and a second kind of image different from the first kind of image are displayed and a second display mode in which the first kind of image is not displayed and the second kind of image is displayed; and a function of controlling power supply to the imaging unit in the shift between the first and second display modes.

REFERENCE SIGNS LIST 10 system
100 imaging device
200 display device
300 image storage device
110 lens tube
135 imaging unit
203 power control unit
205 calculation unit
211 input unit
213 input processing unit
215 display control unit
217 display unit
301 non-volatile storage unit

What is claimed is:

1. A control device, comprising:
circuitry configured to:
acquire a user input operation that corresponds to a slide operation on a display device; and
control, based on the slide operation on the display device, display of the display device to shift between a first display mode and a second display mode, wherein
the first display mode corresponds to a first state in which a first image is displayed on the display device,
the first image is related to an electric-to-electric (EE) image acquired by an imaging device,
the second display mode corresponds to a second state in which the first image is excluded from the display of the display device and a second image, different from the first image, is displayed on the display device,
the first image includes one of the EE image, a third image as an alternative of the EE image, or a reproduced image having a common attribute with the EE image,
the first image includes the reproduced image,
the first image is displayed on the display device based on a ratio between an area of the second image and an area of the display device,
a display position of the second image is changed during the shift between the first display mode and the second display mode,
during the shift between the first display mode and the second display mode, at least a specific part of the second image is superimposed on the first image based on the change in the display position of the second image, and
during the shift between the first display mode and the second display mode, a first part of the first image is hidden based on the superimposition of the specific part of the second image on the first image.

2. The control device according to claim 1, wherein the first image further includes a plurality of EE images acquired by a plurality of cameras.

3. The control device according to claim 1, wherein
the first image further includes a plurality of EE images, and
the plurality of EE images is based on a plurality of images, acquired by a single imaging device, displayed in different states.

* * * * *